United States Patent
Ramirez et al.

(10) Patent No.: US 7,925,099 B2
(45) Date of Patent: Apr. 12, 2011

(54) UNIVERSAL-DENOISER CONTEXT-MODELING COMPONENT AND CONTEXT-MODELING METHOD

(75) Inventors: Ignacio Ramirez, Minneapolis, MN (US); Erik Ordentlich, San Jose, CA (US); Gadiel Seroussi, Cupertino, CA (US); Marcelo Weinberger, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1040 days.

(21) Appl. No.: 11/732,591

(22) Filed: Apr. 3, 2007

(65) Prior Publication Data
US 2008/0247659 A1   Oct. 9, 2008

(51) Int. Cl.
G06K 9/36 (2006.01)
G06K 9/40 (2006.01)
G06F 17/27 (2006.01)

(52) U.S. Cl. ............... 382/232; 382/275; 704/9

(58) Field of Classification Search .......... 382/232, 382/233, 239, 251, 254, 275; 358/426; 704/9, 704/228; 714/104, 780; 341/51, 65, 107; 375/346
See application file for complete search history.

(56) References Cited

U.S. PATENT DOCUMENTS

| | | | |
|---|---|---|---|
| 5,835,034 A * | 11/1998 | Seroussi et al. | 341/65 |
| 6,021,227 A * | 2/2000 | Sapiro et al. | 382/239 |
| 7,120,308 B2 * | 10/2006 | Guleryuz | 382/254 |
| 2005/0289406 A1 * | 12/2005 | Weissman et al. | 714/704 |
| 2006/0047501 A1 * | 3/2006 | Seroussi et al. | 704/9 |

* cited by examiner

*Primary Examiner* — Duy M Dang

(57) ABSTRACT

In various embodiments of the present invention, a context-based denoiser is applied to each noisy-image symbol embedded within a context to determine a replacement symbol for the noisy-signal symbol. The context-based denoiser includes a context-modeling component that efficiently generates context classes and symbol-prediction classes, assigns individual contexts to context classes and symbol-prediction classes, collects symbol-occurrence statistics related to the generated context classes and symbol-prediction classes, and, optionally, generates noisy-symbol predictions.

19 Claims, 42 Drawing Sheets

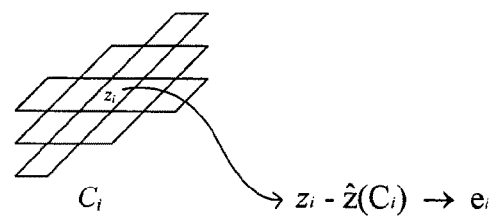
Figure 7
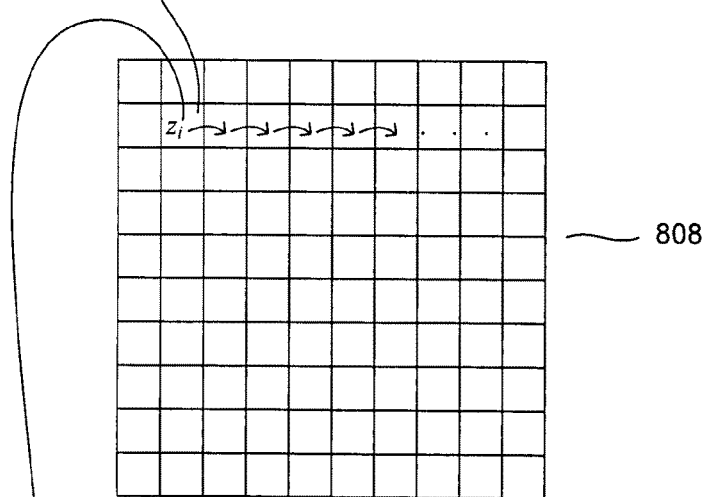
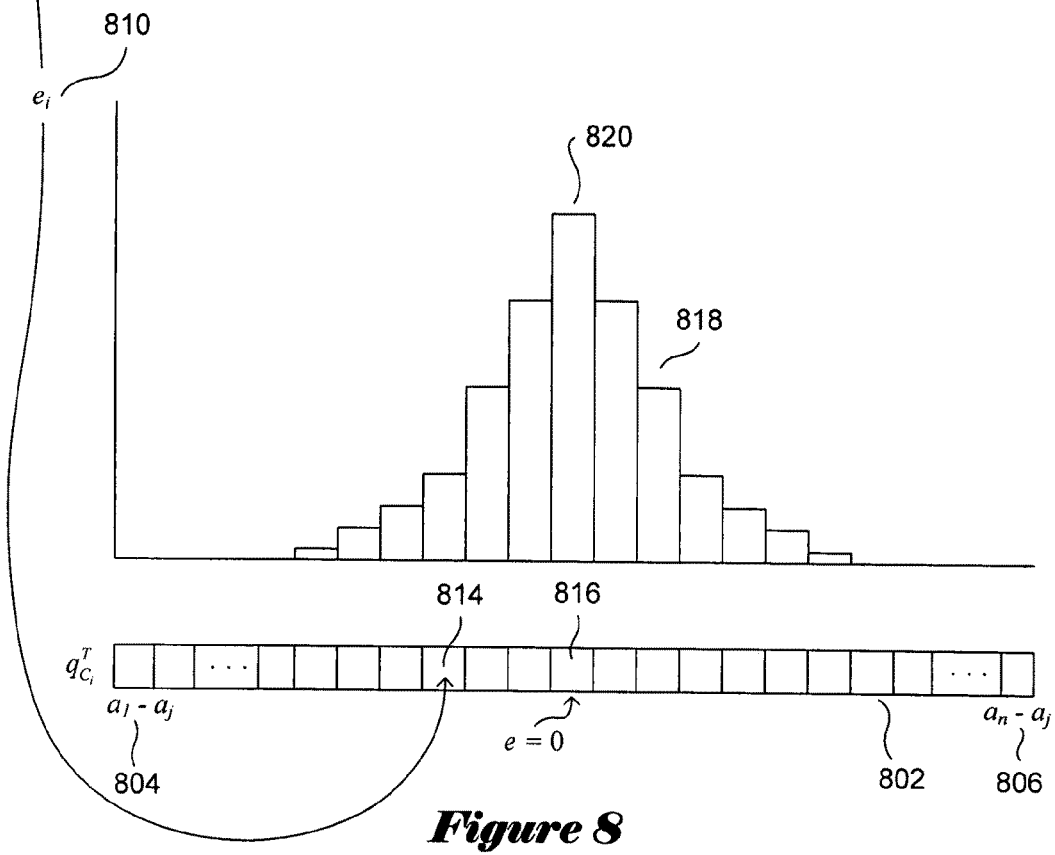
Figure 8

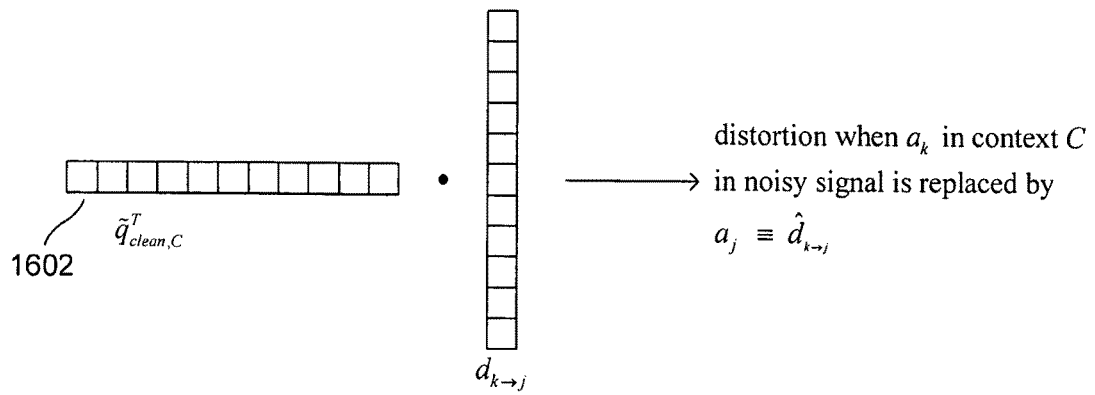
Figure 16
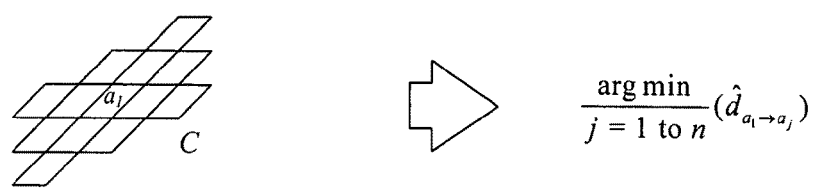
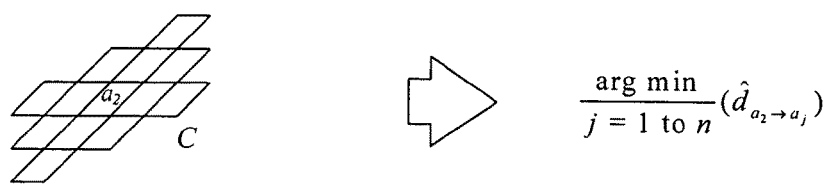
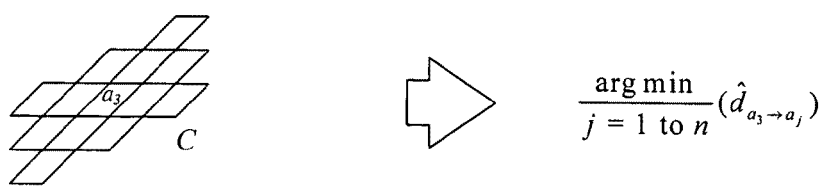
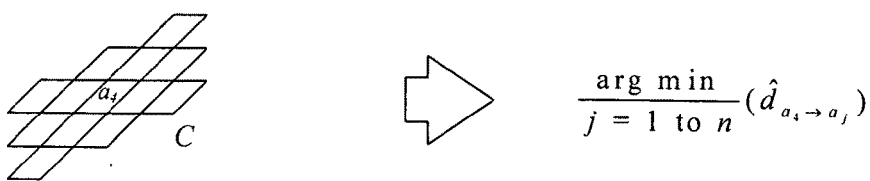
Figure 17

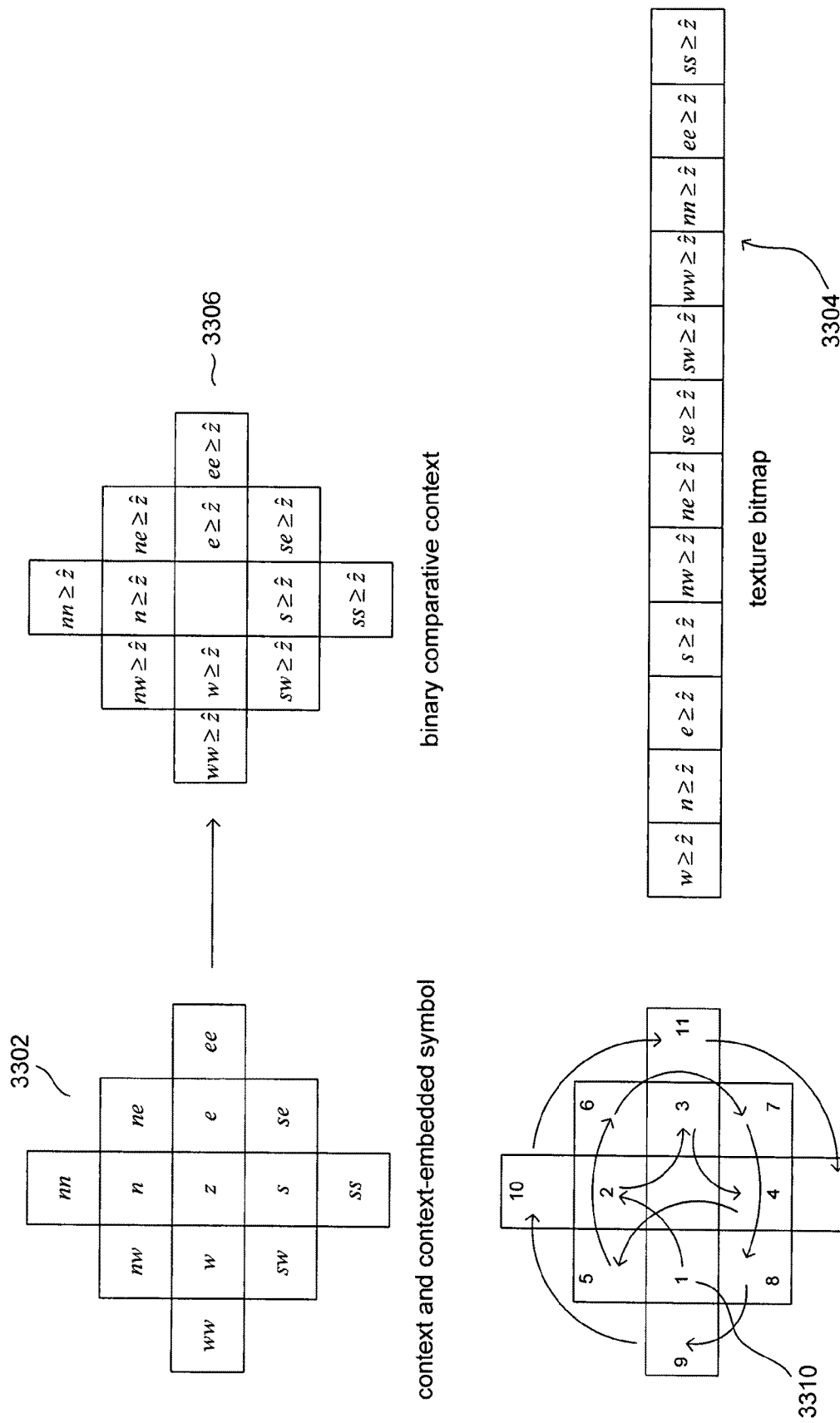

$d_N = 30 + 0 - 20 = 10$ $d_S = -10 + 0 - 20 = -30$ $d_E = -10 - 30 - 0 = -40$ $d_W = 20 + 0 - 10 = 10$ $d_H = |d_E| + |d_W| = 50$ $d_V = |d_N| + |d_S| = 40$ $AL = d_H + d_V = 90$ $\varphi = \tan^{-1} \dfrac{d_N}{d_S} = -18$ $d_N = 0 + 0 + 0 = 0$ $d_S = 0 + 0 + 0 = 0$ $d_E = -10 + -10 + -10 = -30$ $d_W = -10 + -10 + -10 = -30$ $d_H = |d_E| + |d_W| = 60$ $d_V = |d_N| + |d_S| = 0$ $AL = d_H + d_V = 60$ $\varphi = \tan^{-1} \dfrac{d_N}{d_S}$ = defined to be 0

$d_N = 0 + 0 + 0 = 0$ $d_S = 0 + 0 + 0 = 0$ $d_E = -10 + -10 + -10 = -30$ $d_W = 10 + 10 + 10 = 30$ $d_H = |d_E| + |d_W| = 60$ $d_V = |d_N| + |d_S| = 0$ $AL = d_H + d_V = 60$ $\varphi = \tan^{-1}\dfrac{d_N}{d_S}$ = defined to be 0

$d_N = 0$ $d_S = 0$ $d_E = 0$ $d_W = 0$ $d_H = |d_E| + |d_W| = 0$ $d_V = |d_N| + |d_S| = 0$ $AL = d_H + d_V = 0$ $\varphi = \tan^{-1}\dfrac{d_N}{d_S} =$ defined to be 0

UNIVERSAL-DENOISER CONTEXT-MODELING COMPONENT AND CONTEXT-MODELING METHOD

TECHNICAL FIELD

The present invention is related to transmission of data through a noisy channel and, in particular, to a context-modeling component and context-modeling method used in a universal denoiser for recovering clean data from noisy data resulting from passing the clean data through a noisy data channel.

BACKGROUND OF THE INVENTION

Whenever information is electronically encoded as original, or clean, data, and then transferred from the data source to a data destination, noise may be introduced by the transfer process, resulting in alteration of the original, clean data and reception of the data by the data destination as noisy data. For example, when information is electronically encoded as a sequence of binary bits and sent through a communications network, such as a local Ethernet, to a destination node, there is a small probability that any given bit within the original, or clean, sequence of binary bits ends up being corrupted during transfer through the Ethernet, resulting in a "0" bit in the clean data being altered to a "1" bit in the noisy data received at the destination node, or a "1" bit in the clean data altered to a "0" bit in the noisy data received at the destination node. Although electronic communications media are classic examples of noisy channels, almost any type of data transfer or storage may result in data corruption, and therefore may be modeled as a noisy channel. For example, there is a small probability, associated with each bit of a block of binary data, that the bit will be altered when the block of data is stored and then retrieved from a hard disk, or even when the block of data is transferred from local cache memory to global random-access memory within a computer system. In general, redundant data, including check sums and cyclical redundancy codes, are embedded into data encodings to allow corrupted data to be detected and repaired. However, the amount of redundant data needed, and the accompanying costs and inefficiencies associated with redundant data, grows as the acceptable level of undetectable and/or unrepairable data corruption decreases.

In many cases, data corruption may occur prior to a point in a process at which redundant information can be embedded into a data signal to facilitate error detection and correction. As one example, a scanner that optically scans a printed document to produce a digital, electronic encoding of an image of the document can be viewed as a noisy channel in which discrepancies between the digitally encoded image of the document and the original document may arise. Such discrepancies may be introduced by a variety of optical and electronic components within the scanner that focus an optical image of the document onto a light-detecting component that transforms the detected optical image into an electronically encoded image of the document. When the digitally encoded image of the document is displayed or printed, different types of noise may be perceived as graininess, irregularities along the edges of text characters or objects within graphical images, uneven shading or coloration, random speckling, or other such visually distinguishable differences between the printed or displayed version of the digitally encoded data and the original document.

Denoising techniques can be applied to a noisy, digitally encoded image in order to produce a denoised, digitally encoded image that more accurately represents the original document that was scanned to produce the noisy, digitally encoded image. Denoising techniques may also be applied to data received over channels that are too noisy for recovery of the original data using the redundant data incorporated within the data to facilitate error correction. A wide variety of additional applications of denoising techniques have been identified and are well known. Recently, a discrete universal denoiser method ("DUDE") has been developed for denoising the noisy output signal of a discrete, memoryless data-transmission channel without relying on knowledge of, or assumptions concerning, the statistical properties of the original, or clean, signal input to the discrete, memory-less channel. Even more recently, the DUDE method has been extended for denoising continuous tone images, such as scanned documents or images. The extended DUDE method is referred to as the "DUDE-CTI method," or simply as the "DUDE-CTI." The DUDE-CTI method is intended for use in a variety of image and data scanning, processing, and transfer applications. The DUDE-CTI method has shown promising results for certain types of noisy channels. An efficient DUDE-CTI depends on collections of symbol-occurrence statistics for each of a large number of different pixel contexts observed within an image. Because of the large number of possible contexts, an expedient approach is to coalesce individual contexts into groups, or classes, of contexts, and to then collect statistics on a context-class basis, rather than for individual contexts. However, such methods depend on efficient and effective assignment of contexts to context classes. Information-theory researchers, denoising-method developers, and manufacturers and users of a variety of data acquisition, storage, processing, and transfer devices that employ denoisers, continue to seek efficient and effective context-modeling methods and context-modeling components for generating context classes and symbol-prediction classes, assigning contexts to context classes and symbol-prediction classes, gathering statistics related to symbol occurrence within context-classes and symbol-prediction errors related to symbol-prediction-classes, and for noisy-symbol prediction.

SUMMARY OF THE INVENTION

In various embodiments of the present invention, a context-based denoiser is applied to each noisy-image symbol embedded within a context to determine a replacement symbol for the noisy-signal symbol. The context-based denoiser includes a context-modeling component that efficiently generates context classes and symbol-prediction classes, assigns individual contexts to context classes and symbol-prediction classes, collects symbol-occurrence statistics related to the generated context classes and symbol-prediction classes, and, optionally, generates noisy-symbol predictions.

BRIEF DESCRIPTION OF THE DRAWINGS

FIG. 7 illustrates computation of an error $e_i$ for a symbol $z_i$ observed within a context $C_i$ in noisy signal.

FIG. 8 illustrates accumulation of error information for a particular context during analysis of a noisy image signal.

FIG. 16 illustrates the computation of an estimate of the distortion produced by replacing symbol $a_k$ within context C in a noisy signal by the replacement symbol $a_j$.

FIG. 17 illustrates a symbol-replacement function $g(C,z)$.

FIG. 33 illustrates calculation of a textured bitmap.

DETAILED DESCRIPTION OF THE INVENTION

The present invention concerns methods and systems for denoising noisy signals received through noisy channels without information regarding the originally transmitted, clean signal. Methods and systems of the present invention are particularly well suited for denoising images corrupted by noise that can be modeled as a number of independent and identically distributed Gaussian random variables, or by various other types of random variables distributed according to other types of statistical distributions. The denoising methods and systems of the present invention are discussed below with reference to a document-scanning application, but these methods and systems are widely applicable to a variety of denoising applications, including denoising of transmitted, stored, and processed images, as well as denoising of general signals each comprising an ordered sequence of symbols selected from a finite symbol alphabet. In a first section, below, a general description of denoising is provided. In a following section, embodiments of the present invention are discussed in detail.

Denoising

In various embodiments of the present invention, each symbol of a noisy signal, received through a noisy channel, is considered within a well-defined context of neighboring symbols. A noisy signal can be analyzed in a first pass to assign each symbol to a context class and to collect prediction-error statistics for context classes that allow, in a subsequent pass, likely clean-signal symbols corresponding to each noisy-signal symbol to be predicted.

Figure 1:
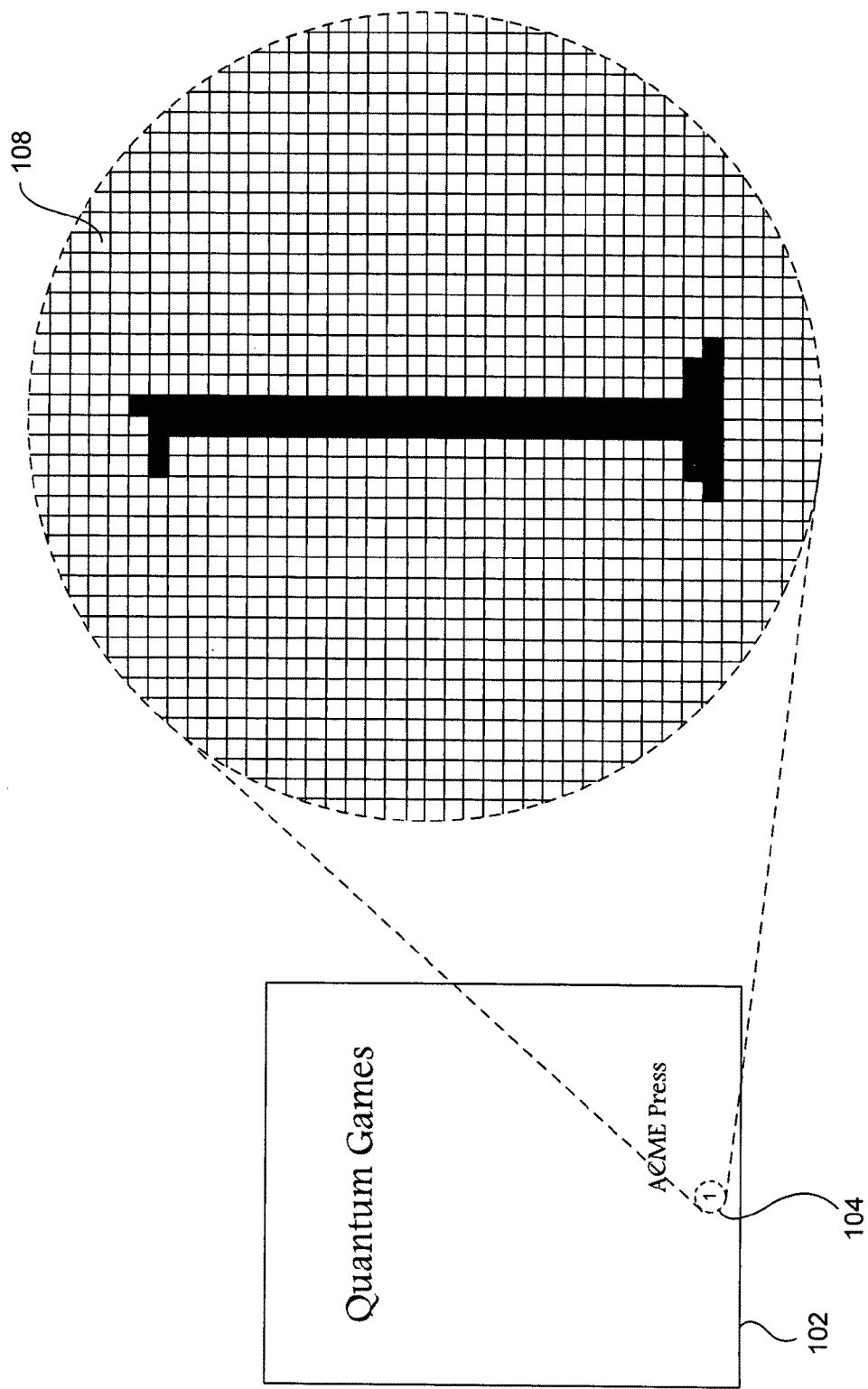
FIG. 1 illustrates digital encoding of a printed document to produce a clean image signal.

FIG. 1 illustrates digital encoding of a printed document to produce a clean image signal. In FIG. 1, a displayed image 102 of a digitally encoded title page is shown, with a small disk-like region 104 of the displayed document shown at a higher magnification 106. The document is displayed as an array of square pixels, such as pixel 108, and the digital encoding of the document comprises a sequence of integers, each integer representing an intensity value of a corresponding pixel. Commonly, for multi-level document images, pixel values range over a grayscale range from 0, indicating black, to 255, indicating white, with a continuous range of intermediate gray tones encoded by the integers 1-254. The integers 0-255 can therefore be considered to be symbols of a 256-symbol alphabet. Different techniques may be used to encode colored images. In one technique, three different grayscale-like encodings are used to encode intensity values of three primary colors, and the three different encodings are simultaneously displayed or rendered by a three-primary-color display or rendering device. Alternatively, a larger range of integer values may be used to encode a full range of color and intensity values in a single integer field. Thus, a pixel corresponds to a small region of a displayed or printed image, and the integer value associated with a pixel in a digitally encoded image represents the intensity, or both the color and intensity, for display or rendering of the pixel on a display or rendering device.

Figure 2:
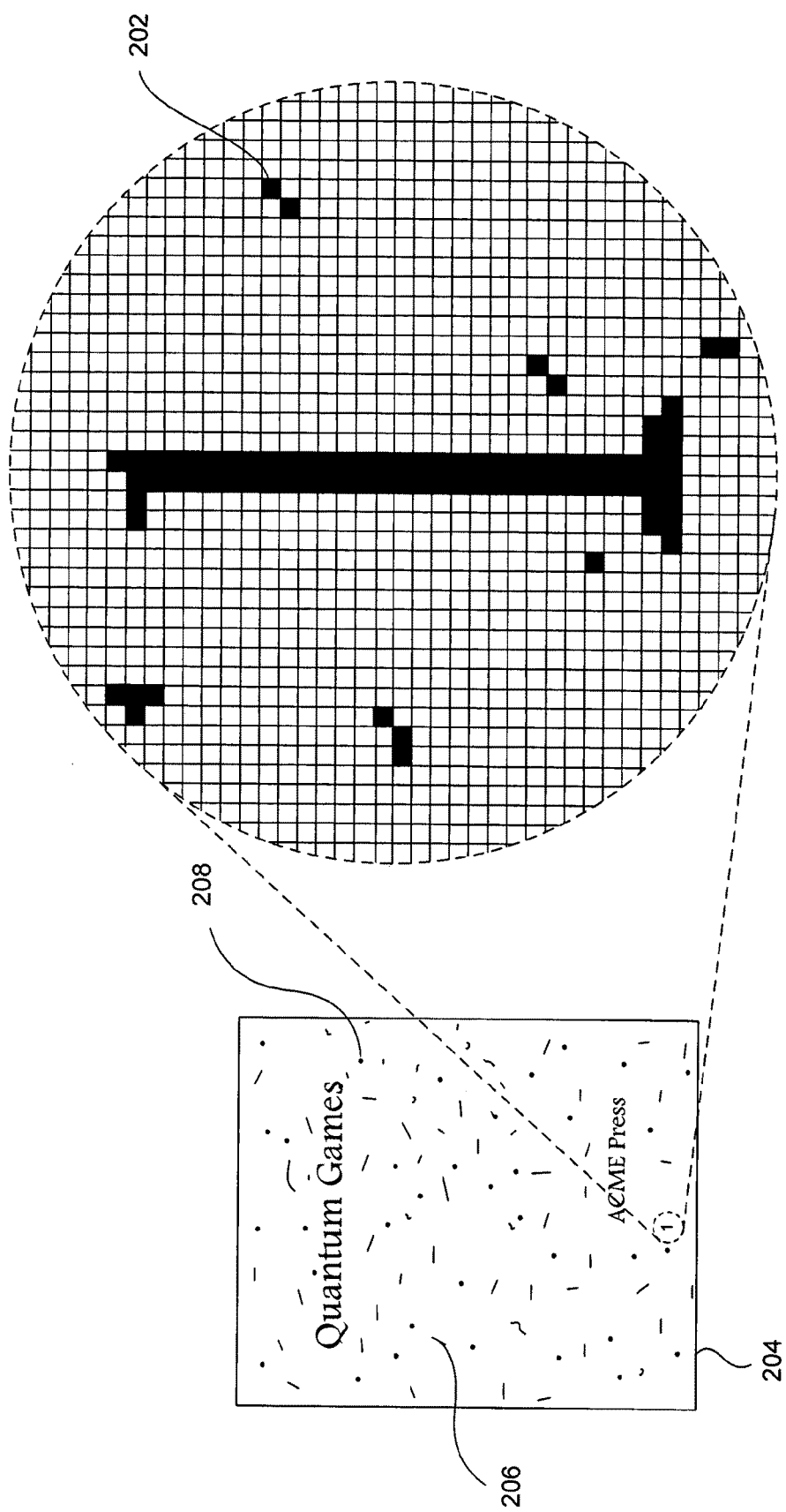
FIG. 2 illustrates a noisy signal corresponding to the clean image signal discussed with reference to in FIG. 1.

A printed document that is to be scanned by a scanning device can be considered as a clean signal. In other words, the printed document can be viewed as a large set of pixel-intensity values that, when displayed or printed, would appear visually indistinguishable from the original, printed document. The pixel data actually obtained as a result of scanning may be considered to be a noisy signal. FIG. 2 illustrates a noisy signal corresponding to the clean image signal discussed with reference to in FIG. 1. In comparing FIG. 2 to FIG. 1, it is easily observed that a number of pixels, such as pixel 202, have intensity values different from the values that the pixels would be expected to have based on the original, clean image shown in FIG. 1. The corresponding noisy image 204 is seen to have a number of visually discernable distortions, such as streaks 206 and speckles 208. In a scanning application, the original document represents the clean image signal, and the digitally encoded document produced by scanning the original document represents the noisy image signal. In various other applications, the clean signal may be an initial, digitally encoded document or other information source, and the noisy signal may be the corresponding digitally encoded document or other information source received following transmission of the clean signal through a communications medium or retrieved following storage of the clean signal in a volatile or non-volatile electronic data-storage device.

Figure 3A:
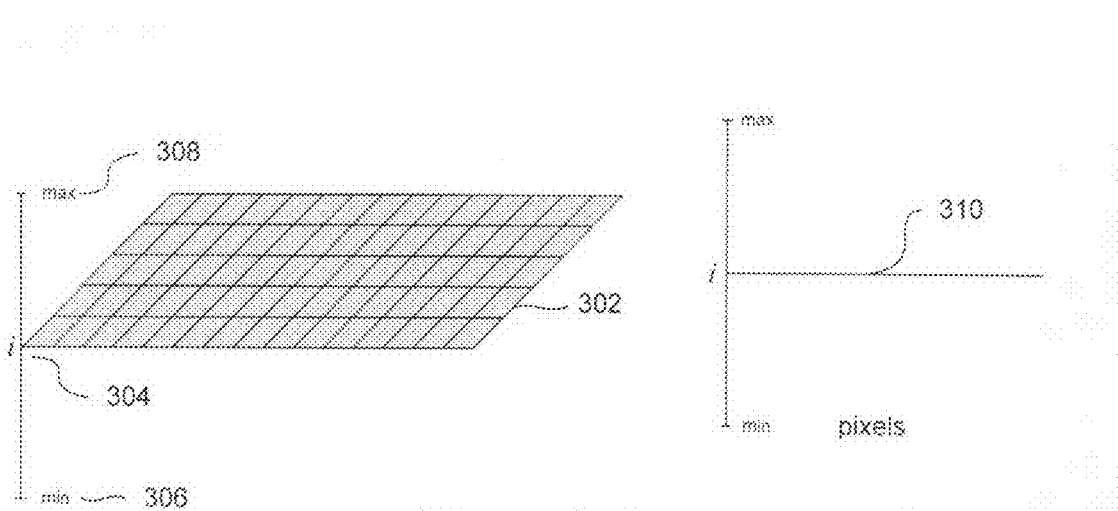
FIGS. 3A-C illustrate salt-and-pepper noise and Gaussian noise.
Figure 3B:
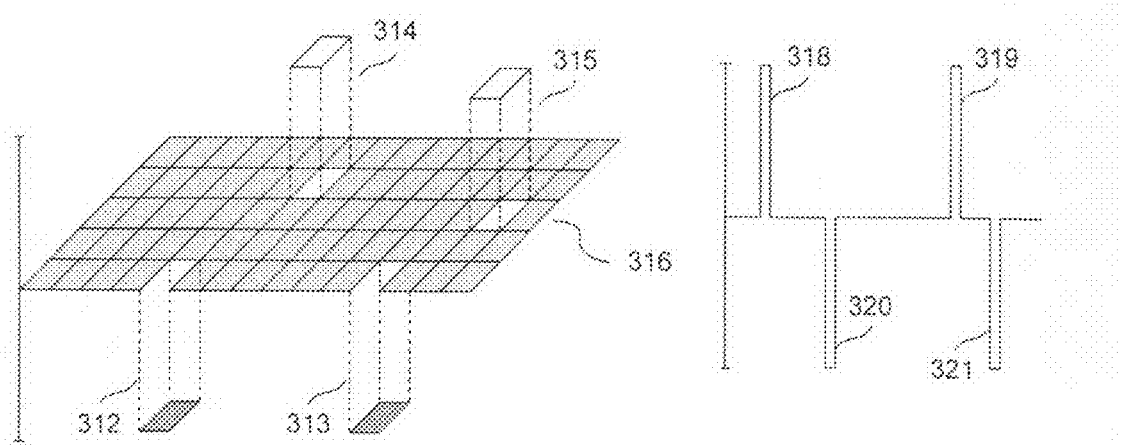
Figure 3C:
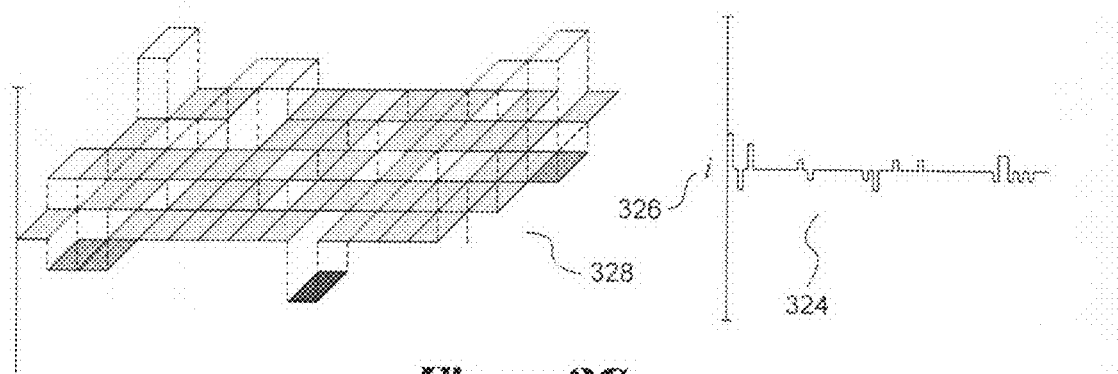

FIGS. 3A-C illustrate salt-and-pepper noise and Gaussian noise. FIG. 3A shows a small portion of a digitally encoded image 302, all pixels of which have a uniform intensity value i 304 with respect to a range of pixel-intensity values from a minimum value (306 in FIG. 3) to a maximum value (308 in FIG. 3). A two-dimensional graph of the intensity values of individual pixels from the region, in which pixels are taken in some particular order from the two-dimensional image, produces a straight, horizontal line 310. FIG. 3B illustrates salt-and-pepper noise added to the small region of uniform pixel intensity shown in FIG. 3A. Salt-and-pepper noise can be modeled as independent probabilities, associated with each pixel, that the intensity value associated with the pixel is altered, or corrupted, by a noisy channel to have either a minimum intensity value or a maximum intensity value. In FIG. 3B, two pixels 312-313 have intensity values altered to the minimum intensity value and two pixels 314-315 have intensity values altered to the maximum intensity value. A two-dimensional graph of the pixel intensity values for the pixels of the small region 316 of an image with added salt-and-pepper noise is seen to exhibit a number of narrow spikes 318-321 corresponding to pixels with altered, or corrupted, intensity values. FIG. 3C illustrates Gaussian noise added to the small region of uniform pixel intensity shown in FIG. 3A. Gaussian noise may be modeled as the addition of a value of an independent Gaussian random variable, associated with each pixel, to the pixel intensity value of the pixel. In one convenient mathematical model, the Gaussian random variables are considered to be independent, and to be identically distributed. Actual Gaussian-like noise produced by various types of noisy channels may not exhibit independent and identical distributions of alterations in pixel intensities, but a model employing independent and identically distributed Gaussian random variables often serves as a reasonable approximation for different types of Gaussian-like noise, and provides a tractable and computable mathematical framework for analysis of the noise. A two-dimensional graph of the pixel intensity values of the small region of an image shown in FIG. 3A with added Gaussian noise shows random fluctuations 324 about an expected pixel intensity i 326 for the small region of the image 328.

A discrete universal denoiser for continuous-tone images ("DUDE-CTI") has been developed for general denoising of digitally encoded images, and other noisy data. The DUDE-CTI method is next described, both to establish a conceptual framework for the following description of the present invention, as well as to contrast the approach represented by the DUDE-CTI to the methods and denoisers of the present invention.

Figure 4A:
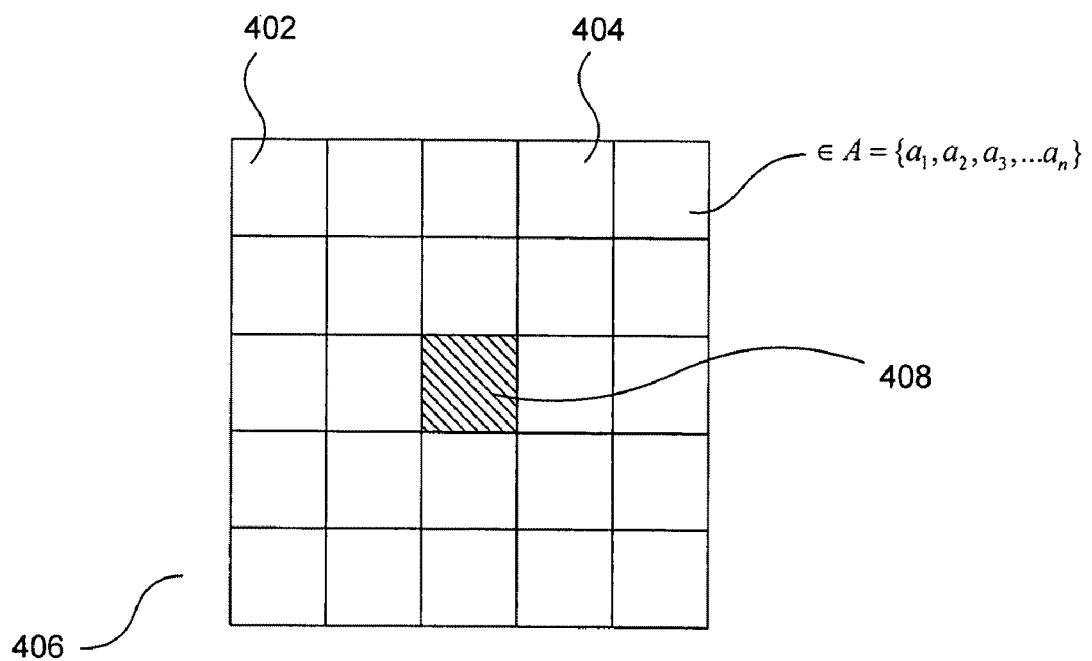
FIGS. 4A-B illustrate two different, well defined context neighborhoods that may be employed during analysis and denoising of image signals.
Figure 4B:
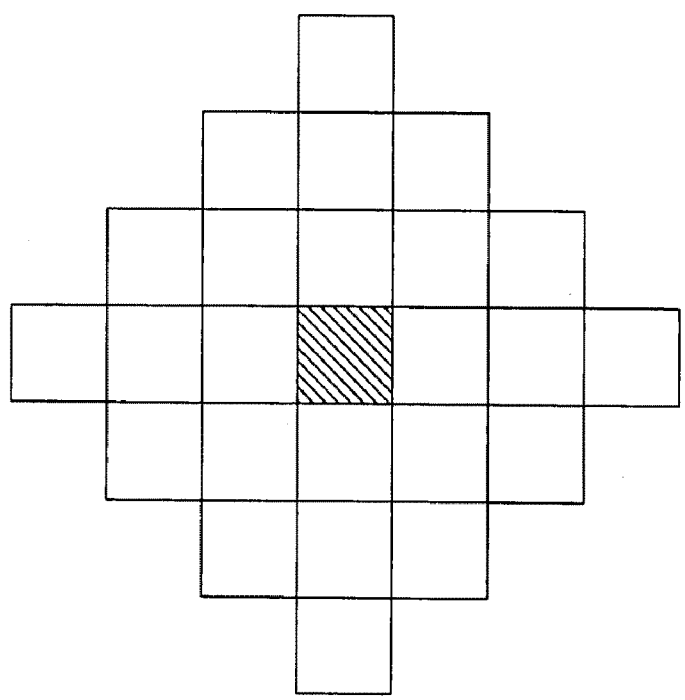

In both the DUDE-CTI and the context-based denoisers of the present invention, an image signal, or digitally encoded image, is considered to be a two-dimensionally-ordered sequence of symbols, each symbol mapped to one of a finite set of numerical values. Most of the symbols in a signal have well-defined two-dimensional contexts, or neighborhoods, and these contexts play a significant role in both the DUDE-CTI and the denoisers of the present invention. FIGS. 4A-B illustrate two different, well defined contexts that may be employed during analysis and denoising of image signals. Each square, such as square 402 in FIG. 4A, represents a single pixel intensity value within an image signal. As shown in FIG. 4A, the pixel intensity value associated with a pixel, such as the pixel intensity value associated with pixel 404, is considered during analysis and denoising as a symbol $z_i$ chosen from a finite alphabet $A \equiv \{a_1, a_2, a_3, \ldots a_n\}$ where the index i indicates the order, or position, of the pixel within the signal. The pixel intensity value, or symbol $z_i$, associated with pixel i may be any one of the symbols in alphabet A. For common encodings of multi-level images, the symbols in A, $\{a_1, a_2, a_3, \ldots a_n\}$, are the unsigned, single byte values 0, 1, ..., 255. In each of several passes, the DUDE-CTI and the denoisers of the present invention consider each symbol within a signal with respect to the symbol's context. The context 406 shown in FIG. 4A for a currently considered pixel, or central symbol, 408 comprises the pixel values contained in a 5×5 square region surrounding the currently considered pixel 408, but not including the currently considered pixel. In other words, the context for symbol 408 comprises the values of the 24 nearest symbol neighbors within the image signal containing currently considered symbol 408. In the discussion of the DUDE-CTI denoiser, the currently considered symbol, such as symbol 408 in FIG. 4A, is referred to as the "central symbol" of the context surrounding the symbol, but the context is not considered to include the central symbol.

Many different context shapes and sizes are possible. FIG. 4B shows an alternative 24-symbol context for an image signal. In general, the useful information content per symbol of a context may increase with increasing size up to a context size of maximum useful information per symbol, and then decrease with context sizes greater than the context size of maximum useful information per symbol. Analysis and denoising of noisy signals involves frequent context-based computations, with execution times increasing with increases in the context size employed in the analysis. Therefore, efficiency constraints may constrain context sizes to sizes, in symbols, below the maximum useful information per symbol size. Moreover, the maximum useful information per symbol context size may vary with the image signals being denoised.

Figure 5A:
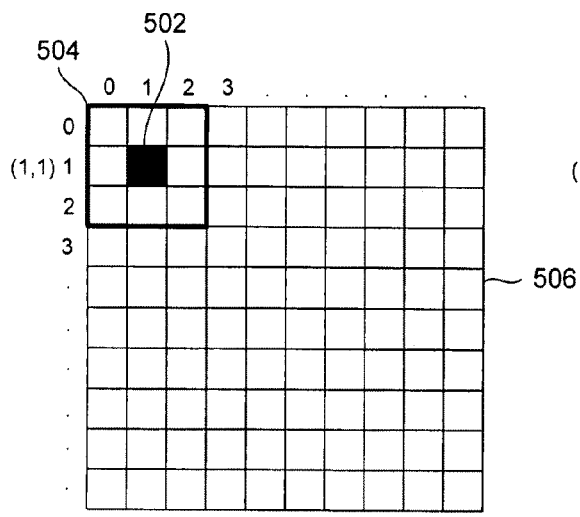
FIGS. 5A-D illustrate context usage during analysis and denoising of noisy signals.
Figure 5B:
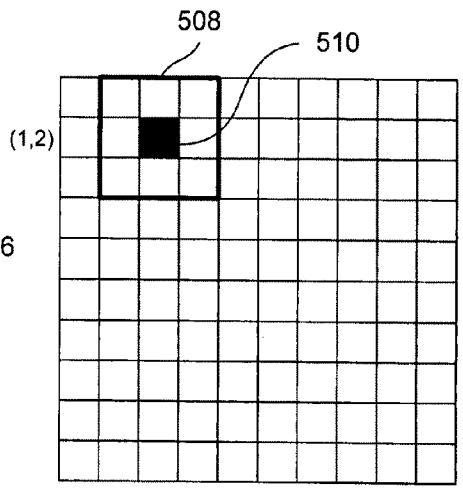
Figure 5C:
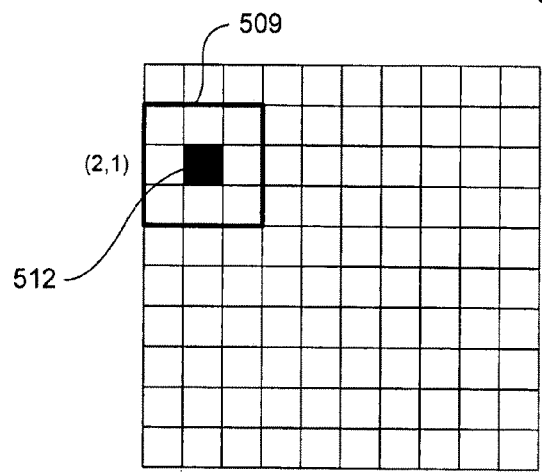
Figure 5D:
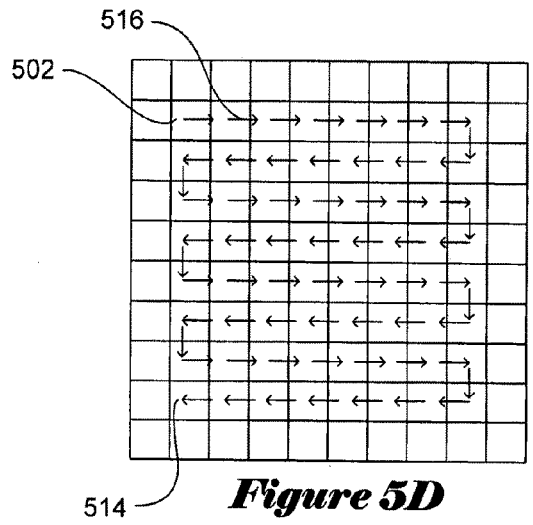

FIGS. 5A-D illustrate context usage during analysis and denoising of noisy signals. In FIG. 5A, the uppermost and leftmost symbol 502 with a full, 3×3 symbol context 504 within a small, square image 506 is shown. In certain types of analysis and denoising, special contexts are used for edge symbols, such as the first and last symbols of each row and column of the image. In other techniques, including the technique illustrated in FIGS. 5A-D, only symbols with full contexts are analyzed. FIGS. 5B and 5C show the 3×3 contexts 508 and 509 around the next rightmost symbol 510 and the next lowest symbol 512 with respect to symbol 502 in FIG. 5A. As shown in FIG. 5D, a given pass, or stage, of analysis or denoising may involve successive consideration of each full-context symbol within an image signal, starting with a first symbol 502 and proceeding to a final symbol 514. In FIG.

5D, small arrows, such as arrow 516, indicate each step of a pass in which each symbol is considered. In alternate techniques, all of the symbols within a signal may be considered, with specialized asymmetrical contexts employed for those symbols lacking a full context, or neighborhood.

Images are generally 2-dimensional data sets, and analysis and denoising methods for images therefore frequently use 2-dimensional contexts symmetrically disposed with respect to the central symbol. In other types of data sets, other types of contexts may be appropriate. For example, in digitally encoded text files, comprising essentially a one-dimensional series of symbols, a single length of symbols that include the central symbol may be employed as a context. Other types of signals may profitably employ more complex, non-contiguous or higher-dimensional contexts.

Figure 6:
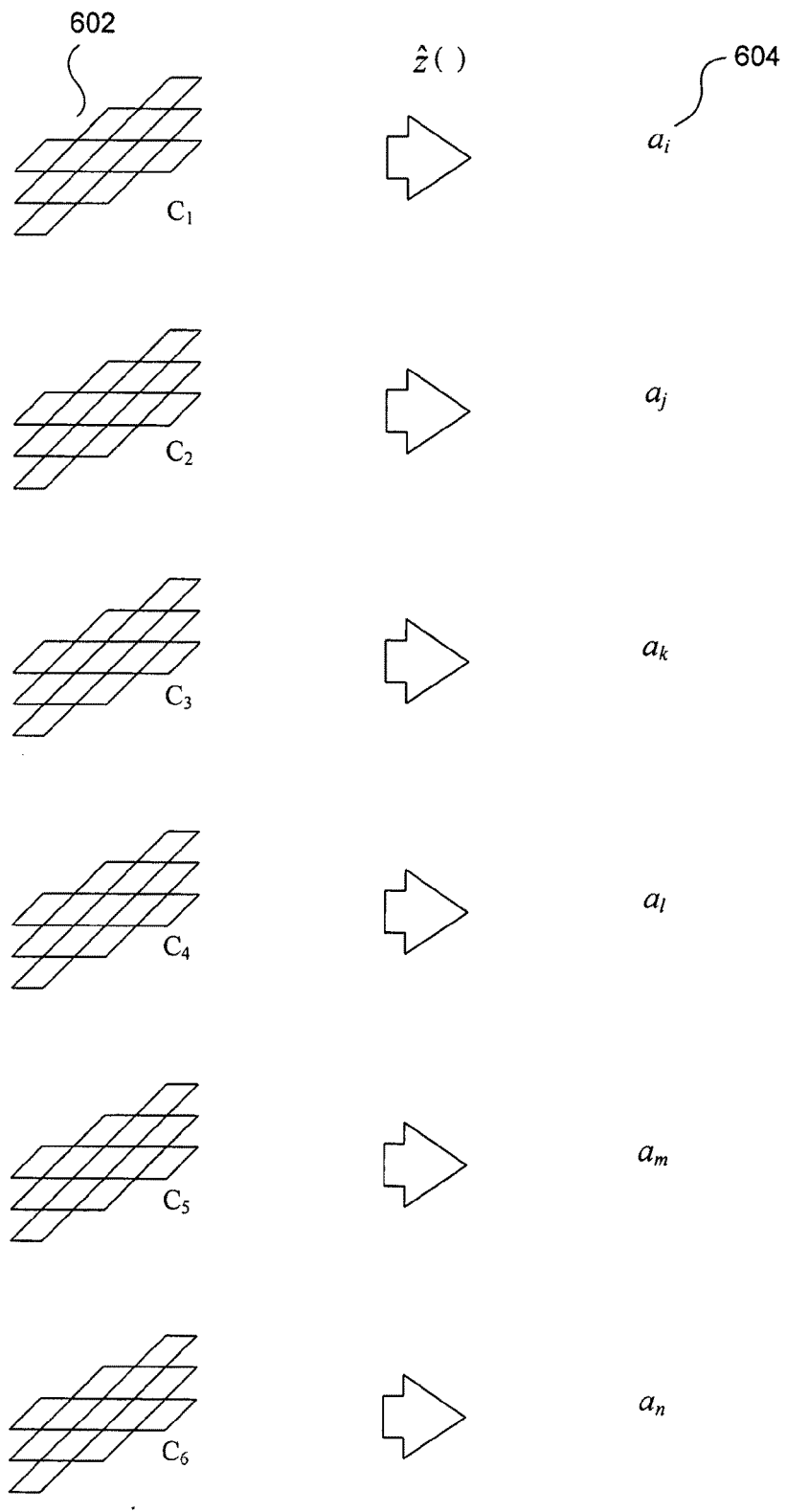
FIG. 6 illustrates the predictor function $\hat{z}(\ )$.

The DUDE-CTI method employs a central-symbol predictor function $\hat{z}(\,)$. FIG. 6 illustrates the predictor function $\bar{z}(\,)$. As illustrated in FIG. 6, the $\hat{z}(\,)$ function receives, as a sole argument, a context, such as context $C_1$ 602 in FIG. 6, from a noisy signal and returns a symbol 604 predicted to be the central noisy symbol. In other words, as shown in FIG. 6, for each possible context that may occur in a noisy signal, the predictor functions $\hat{z}(\,)$ returns a corresponding central symbol for the context.

The DUDE-CTI method computes an error $e_i$ for each symbol $z_i$ in the noisy signal as the difference between the observed symbol $z_i$ and the symbol predicted by the predictor function $\hat{z}(\,)$ for the context $C_i$ for the symbol $z_i$. FIG. 7 illustrates computation of an error $e_i$ for a symbol $z_i$ observed within a context $C_i$ observed in a noisy signal.

FIG. 8 illustrates accumulation of error information for a particular context during analysis of a noisy image signal. The error-information accumulation in FIG. 8 is context specific. As discussed later, more efficient DUDE-CTI implementations use cluster-specific error-information accumulation. As shown in FIG. 8, a data structure, or vector, $q_{C_i}^T$ 802 is maintained for each possible context $C_i$ in order to count the occurrences of different possible error values computed for the context $C_i$ during analysis of a noisy image signal. If the predictor function $\hat{z}(C_i)$ predicts the symbol $a_j$ for context $C_i$, then, according to the error equation $e_i = z_i - \hat{z}(C_i)$, the error values that can be computed for context $C_i$ range from $a_1 - a_j$ 804 to $a_n - a_j$ 806.

In a first pass of the DUDE-CTI denoiser, each symbol in a noisy image signal 808 is considered, and the error for each considered symbol is tabulated in the appropriate vector $q_C^T$ for that symbol. For example, in FIG. 8, an error $e_i$ 810 is computed from the first considered symbol $z_i$ 812 and associated context $C_i$, and the computed error $e_i$ is used to compute the position of a counter 814 within the vector $q_{C_i}^T$ 802 that is updated to reflect the occurrence of error $e_i$ in the noisy image signal 808. The computed error $e_i$ 810 can be viewed as being offset from a counter 816 within the vector $q_{C_i}^T$ 802 corresponding to a computed error of 0. As each symbol is considered during the first pass of the DUDE-CTI method, the vector $q_C^T$ corresponding to the observed context of the symbol is updated to reflect the occurrence of the error e computed from the symbol and context observed for the symbol within the noisy image signal. After the first pass of the DUDE-CTI method, each vector $q_C^T$ generally stores a histogram more or less symmetrically disposed about the counter within the vector $q_C^T$ corresponding to a computed error value e of 0. For example, in FIG. 8, the contents of the counters within vector $q_{C_i}^T$ 802 are plotted above the vector $q_{C_i}^T$ in a two-dimensional plot 818, and form a histogram with a central, highest peak 820 corresponding to the counter 816 within vector $q_{C_i}^T$ 802 representing a computed error of 0. In other words, the symbol predicted by the predictor function $\hat{z}(\,)$ for a given context $C_i$ is generally the symbol most often observed within the context $C_i$ in the noisy signal. Thus, following the first pass of the DUDE-CTI denoiser method, histograms of observed errors for each context are collected.

Unfortunately, when contexts of even modest size are used, a typical image will not contain a sufficient number of occurrences of each context to collect reliable, well-formed histograms of error occurrences, such as the histogram shown in FIG. 8. For this reason, the DUDE-CTI method employs context clustering in order to collect sufficient numbers of error occurrences for each context.

Figure 9:
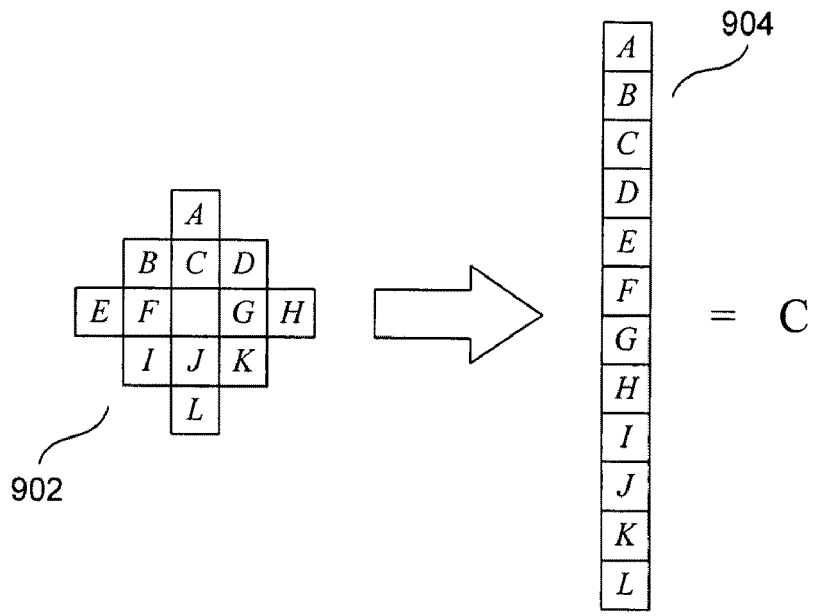
FIG. 9 illustrates a context vector.

FIG. 9 illustrates a context vector. It is convenient to consider context vectors for the mathematical steps of the DUDE-CTI method. As shown in FIG. 9, the symbols that occur within a context 902 may be ordered into a vector 904 according to some ordering method that is uniformly applied to all contexts. In FIG. 9, symbols A-L from 2-dimensional context 902 are re-ordered into a column vector 904 by a left-to-right, top-down traversal of the 2-dimensional context 902. The ordering method is arbitrary, and different ordering methods may be mathematically or programmatically convenient for different types of contexts. A context vector may be considered to be a row vector or a column vector, depending on conventions chosen for the analysis using the context vector. In other words, the convention is arbitrary.

Figure 10:
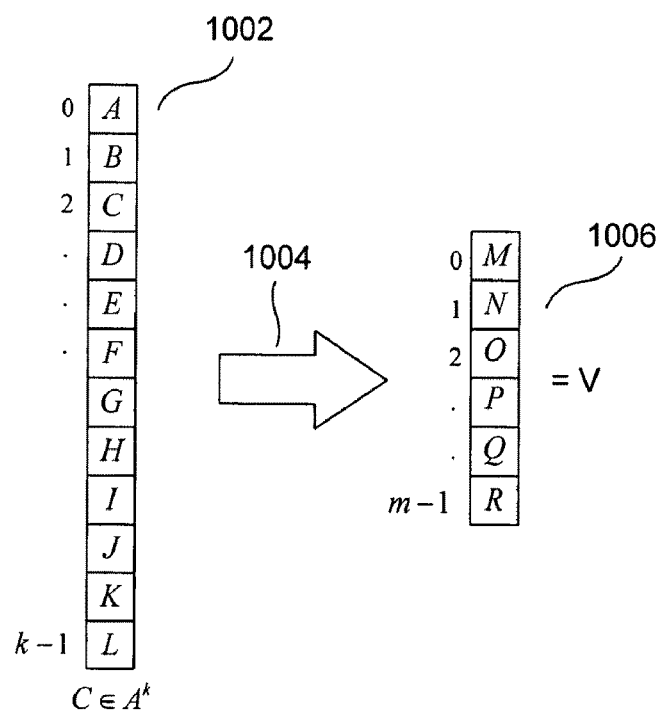
FIG. 10 illustrates a context-vector to cluster-index mapping.

Context clustering can be thought of as a many-to-one mapping, or binning, of context vectors in a context-vector space into a set of context-cluster indices. FIG. 10 illustrates a context-vector to cluster-index mapping. In FIG. 10, a context vector 1002 $C \epsilon A^k$ of dimension k is mathematically transformed 1004 to a cluster index V 1006 with a range of values expressible using a sequence of m symbols over some alphabet (e.g. binary), where m is less than the dimension k of the context vector.

Figure 11:
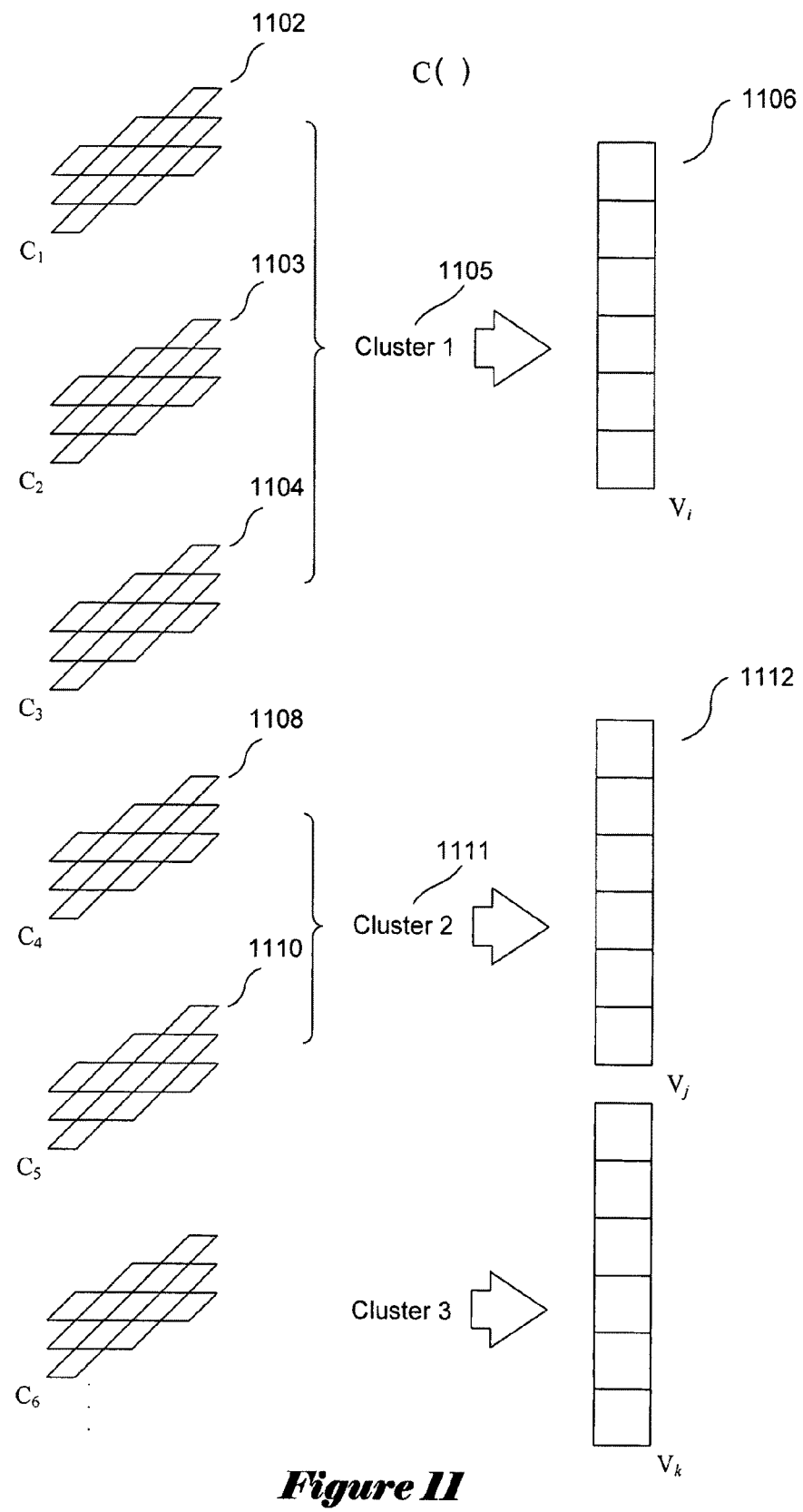
FIG. 11 illustrates a context-clustering function $C(\ )$ used by various embodiments of the DUDE-CTI denoising method.

FIG. 11 illustrates a context-clustering function $C(\,)$ used by various embodiments of the DUDE-CTI denoising method. As shown in FIG. 11, the context-clustering function $C(\,)$ maps a given context, supplied as a sole argument, that is expected to produce a particular type of error histogram to a particular cluster to which other contexts that are expected to produce similar error histograms may be mapped. The context is, in turn, mapped to a cluster index. Multiple contexts are generally mapped to any given cluster by the context-clustering function $C(\,)$. For example, in FIG. 11, three contexts 1102-1104 are mapped by the context-clustering function $C(\,)$ to Cluster 1 1105, in turn mapped to, or associated with, cluster index $V_i$ 1106. Similarly, contexts 1108 and 1110 are both mapped by the context-clustering function $C(\,)$ to Cluster 2 1111, in turn mapped to, or associated with, cluster index $V_j$ 1112. The number of contexts mapped to any particular cluster may vary, depending on the context-clustering function $C(\,)$. Any particular DUDE-CTI embodiment may use any of a number of different context-clustering functions, although suitable context-clustering functions generally have the property of mapping contexts expected to produce similarly shaped error histograms, such as the error histogram shown in FIG. 8, to a common cluster. In other words, all the contexts mapped to any particular cluster by a suitable context-clustering function would produce similarly shaped error histograms were the first pass of the DUDE-CTI method executed on a sufficiently large noisy image signal to collect sufficient occurrence counts of errors for each context to generate well-formed histograms for each context.

Figure 12:
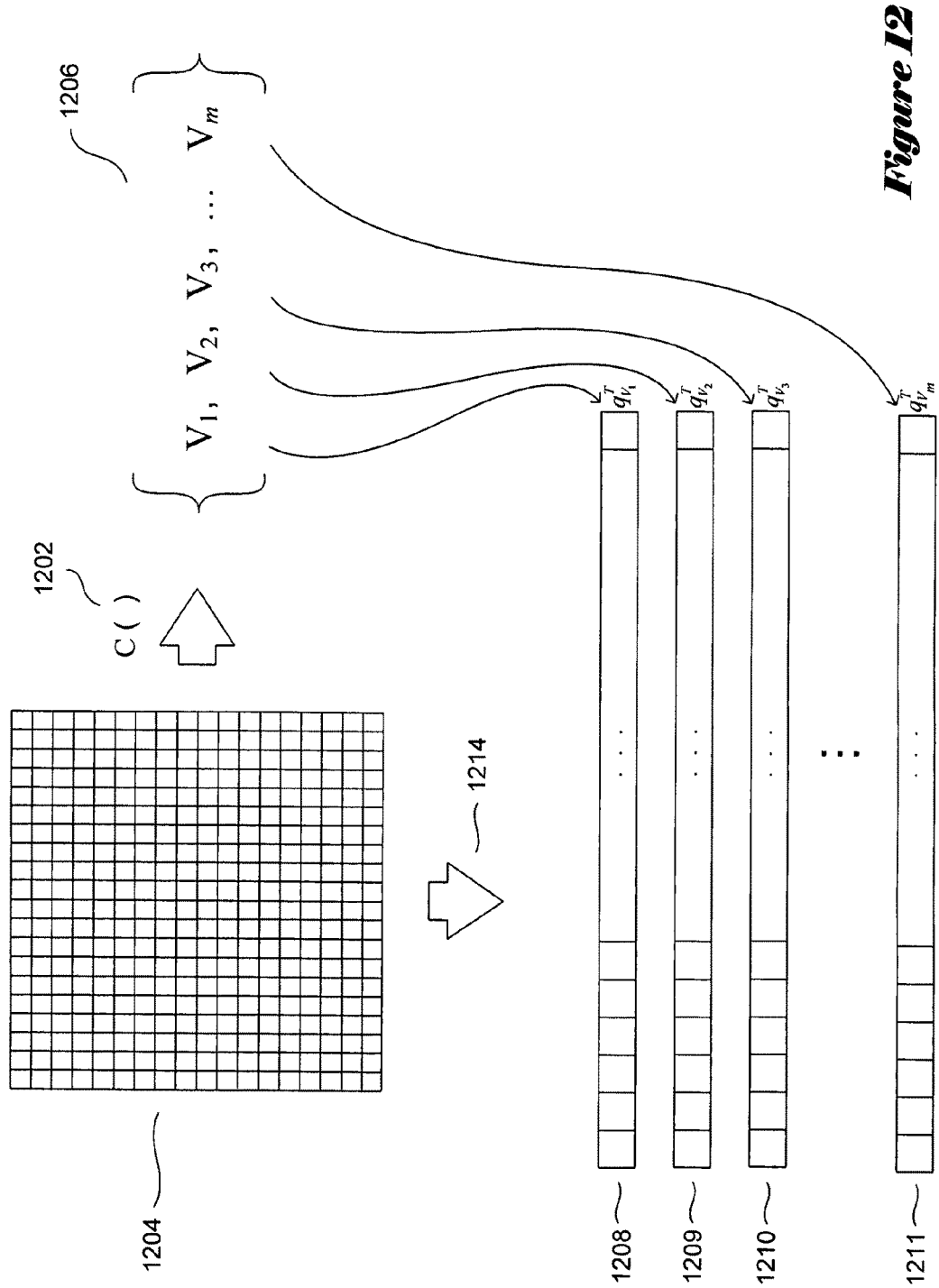
FIG. 12 illustrates the use of clustering by the DUDE-CTI method during a first pass, in which error histograms are prepared.

FIG. 12 illustrates the use of clustering by the DUDE-CTI method during a first pass, in which error histograms are prepared. As shown in FIG. 12, a context-clustering function C( ) 1202 is employed to map contexts occurring within a noisy image signal 1204 to a set of clusters 1206. Then, an occurrence-count vector $q_{V_i}^T$ 1208-1211 is instantiated and initialized for each possible cluster $V_i$. Finally, each symbol in the noisy image signal 1204 is analyzed 1214 in the first pass to compute and tabulate the occurrence of computed errors, on a cluster-by-cluster basis. The errors are computed as discussed above, with reference to FIGS. 7 and 8, except that all errors observed for all contexts that belong to a given cluster $V_i$ are commonly tabulated together in the vector $q_{V_i}^T$ for that cluster, rather than being separately tabulated in context-associated vectors $q_C^T$, as was done in FIG. 8. Thus, clustering allows a much larger number of error occurrences to be tabulated together in each histogram generated during analysis of a given noisy image signal. However, common tabulation of error occurrences in cluster-associated vectors $q_V^T$ is only meaningful if the shapes of the error histograms that would be separately produced for all contexts associated with the cluster are similar.

Figure 13:
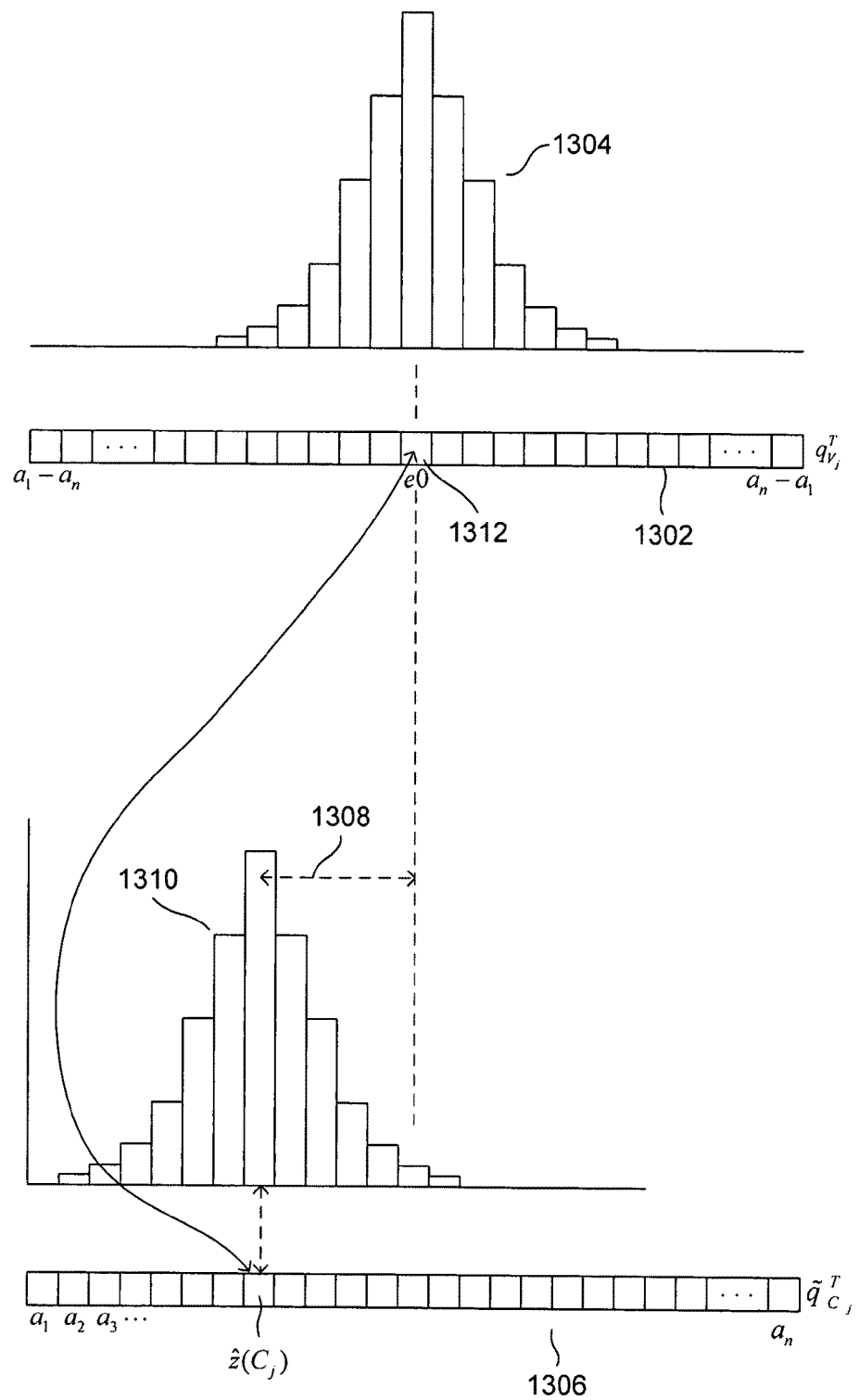
FIG. 13 illustrates generation of context-specific symbol-occurrence probability distributions $q_C^T$ from cluster-associated error-occurrence vectors $q_V^T$ collected during the first pass of a cluster-based DUDE-CTI method.

FIG. 13 illustrates generation of context-specific symbol-occurrence probability distributions $\tilde{q}_C^T$ from cluster-associated error-occurrence vectors $q_V^T$ collected during the first pass of a cluster-based DUDE-CTI method. In FIG. 13, a cluster-associated error-occurrence vector $q_{V_i}^T$ 1302 is shown at the top of the diagram, along with a histogram plot 1304 of the values stored in the counters within the cluster-associated vector $q_{V_i}^T$, using the illustration convention employed in FIG. 8. A context-specific symbol-occurrence probability distribution $\tilde{q}_{C_j}^T$ for a context $C_j$ associated with cluster $V_j$ 1304 is generated in FIG. 13 by copying the contents of the cluster-associated error-occurrence vector $q_{V_i}^T$ 1302 into the counters of context-associated context-specific symbol-occurrence probability distribution $\tilde{q}_{C_i}^T$. However, rather than copying the error-occurrence counts from cluster-associated vector $q_{V_i}^T$ into corresponding counters of context-associated context-specific symbol-occurrence probability distribution $\tilde{q}_{C_i}^T$, each copy involves an offset 1308, so that the context-specific probability distribution 1310 is centered about the symbol value $\tilde{z}(C_j)$ predicted by the predictor function for the context, rather than centered at the position 1312 corresponding to a computed error of 0 in the cluster-specific histogram 1304. In other words, the final, context-specific vector $\tilde{q}_{C_i}^T$ represents a probability distribution for the occurrences of symbols $a_1, a_2, \ldots a_n$ from the alphabet A for all occurrences of the context $C_j$ in the noisy image signal, estimated from the probability distribution observed for the cluster to which the context is mapped by the context-clustering function C( ). The copy operation may therefore be accompanied by a normalization, to provide a normalized, estimated probability distribution, and a domain-related adjustment, since the domain of $q_V^T$ is generally twice as large as the symbol alphabet size n, which is the domain of $\tilde{q}_{C_j}^T$. Thus, the error-occurrence counts tabulated in common for each cluster are used to generate specific symbol-occurrence probability distributions $\tilde{q}_{C_j}^T$ for each context $C_j$.

Next, the DUDE-CTI denoiser generates a function g(C, z) that computes a replacement symbol $\hat{x}$ for a given central symbol z that occurs within context C observed in the noisy image signal. The replacement function g( ) can then be used in a second, symbol-by-symbol pass, to replace each symbol in the noisy image signal with a corresponding replacement symbol. The symbol replacement for each symbol in the noisy image signal is carried out independently. In other words, the contexts applied to the replacement function g( ) are the contexts observed in the noisy image signal, rather than partially symbol-replaced contexts. It should be noted that, in many cases, the replacement symbol x is identical to the corresponding observed symbol z in the noisy image signal.

Computation of the replacement function g( ) involves use of two matrices: (1) a matrix Π that represents a channel-noise model for the noise-inducing channel that generates symbol differences between the initial, clean image signal and the noisy image signal; and (2) a distortion matrix Λ that represents the distortions in a recovered image produced by substituting for symbol $a_i$ in the corresponding clean image signal any of the symbols $a_1, a_2, \ldots a_n$, in alphabet A.

Figure 14:
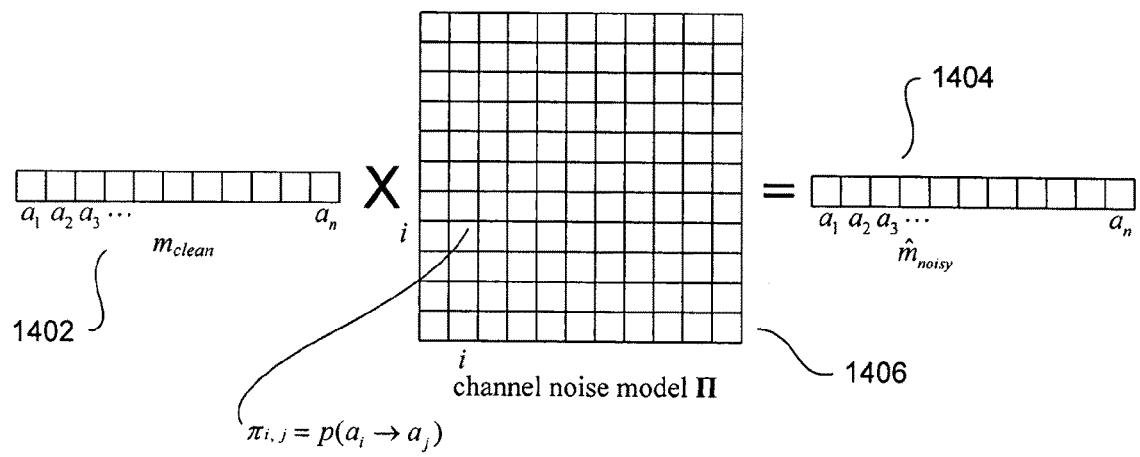
FIG. 14 illustrates a channel-noise-model matrix $\Pi$.

FIG. 14 illustrates a channel-noise-model matrix n. In FIG. 14, the row vector $m_{clean}$ 1402 contains counts of the occurrences of each symbol in alphabet A within the clean, original image signal. The row vector $m_{clean}$ is indexed by symbols from the alphabet A, $a_1, a_2, a_3, \ldots$ A corresponding row vector $m_{noisy}$, contains the counts of occurrences of the symbols of the alphabet A in the noisy image signal. Multiplication of the row vector $m_{clean}$ by the channel-noise-model matrix Π 1406 produces a derived row vector $\hat{m}_{noisy}$ 1404. Each element $\pi_{ij}$ of the channel-noise-model matrix Π contains the probability of the transition of the symbol $a_i$ to the symbol $a_j$ as the clean signal passes through the noisy channel modeled by the channel-noise-model matrix Π. In mathematical terms:

$$m_{clean} \Pi = \hat{m}_{noisy}$$

$$\hat{m}_{noisy}[i] = m_{clean}[1]p(a_1 \rightarrow a_i) + m_{clean}[2]p(a_2 \rightarrow a_i) + \ldots + m_{clean}[n]p(a_n \rightarrow a_i)$$

The derived vector $\hat{m}_{noisy}$ 1404 is expected to be fairly close, relative to the signal size, to the vector $m_{noisy}$ containing counts of symbols observed in a noisy signal. Provided that the channel-noise-model matrix Π is invertible, or an approximate or pseudo inverse of the matrix Π can be obtained by any of a number of matrix inversion methods, an observed vector $m_{noisy}$ including the counts of occurrences of symbols observed in a noisy signal can be multiplied by the inverse of the channel-noise-model matrix Π to produce approximate estimates of the probabilities of occurrences of symbols in the clean signal:

$$m_{clean} \approx m_{noisy} \Pi^{-1}$$

This approximation technique can be extended to vectors $\tilde{q}_{C_j}^T$ that include the derived probabilities of occurrences of symbols of the alphabet A observed in contexts $C_j$ in the noisy signal to produce estimates of probabilities of occurrence of symbols in the alphabet A in the clean signal corresponding to occurrences of the context $C_j$ in the noisy signal by multiplication of $\tilde{q}_{C_j}^T$ by the inverse of the channel-noise-model matrix Π, as follows:

$$\tilde{q}_{clean,C_j}^T \approx \tilde{q}_{C_j}^T \Pi^{-1}$$

Figure 15:
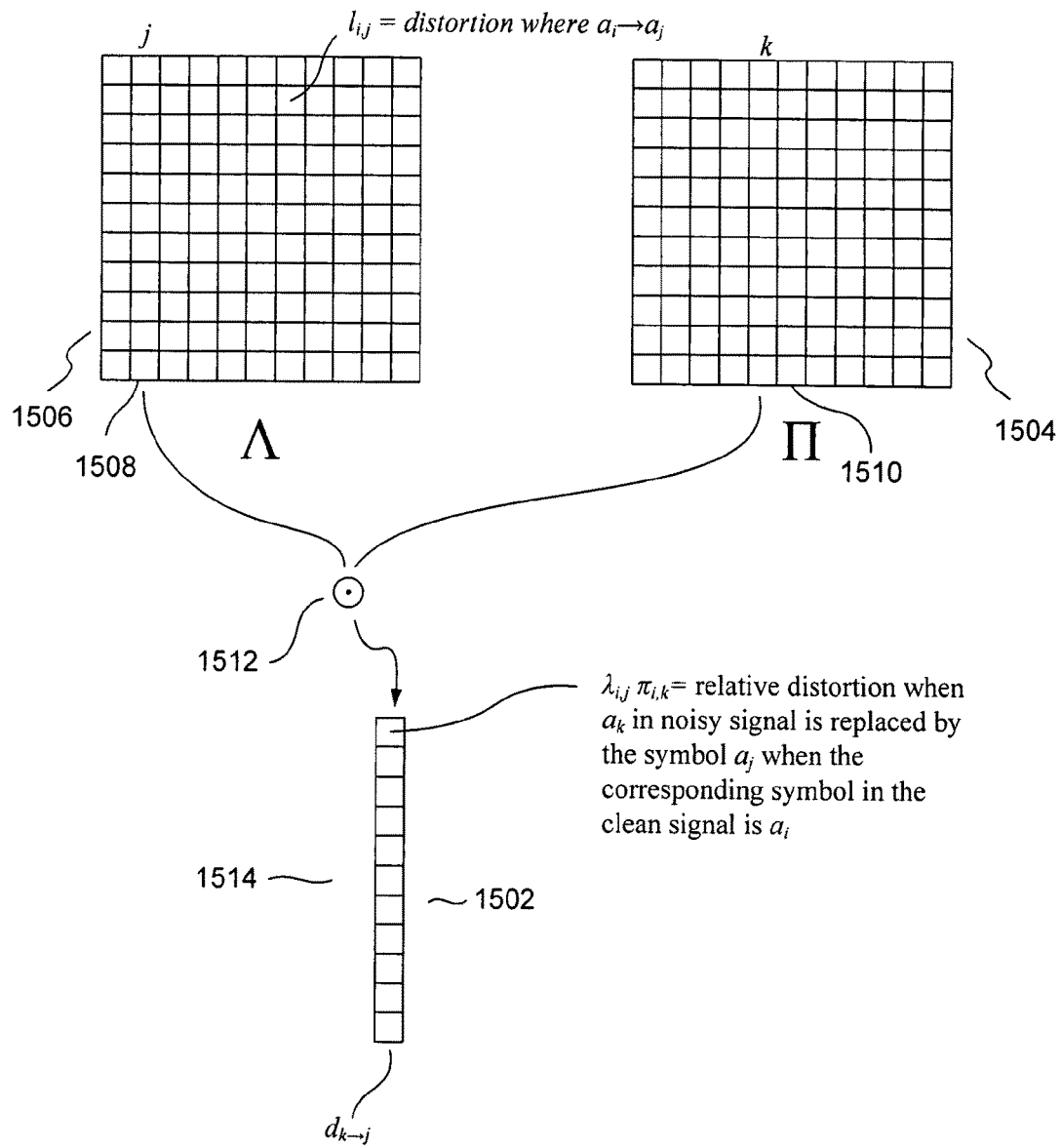
FIG. 15 illustrates construction of a relative distortion vector for replacement of a symbol $a_k$ in a noisy signal by a symbol $a_j$.

FIG. 15 illustrates construction of a relative distortion vector that numerically expresses the distortion expected from replacement of a symbol $a_k$ in a noisy signal by a symbol $a_j$. Construction of a relative distortion vector 1502 involves a column of the channel-noise-model matrix Π 1504, discussed above with reference to FIG. 14, as well as a column from the distortion matrix Λ 1506. Each element $\lambda_{i,j}$ in the distortion matrix Λ contains a numerical estimate of the distortion produced in an image when the symbol $a_i$ in the clean signal is replaced by the symbol $a_j$ in the noisy signal. When a column j 1508 is selected from the distortion matrix Λ and a column k is selected from the channel-noise-model matrix Π 1510, and the selected columns $\lambda_j$ and $\pi_k$ are combined by the Schur product operation 1512, the distortion vector $d_{k \rightarrow j}$ 1514 is produced. The Schur product is carried out by the multiplication of each element in the column $\lambda_j$ by the corresponding element in the $\pi_k$ column. Each element of the distortion vector $d_{k \to j}$, $\lambda_{i,j}$, $\pi_{i,k}$ includes a numerical estimate of the relative distortion produced when symbol $a_k$ in a noisy signal is replaced by the symbol $a_j$ when the corresponding symbol in the clean signal is $a_i$.

FIG. 16 illustrates the computation of an estimate of the distortion produced by replacing symbol $a_k$ within context C in a noisy signal by the replacement symbol $a_j$. This distortion value is obtained by the inner product of the row vector $\tilde{q}_{clean,C}^T$ 1602 by the distortion column vector $d_{k \to j}$ 1604. Note that the row vector $\tilde{q}_{clean,C}^T$ is obtained, as discussed above, by multiplying the derived row vector $\tilde{q}_C^T$ by the inverse of the channel-noise-model matrix $\Pi$. Therefore, as shown in FIG. 16, a numerical estimate of the distortion produced by replacing the symbol $a_k$ within context C in a noisy signal by the symbol $a_j$ can be obtained entirely from the derived symbol occurrence frequencies within the noisy signal, the distortion matrix $\Lambda$, and the channel-noise-model matrix $\Pi$ and its inverse $\Pi^{-1}$.

FIG. 17 illustrates a symbol-replacement function $g(C,z)$. The symbol-replacement function $g(C,z)$ computes a replacement symbol for an observed central symbol z within an observed context C. The observed central symbol and context are supplied as arguments to the symbol-replacement function $g(C,z)$. The function $g()$ considers each possible replacement symbol value for the central symbol of the context C and returns the estimated minimally distorting replacement character x, where, for a given observed central symbol z within an observed context C:

$$\hat{x} = g(C, z) = \frac{\text{argmin}}{a_j : j = 1 \text{ to } n}(\hat{d}_{z \to a_j})$$

where, for $$z = a_i, \hat{d}_{z \to a_j} = \hat{d}_{a_i \to a_j} = \overline{q}_{clean,C}^T \cdot d_{i \to j}$$

Thus, the symbol-replacement function $g()$ produces a replacement character x for an observed central symbol z within a context C observed in the noisy signal.

Embodiments of the Present Invention

In the previous section, a general background for context-based denoising of continuous-tone images is provided. In the current section, context-based denoising is again described, at a more abstract level, with introduction of notation conventions subsequently used in descriptions of various embodiments of the present invention. Then, context-modeling methods and a context-modeling component that represent embodiments of the present invention are discussed in overview, with reference to control-flow diagrams, and, finally, in greater detail with reference to a pseudocode implementation.

Figure 18:
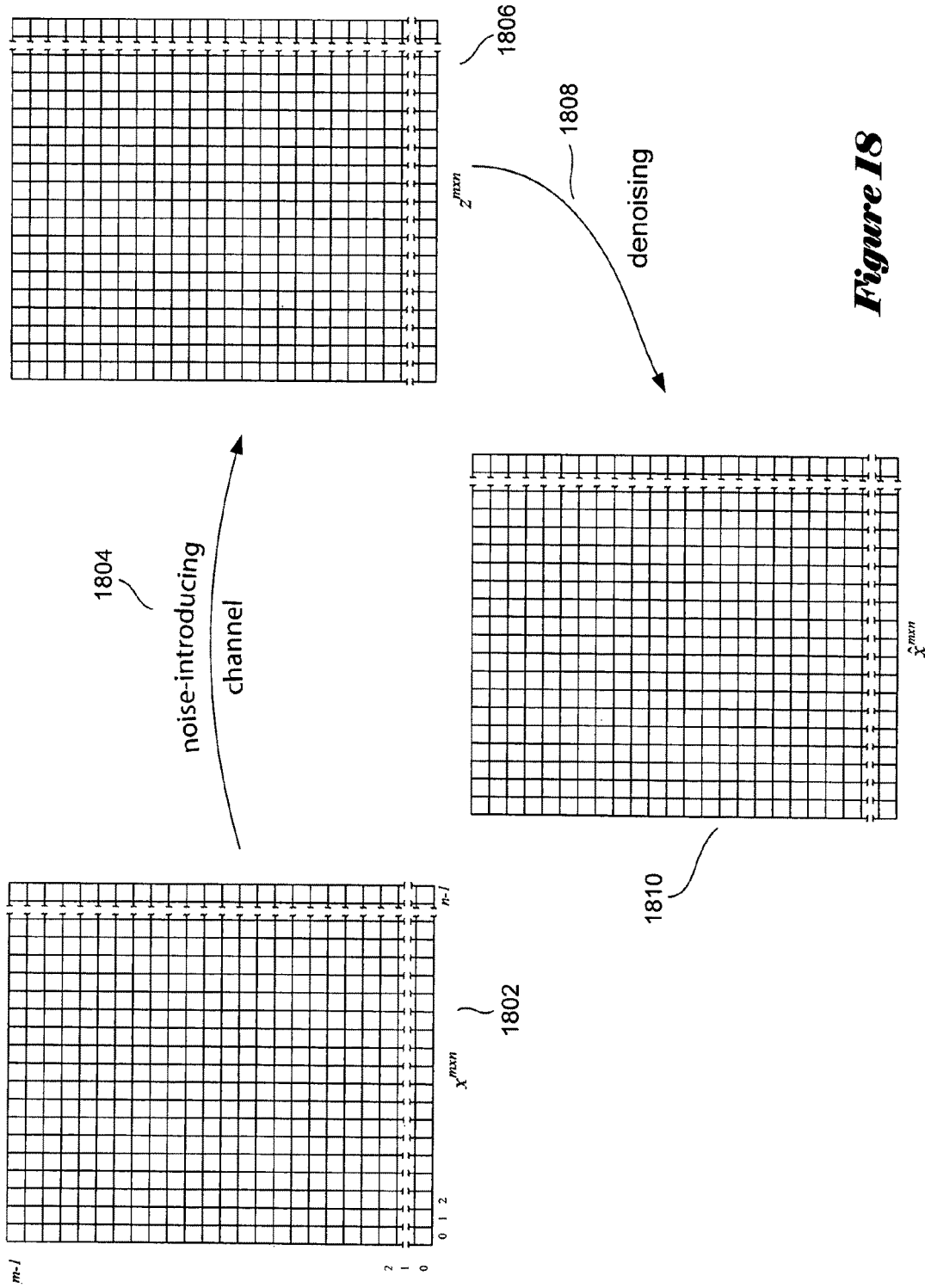
FIG. 18 illustrates the general problem of denoising of continuous-tone images.

FIG. 18 illustrates the general problem of denoising of continuous-tone images. The process can be thought of starting with a clean, non-noisy image $x^{m \times n}$ 1802, essentially a two-dimensional matrix or array, each element of which contains a symbol selected from an alphabet of symbols A that contains |A| symbols. The clean image $x^{m \times n}$ is passed through a noise-introducing channel 1804, producing a noisy image $z^{m \times n}$ 1806 corresponding to the original, clean image $x^{m \times n}$. The sizes of the clean and noisy images are considered to be identical, for purposes of the present discussion, and differ from one another only in that certain, individual symbols within the clean image $x^{m \times n}$ are replaced by different, corresponding noisy symbols in the noisy image $z^{m \times n}$. The denoising process 1808 generates a denoised image $\hat{x}^{m \times n}$ 1810 that, when the denoising process works as intended, should be closer to the original clean image $x^{m \times n}$ 1802 than the noisy image $z^{m \times n}$, if not identical to $x^{m \times n}$.

Figure 19:
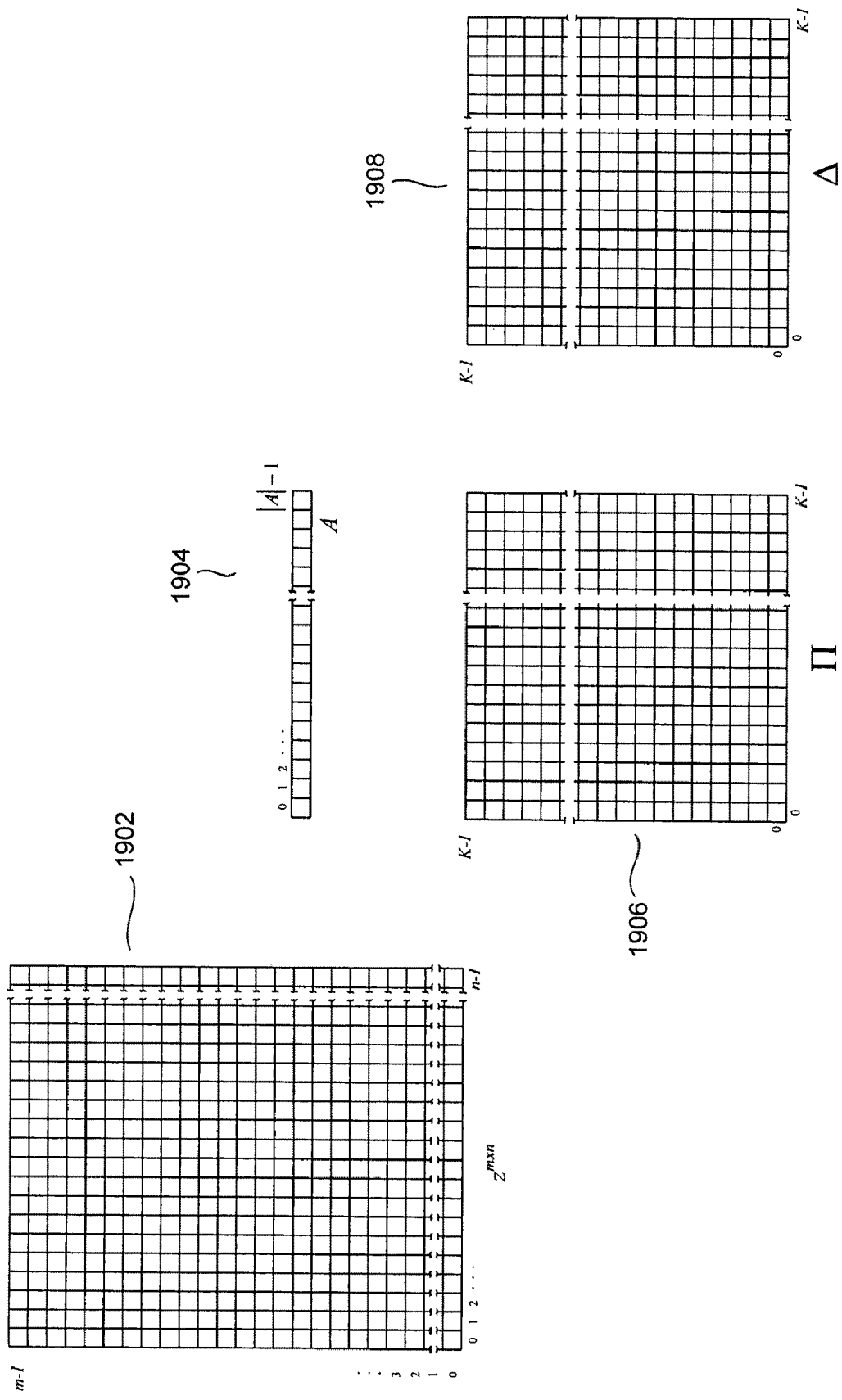
FIG. 19 illustrates information initially available to a denoiser and used by the denoiser to generate a denoised image $\hat{x}^{m \times n}$.

FIG. 19 illustrates information initially available to a denoiser and used by the denoiser to generate a denoised image $\hat{x}^{m \times n}$. The information initially provided to the denoiser includes the noisy image $z^{m \times n}$ 1902, the symbol alphabet A 1904, a channel-noise-model matrix $\Pi$ 1906, and a distortion matrix $\Lambda$ 1908, all discussed in the previous section. Note that the dimensions of $\Pi$ and $\Lambda$ in FIG. 19 are |A|, the number of symbols in alphabet A.

Figure 20:
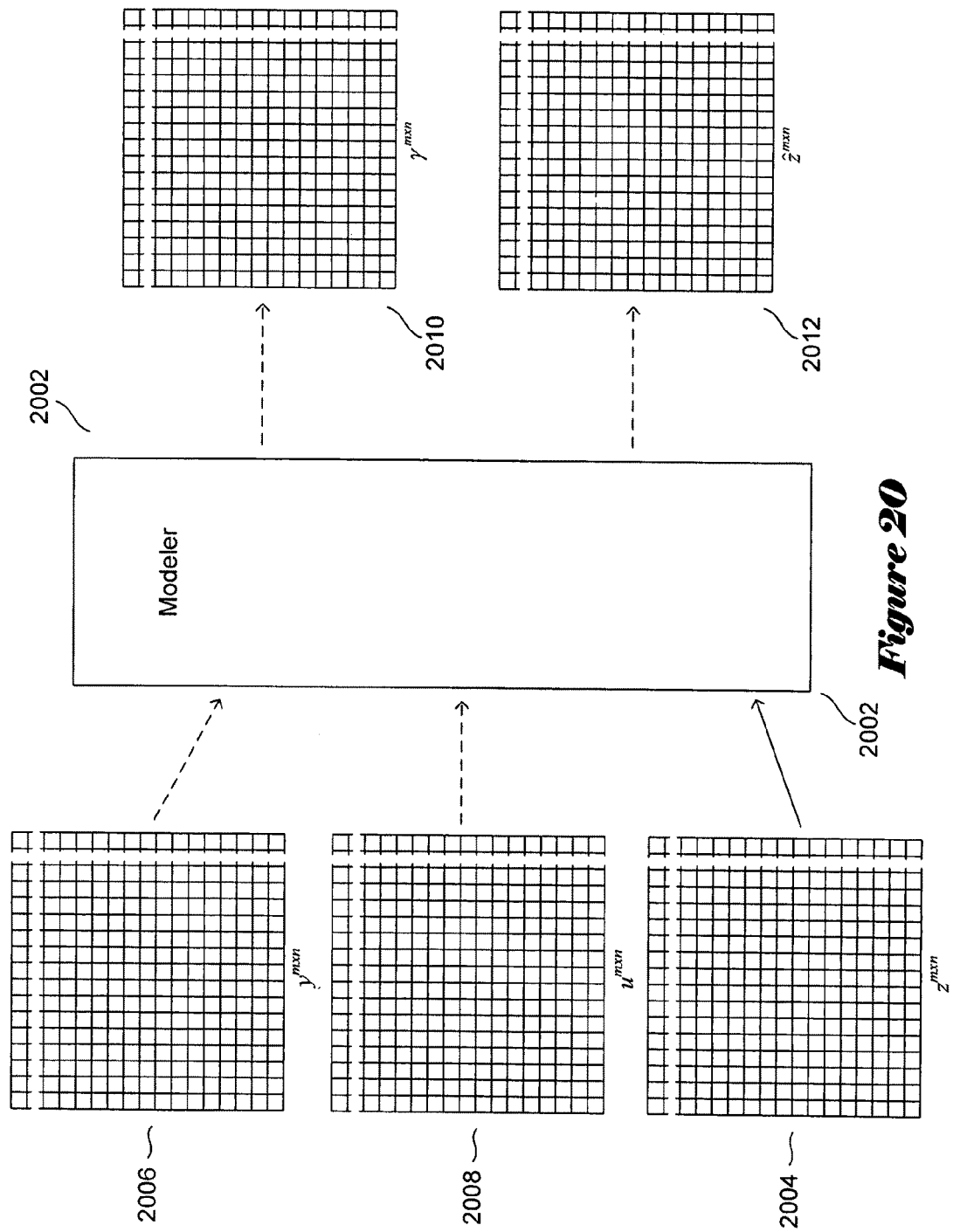
FIG. 20 illustrates the function of a context-modeling component within a denoiser.

FIG. 20 illustrates the function of a context-modeling component within a denoiser. The context-modeling component 2002 receives, as input, the noisy image $z^{m \times n}$ 2004 and, optionally, a prefiltered noisy image $y^{m \times n}$ 2006 and/or a binary mask $u^{m \times n}$ 2008. In other words, the context-modeling component includes an input-map-receiving component. The prefiltered noisy image $y^{m \times n}$ corresponding to the noisy image $z^{m \times n}$ may be generated by any of various filter methods to replace likely noise-affected symbols, as determined from a local environment of the symbols, with replacement symbols likely closer in value to the original clean-image symbols. The filtered image $y^{m \times n}$ is normally generated by serial application of a simple and efficient numerical filter applied to each noisy-image symbol. The binary mask $u^{m \times n}$ includes binary values 0 and 1 or true and false that indicate, for each symbol in the noisy image $z^{m \times n}$, whether the symbol is likely to have been altered during transmission of the clean image through the noise-introducing channel. The context-modeling component 2002 uses this input information, as discussed below, to produce a metamap $\gamma^{m \times n}$ 2010 and, optionally, a noisy-symbol-prediction map $\hat{z}^{m \times n}$ 2012. In other words, the context-modeling component includes a map-generating component. The metamap $\gamma^{m \times n}$ includes, for each noisy-image symbol, an indication of the context class and symbol-prediction class to which the context surrounding the noisy symbol is assigned, as discussed in detail below. Symbol assignment to context classes and symbol-prediction classes is based on symbols of $y^{m \times n}$, when $y^{m \times n}$ is available, and is otherwise based on the noisy-image symbols $z^{m \times n}$. The noisy-symbol-prediction map $\hat{z}^{m \times n}$ includes, for each noisy-image symbol $z_{i,j}$, a predicted noisy symbol $\hat{z}_{i,j}$, the predicted noisy symbols computed from symbol-error-prediction statistics based on accumulated differences between predicted noisy symbols and the noisy symbols in $z^{m \times n}$. The context-modeling component 2002 collects statistics related to symbol-occurrence within context classes and symbol-prediction classes, in addition to generating the context classes and symbol-prediction classes, and uses the collected statistics to generate the predicted noisy symbol $\hat{z}_{i,j}$, discussed in greater detail below.

As discussed in the first section, specific prediction error-occurrence probability distributions $q_{\gamma_i}^T$ can be collected for each context/prediction class $\gamma_i$. From these specific prediction error-occurrence probability distributions and the corresponding predicted values $\hat{z}_{i,j}$, specific noisy symbol occurrence probability distributions $\tilde{q}_{C_i}^T$ can be generated again as discussed above for each context $C_i$. From these specific symbol-occurrence probability distributions, estimated clean-image symbol-occurrence probability distribution can be generated, for each context by:

$$\tilde{q}_{clean,C_i}^T \approx \tilde{q}_{C_i}^T \Pi^{-1}$$

As discussed in the previous section, a distortion vector $d_{k \to j}$ can be produced by:

$$d_{k \to j} = \Lambda_{i,j} \square \Pi_{i,k}$$

Each element of the distortion vector includes a numerical estimate of the relative distortion produced when symbol $a_k$ in a noisy signal is replaced by the symbol $a_j$ when the corresponding symbol in the clean image is $a_i$. An estimate of the distortion produced by replacing symbol $a_k$, in a noisy signal within a context belonging to context class $\gamma_i$, by the replacement symbol $a_j$, $\hat{d}_{a_k \to a_j}$, is obtained by the inner product of the estimated probability distribution of the occurrence of symbols in the clean image and the distortion vector $d_{k \to j}$:

$$\hat{d}_{a_k \to a_j} = \hat{q}_{clean,C_i}^T \cdot d_{k \to j}$$

The derived quantities then allow for computation of a symbol-replacement function $G(\gamma_i, z_i)$ that generates a replacement symbol $\hat{x}$ for noisy-image symbol $z_i$ occurring within a context belonging to context class $\gamma_i$ within a noisy image:

$$G(\gamma_i, z_i) \to \hat{x} = a_j \text{ where } j = \frac{\text{argmin}}{j = 1 \text{ to } n}(\hat{d}_{a_k \to a_j})$$

Figure 21:
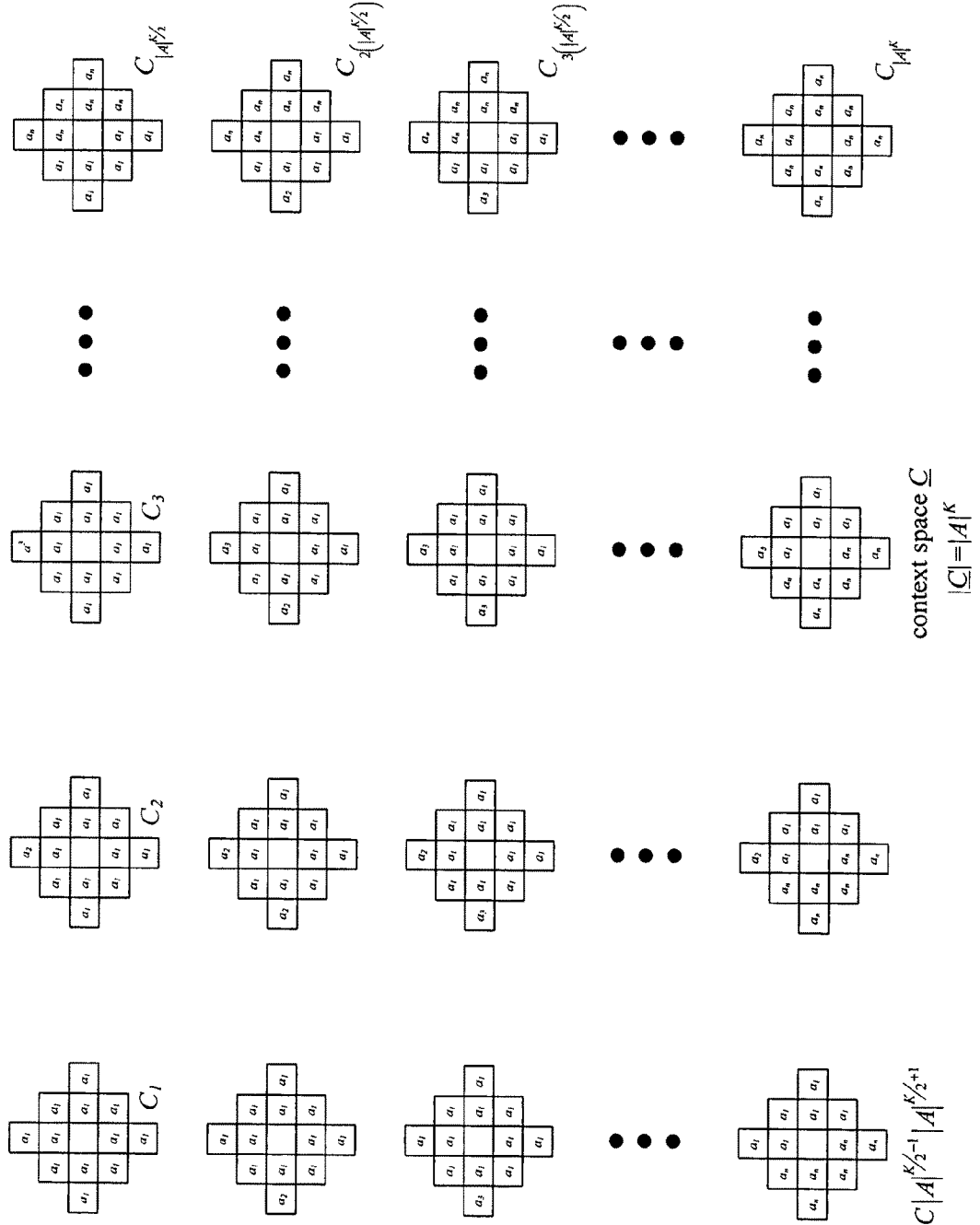
FIG. 21 illustrates a context space C.

FIG. 21 illustrates a context space C. The context space $\underline{C}$ comprises all possible, different contexts assembled from symbols of the alphabet A. In the current discussion, fixed-size contexts are employed. The fixed-size contexts each include K symbols. Thus, the size of context space $\underline{C}$, $|\underline{C}|$, is therefore:

$$|\underline{C}| = |A|^K$$

Figure 22:
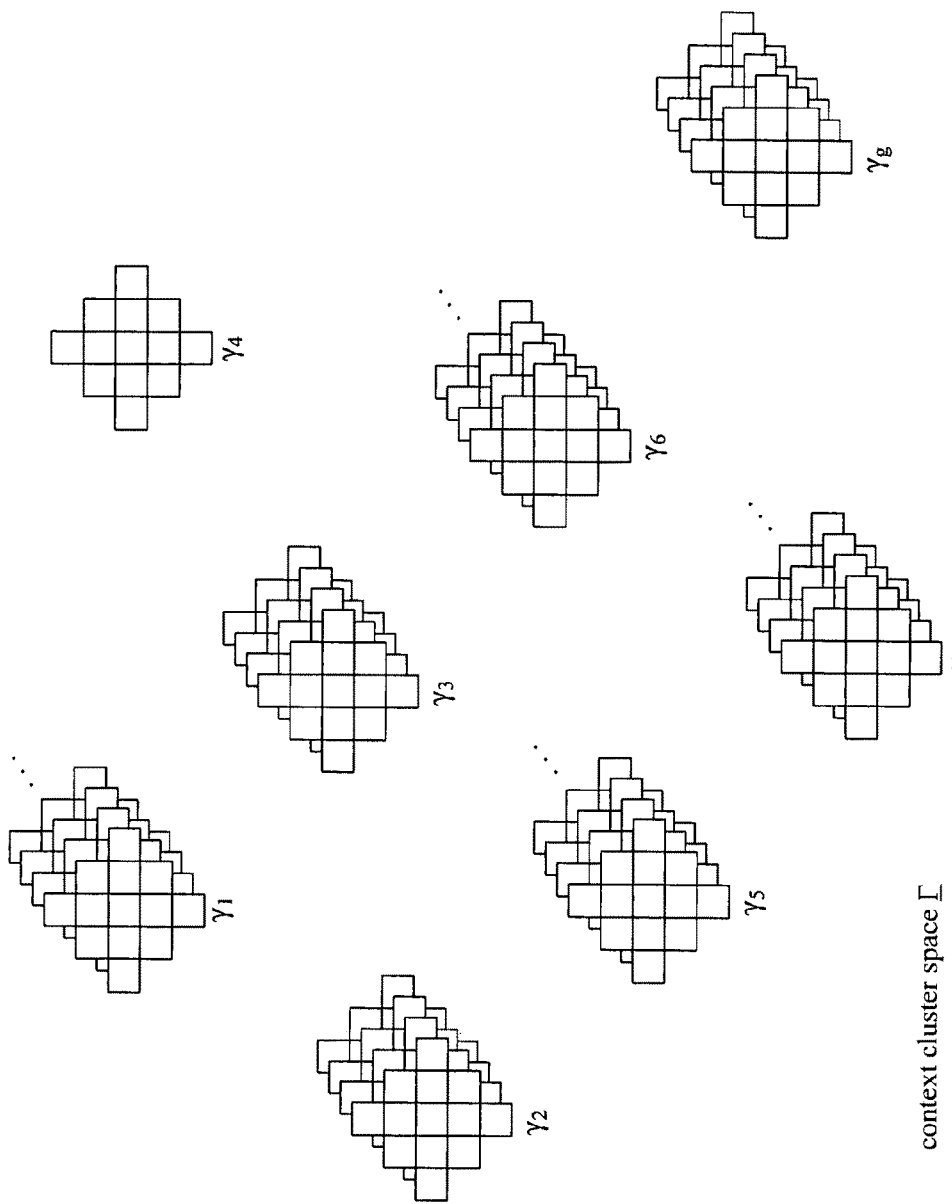
FIG. 22 illustrates a context-cluster space $\Gamma$.

FIG. 22 illustrates a context-cluster space F. The context-cluster space $\Gamma$ includes a number of groups of contexts, or context clusters. Contexts are grouped into clusters with the intent that all of the contexts within each group share similar error-occurrence probability distributions, which are therefore close to the accumulated error occurrence distribution over the class $q_{\gamma_i}^T$. Such clustering is readily obtained in continuous-tone images because of the general characteristics of such images. First, continuous-tone images often display continuity in pixel intensity within significant portions of the image. For example, in a photograph of a number of objects in front of a relatively homogenous background, pixel intensities within the areas of each of the objects, and within the background, may generally vary continuously and relatively slowly, within a relatively narrow range of the possible pixel-intensity values. More rapid variation, or discontinuities, may occur at the edges of objects, edges of shadows within the image, and at boundaries between regions of different overall intensity, such as the outline of text symbols comprising pixels of a first intensity on a background comprising pixels of a second intensity. There may be certain equivalences between the patterns of variation within contexts in different areas of an image. For example, in an image of an object partially shaded by another object, contexts in the unshaded portion of the object may be related to contexts in the shaded portion of the object by an intensity offset reflecting the general difference between shaded and non-shaded intensities. In addition, contexts within certain areas of an object may be related to contexts within other areas of the object by rotations and other simple symmetry transformations that reflect the rotations and other symmetry transformations in areas of an image related by symmetry or quasi-symmetry. Thus, it is likely that, for any continuous-tone image, the set of individual contexts that occur within the image can be partitioned into a number of context clusters, the contexts within each context cluster associated with similar prediction-error-occurrence probability distributions.

Figure 23:
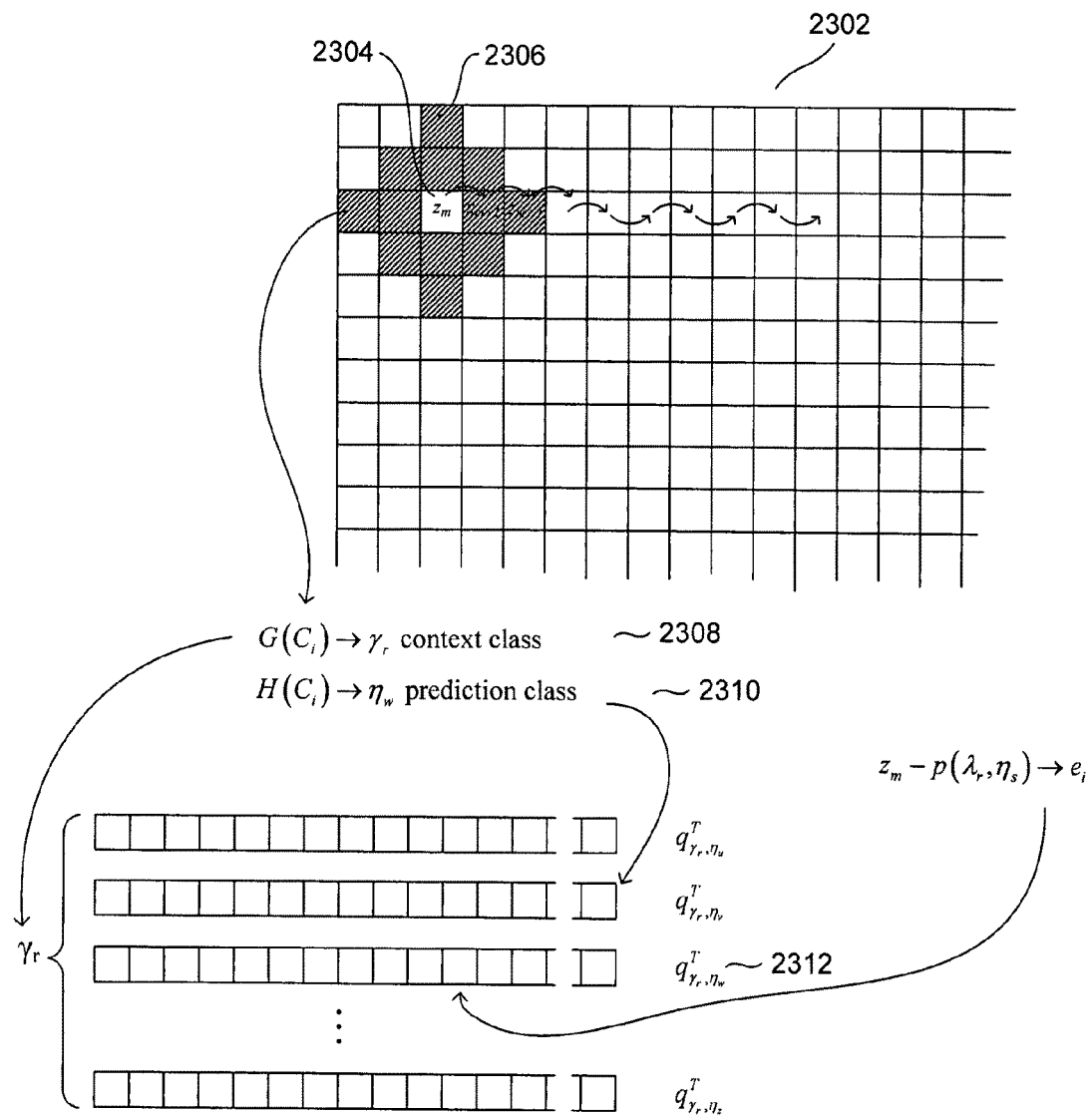
FIG. 23 illustrates accumulation of error information during analysis of a noisy image signal.
Figure 24:
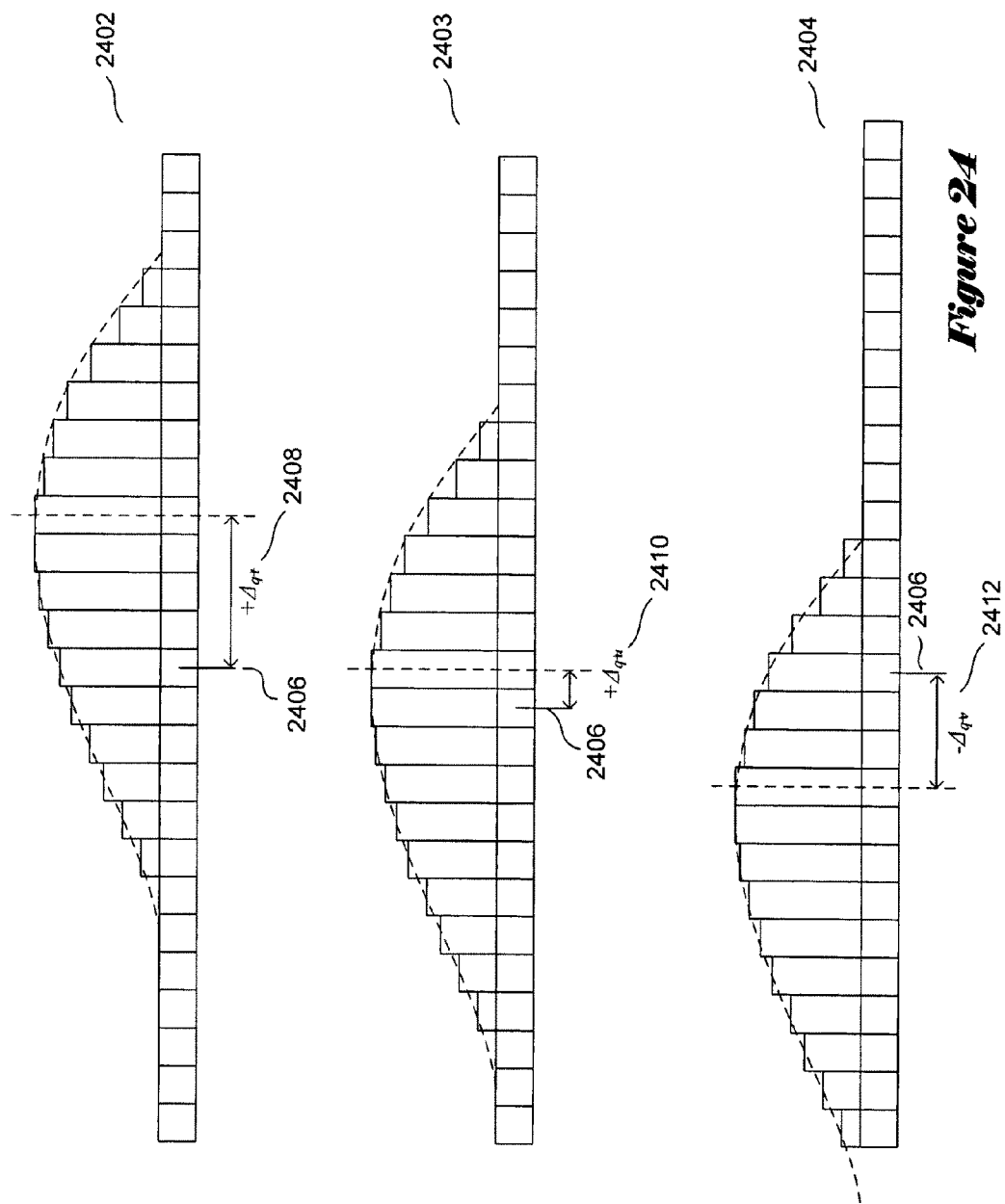
FIG. 24 illustrates the symbol-prediction-error probability distributions for three prediction-class subsets of a particular context class.

FIG. 23 illustrates accumulation of error information during analysis of a noisy image signal. As shown in FIG. 23, a noisy image 2302 is traversed, pixel by pixel, in order to build up context-class-related symbol-prediction-error probability distributions. For each context-embedded noisy symbol, such as noisy symbol 2304 embedded within context 2306 in FIG. 23, a context class $\gamma_r$ can be determined from the context $C_r$ in which the symbol is embedded by application of a first function F 2308, and a symbol-prediction class $\eta_w$ can be determined from the context $C_r$ by application of a function H 2310 to select a particular symbol-prediction class $\eta_w$ within the context class $\gamma_r$ to which the context surrounding the noisy symbol belongs. Then, a noisy-symbol-prediction-error histogram, or distribution $q_{\gamma_r, \eta_w}^T$; 2312 for the symbol-prediction class $\eta_w$ within context class $\gamma_r$ can be updated, by increasing the element corresponding to the computed noisy-symbol-prediction error $e_i$. In other words, unlike in the simpler case described with reference to FIG. 8, in the context-modeling component of the present invention, a particular context belongs both to a context class $\gamma_i$ and a symbol-prediction class $\eta_i$. In one set of embodiments of the present invention, the symbol-prediction classes $\eta_i$ are essentially subsets of the context classes $\gamma_i$. While all of the prediction-error histograms, or occurrence distributions, within a context class $\gamma_i$ have the same overall shape, or mathematical model, the distributions within each prediction-class subset may be offset from one another by a bias. FIG. 24 illustrates the symbol-prediction-error probability distributions for three prediction-class subsets of a particular context class. As shown in FIG. 24, each of the prediction-error distributions 2402-2404 have the same, general shape or, in other words, are described by the same mathematical model, or probability distribution, but, in each symbol-prediction-class subset, the distribution is shifted from some arbitrary origin 2406 by different biases $\Delta_{r,u}$ 2408, $\Delta_{r,v}$ 2410, and $\Delta_{r,w}$ 2412, respectively, where the context class is $\gamma_r$ and the three symbol-prediction classes are $\eta_u$, $\eta_v$, and $\eta_w$, respectively.

Referring again to FIG. 23, consider the context class, noisy-image symbol value, and a predicted noisy-image symbol $\gamma_i$, $z_i$, and $\hat{z}_i$, respectively, at a given point in the traversal of the noisy image. The noisy-symbol-prediction error for $z_i$ is:

$$e_i = z_i - \hat{z}_i$$

Consider random variables $Z$, $\hat{Z}$, and $E$ to be random variables that model $z_i$, $\hat{z}_i$, and $e_i$, respectively, and consider $\gamma$ to be a random vector that models the possible values of the context classes $\gamma_i$. In the previously described denoiser, the denoiser function for a current sample is defined in terms of the empirical distribution of the input alphabet conditioned on the current context class $\gamma_i$. The prediction error distribution for the current context class $\gamma_i$ and the current noisy-symbol prediction $\hat{z}_i$ $$P_E(E = z_i - \hat{z}_i | \gamma = \gamma_i, \hat{Z} = \hat{z}_i)$$

can be assumed to be a centered version of the original noisy distribution when conditioned on the prediction of value $$P_Z(Z = z_i | \gamma = \gamma_i, \hat{Z} = \hat{z}_i)$$

or, symbolically:

$$P_Z(Z = z_i | \gamma = \gamma_i, \hat{Z} = \hat{z}_i) = P_E(E = z_i - \hat{z}_i | \gamma = \gamma_i, \hat{Z} = \hat{z}_i)$$

Assuming that the prediction error distributions are independent of the actual predicted value $\hat{z}_i$, $$P_E(E = e_i | \gamma = \gamma_i, \hat{Z} = \hat{z}_i) = P_E(E = e_i | \gamma = \gamma_i)$$

all the statistics of class γ can be gathered in one symbol-prediction-error-occurrence vector. With this assumption, and with the assumption that the prediction error distribution of the current context class is a centered version of the original noisy distribution when conditioned on the prediction value, the estimated noisy conditional distribution for the current sample $z_i$ is:

$$P_Z(Z=z_i|\gamma=\gamma_i)=P_E(E=e_i|\gamma=\gamma_i)$$

Figure 25:
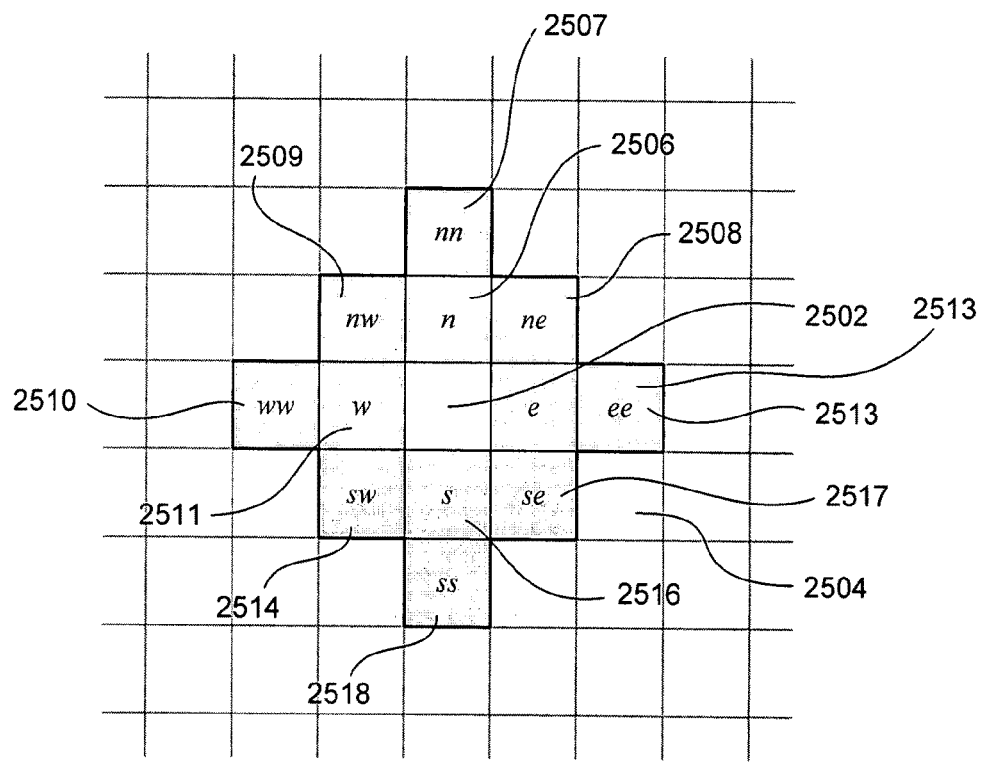
FIG. 25 shows a diamond-shaped, K=12 context about a currently considered noisy-image symbol.
Figure 26:
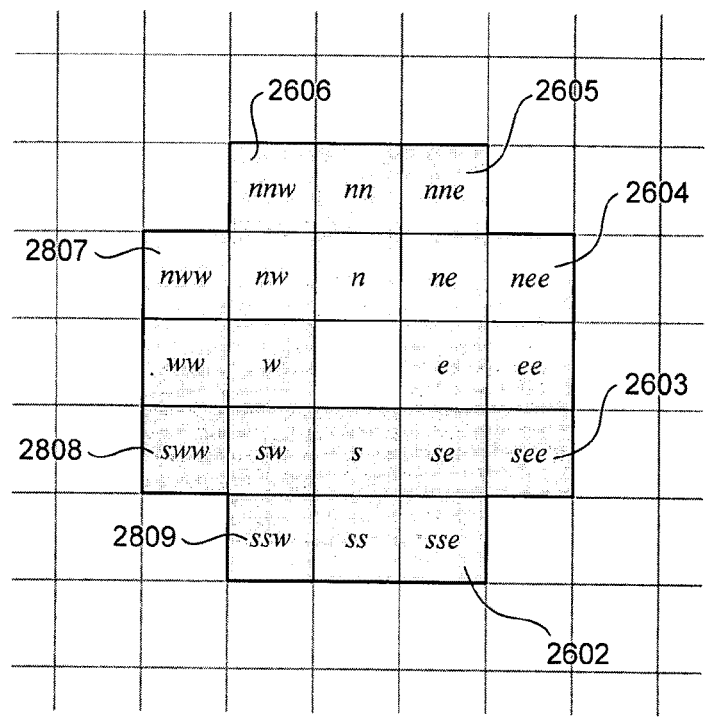
FIG. 26 shows a K=20 context used in various embodiments of the present invention.

Embodiments of the present invention are directed to various context modelers, as discussed with reference to FIG. 20, employed within denoisers directed to denoising of continuous-tone images. These context-modeling components employ a variety of techniques, described below, to assign each observed context to a context class and symbol-prediction class, the context-class and symbol-prediction-class assignments stored in a metamap γ. The context-modeling components may optionally generate a noisy-image-prediction map $\hat{z}_{i,j}$ that can be subsequently used by the denoiser to simplify the probabilistic model of the image. The various context-class and prediction-class assignment techniques, and noisy-symbol prediction techniques, employed by context-modeling components that represent embodiments of the present invention are next described:

FIGS. 25 and 26 illustrate two different types of contexts employed in various embodiments of the present invention. FIG. 25 shows a diamond-shaped, K=12 context about a currently considered noisy-image symbol. Each pixel, or element, in the K=12 context 2504 is labeled, in FIG. 25, with a directional designation. The directional designations include: (1) n, or north 2506; (2) nn, north north 2507; (3) ne, northeast 2508; (4) nw, or northwest 2509; (5) ww, or west west 2510; (6) w, or west 2511; (7) e, or east 2512; (8) ee, or east east 2513; (9) sw, or southwest 2514; (10) s, or south 2516; (11) se, or southeast 2517; and (12) ss, or south south 2518. In the following discussion, the value of a particular element of a K=12 context may be referred to either as $C_d$, where d equals one of the directional designations, or, alternatively, simply as d, where d is one of the directional designations.

FIG. 26 shows a K=20 context used in various embodiments of the present invention. The K=20 context includes eight additional symbols, each labeled with a three-character directional designation 2602-2609.

Figure 27:
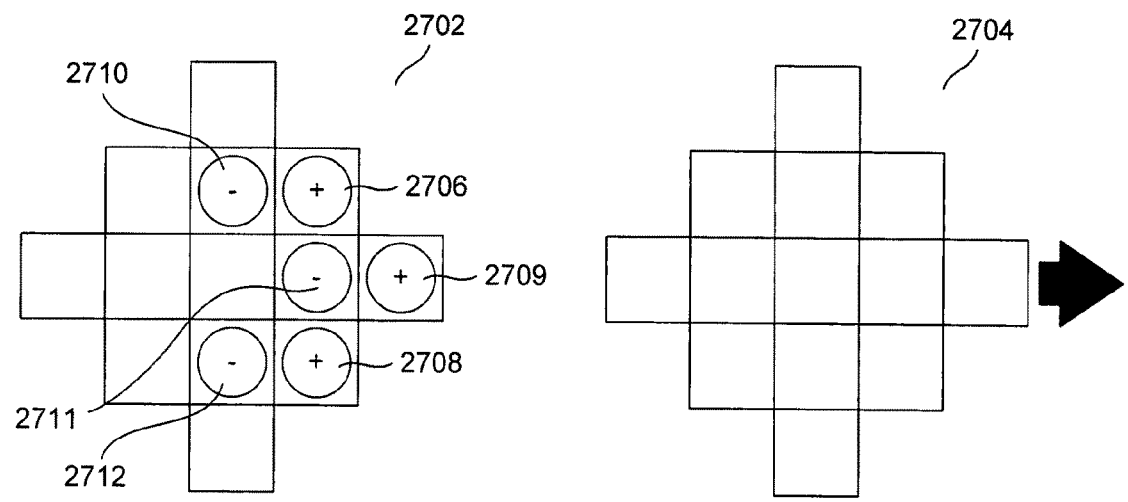
FIGS. 27-28 illustrate calculation of wing gradients.
Figure 28:
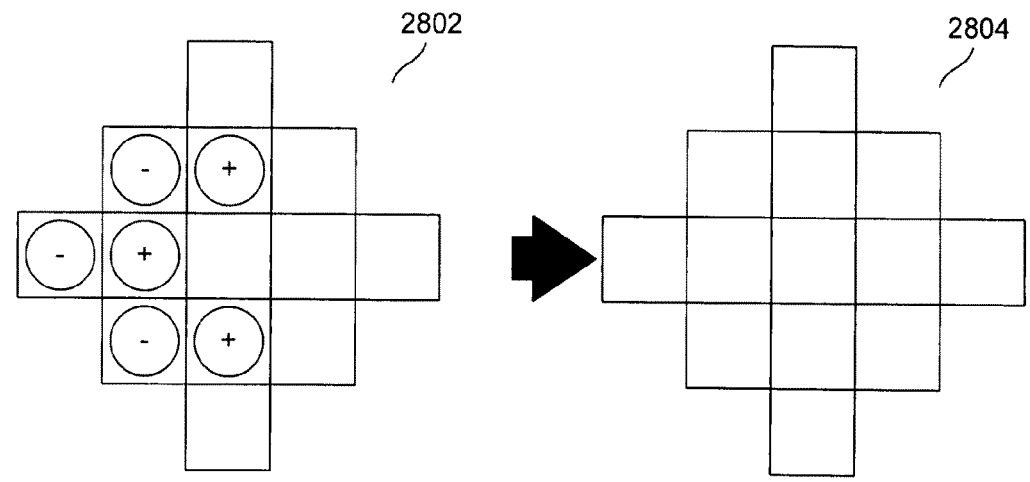

FIGS. 27-28 illustrate calculation of wing gradients. FIG. 27 shows calculation of an externally directed wing gradient and FIG. 28 illustrates calculation of an internally directed wing gradient. In both figures, the calculation of the wing gradient is represented in a left-hand depiction of the context 2702 and 2802, and a symbolic representation of the wing gradient is shown in the right-hand context of the figures 2704 and 2804. Calculation of a wing gradient for the K=12 context can be thought of as the addition of six signed values, include three positive values 2706-2708 and three negative values 2710-2712. The negatively signed values are the unsigned symbol values within the context elements multiplied by −1.

Figure 29:
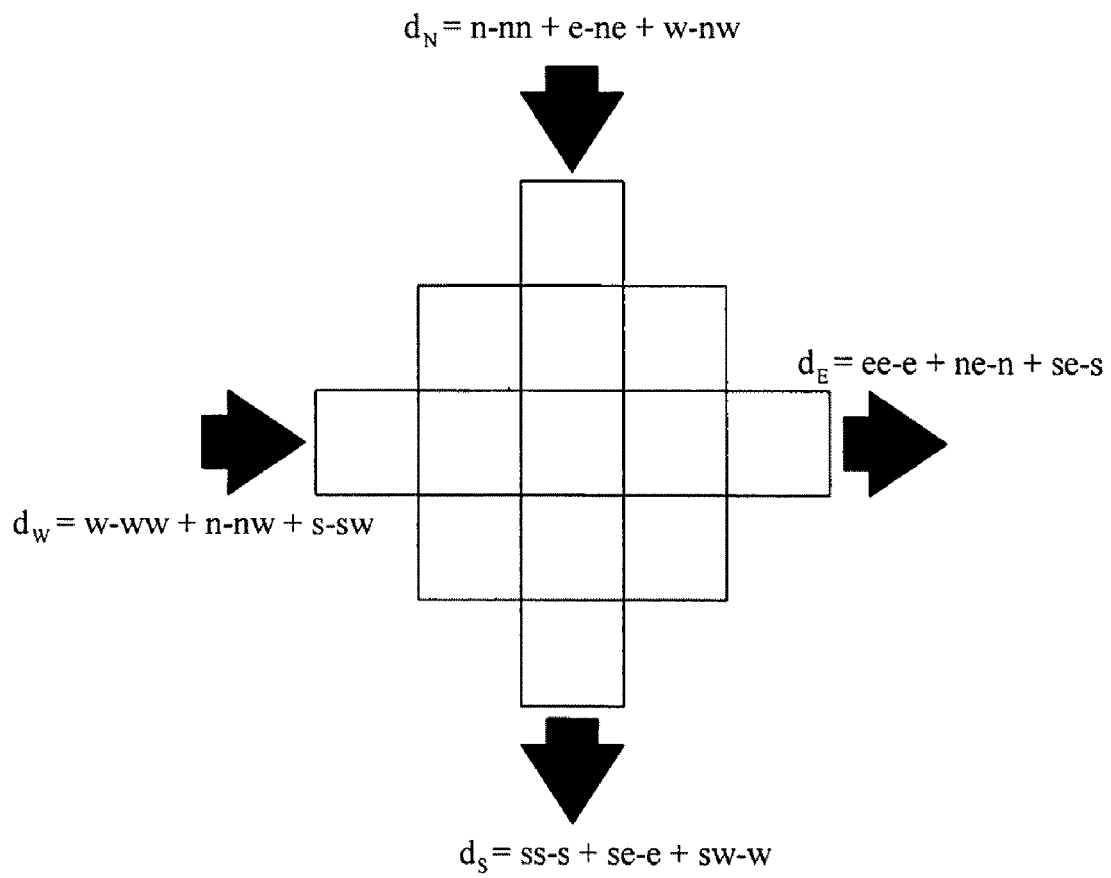
FIG. 29 illustrates the four wing gradients $d_N$, $d_S$, $d_E$, and $d_W$ that are computed, by various embodiments of the present invention, during the process of context-class and prediction-class assignment and during noisy symbol prediction.
Figure 30:
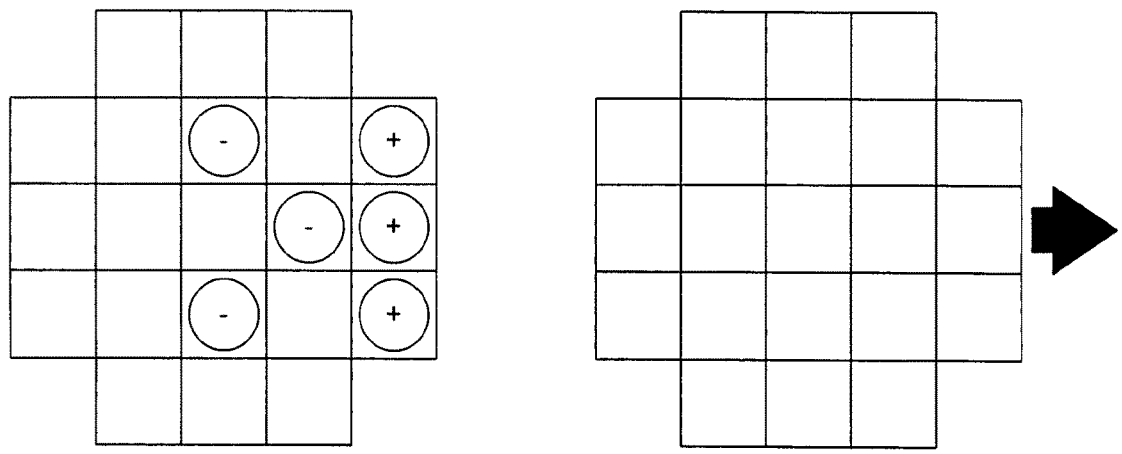
FIGS. 30-32 illustrate calculation of the four wing gradients $d_N$, $d_S$, $d_E$, and $d_W$ for the K=20 context discussed with reference to FIG. 26.
Figure 31:
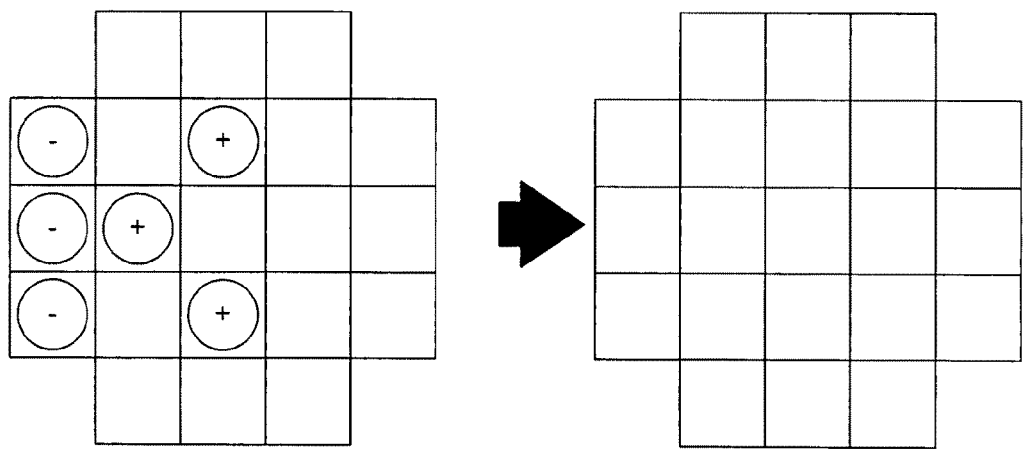
Figure 32:
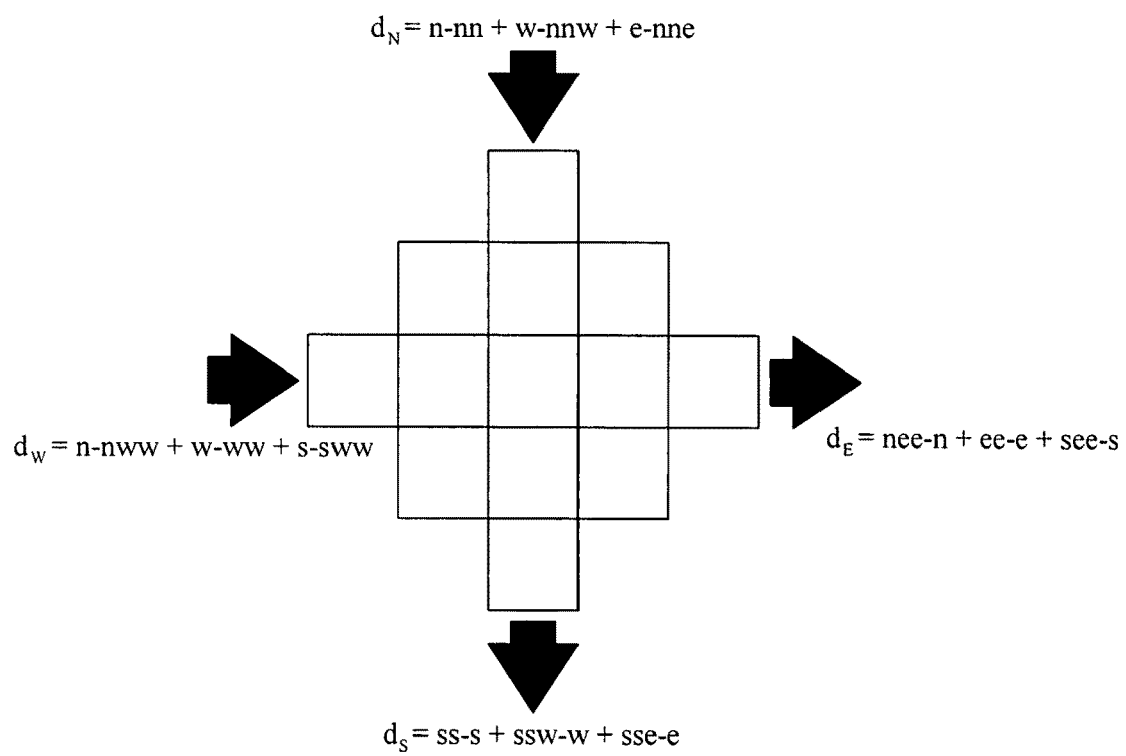

FIG. 29 illustrates the four wing gradients $d_N$, $d_S$, $d_E$, and $d_W$ that are computed, by various embodiments of the present invention, during the process of context-class and symbol-prediction-class assignment and during noisy symbol prediction. In FIG. 29, the full six-term expression for each of the four wing gradients is shown, according to the wing-gradient-computation diagrams illustrated in FIGS. 27-28. The wing gradients $d_N$, $d_S$, $d_E$, and $d_W$ are fundamental numerical components used to assign individual contexts to context classes and symbol-prediction classes, and are also used for noisy-symbol prediction. FIGS. 30-32 illustrate calculation of the four wing gradients $d_N$, $d_S$, $d_E$, and $d_W$ for the K=20 context discussed with reference to FIG. 26.

The signed wing gradients are combined, as shown in the following three equations, to produce an activity level ("AL") that represents another numerical component of context-class and prediction-class assignment:

$$d_H=|d_E|+|d_W|$$

$$d_V=|d_N|+|d_S|$$

$$AL=d_H+d_V$$

FIG. 33 illustrates calculation of a textured bitmap. The textured bitmap is an additional numerical component of context-class and symbol-prediction-class assignment. Starting with a K=12 context and context-embedded symbol 3302, FIG. 33 shows the steps employed by embodiments of the present invention to generate a corresponding 12-bit texture bitmap 3304. First, the value of each context element, or symbol, is compared to the predicted noisy value $\hat{z}$ for the context-embedded symbol z. When the context element is greater than or equal to the predicted value, the binary value "1" is inserted into a binary comparative context 3306, and when the context element is less than the predicted value, the binary value "0" is inserted into the corresponding element of the binary comparative context 3306, as indicated by the Boolean-valued comparative expressions contained in the elements of the binary comparative context 3306 in FIG. 33. Then, the binary comparative context is traversed 3308 in a particular order, illustrated in FIG. 33 by curved arrows starting at binary comparative context element 3310, with the binary values encountered in the traversal entered in most-significant-bit-to-least-significant-bit order into the 12-bit texture bitmap 3304, as indicated in FIG. 33. Of course, in an actual implementation, as described below, the texture bitmap is generated from a context and predicted symbol value $\hat{z}$ by direct generation of Boolean bits and bit mask operations, without intermediate generation of a binary comparative context. A similar method is employed to generate texture bitmaps for K=20 contexts, and other types of contexts that may be employed in alternative embodiments of the present invention.

A final computed component for context-class and prediction-class assignment is a computed metric ϕ, referred to as "the gradient direction," although the computed metric ϕ is not strictly a gradient, according to the well-understood meaning of the term "gradient." The gradient direction, or gradient angle, is computed as follows:

$$\varphi = \tan^{-1}\left(\frac{d_V}{d_H}\right)$$

with ϕ is defined to be 90, or $$\frac{\pi}{2},$$

when $d_H$ is 0. Other mappings of the ratio $$\frac{d_V}{d_H}$$

can also used, in alternative embodiments, and, in yet additional embodiments, the metric φ may be computed from various alternative combinations of the computed values $d_N$, $d_S$, $d_E$, and $d_W$.

Figure 34A:
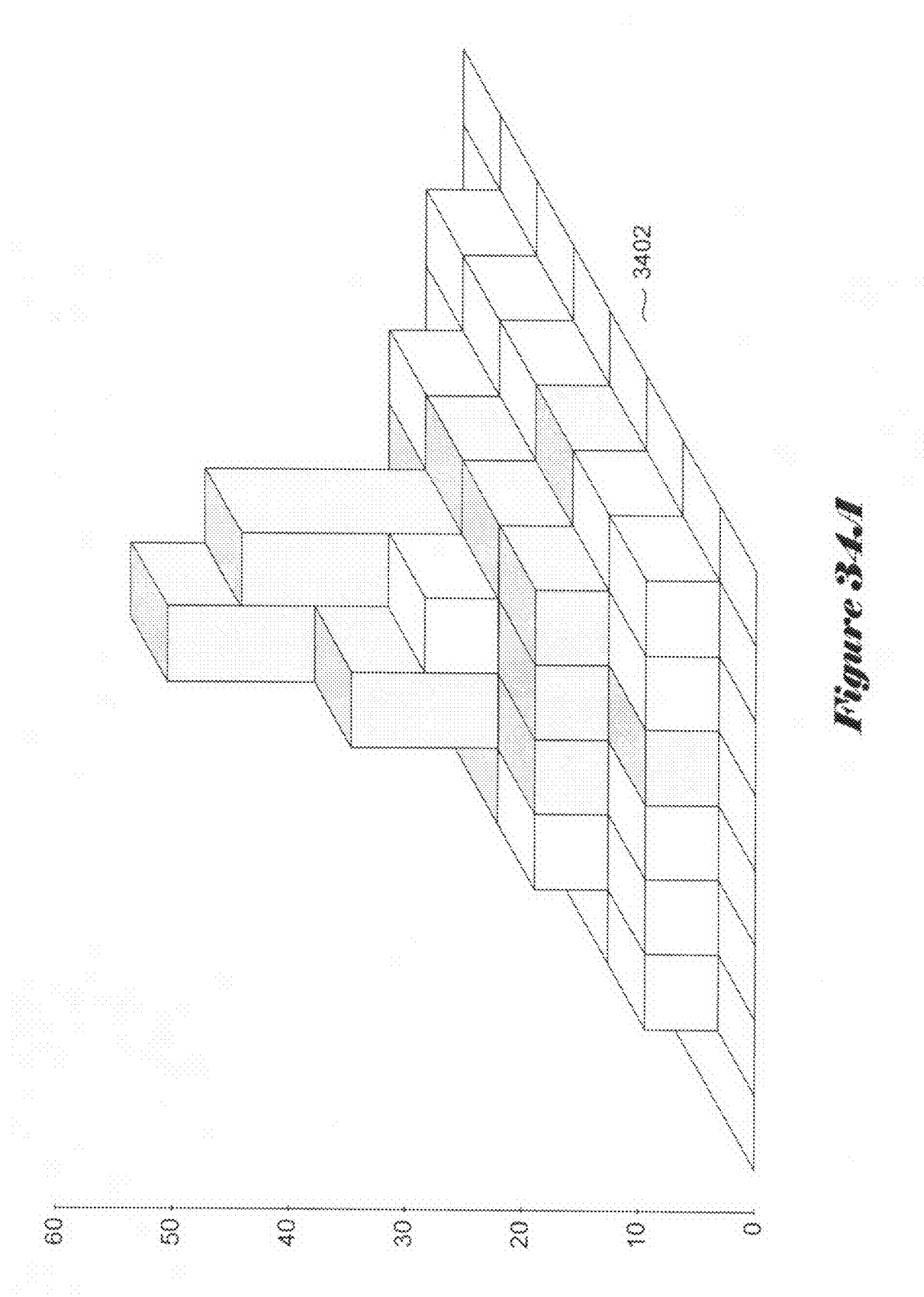
FIGS. 34A-37B illustrate the computed wing gradients, activity level, and gradient angle for a number of context examples.
Figure 34B:
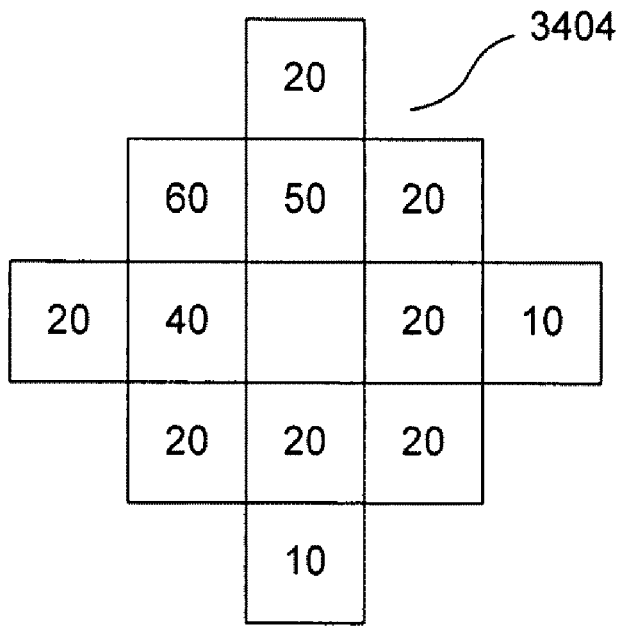
Figure 35A:
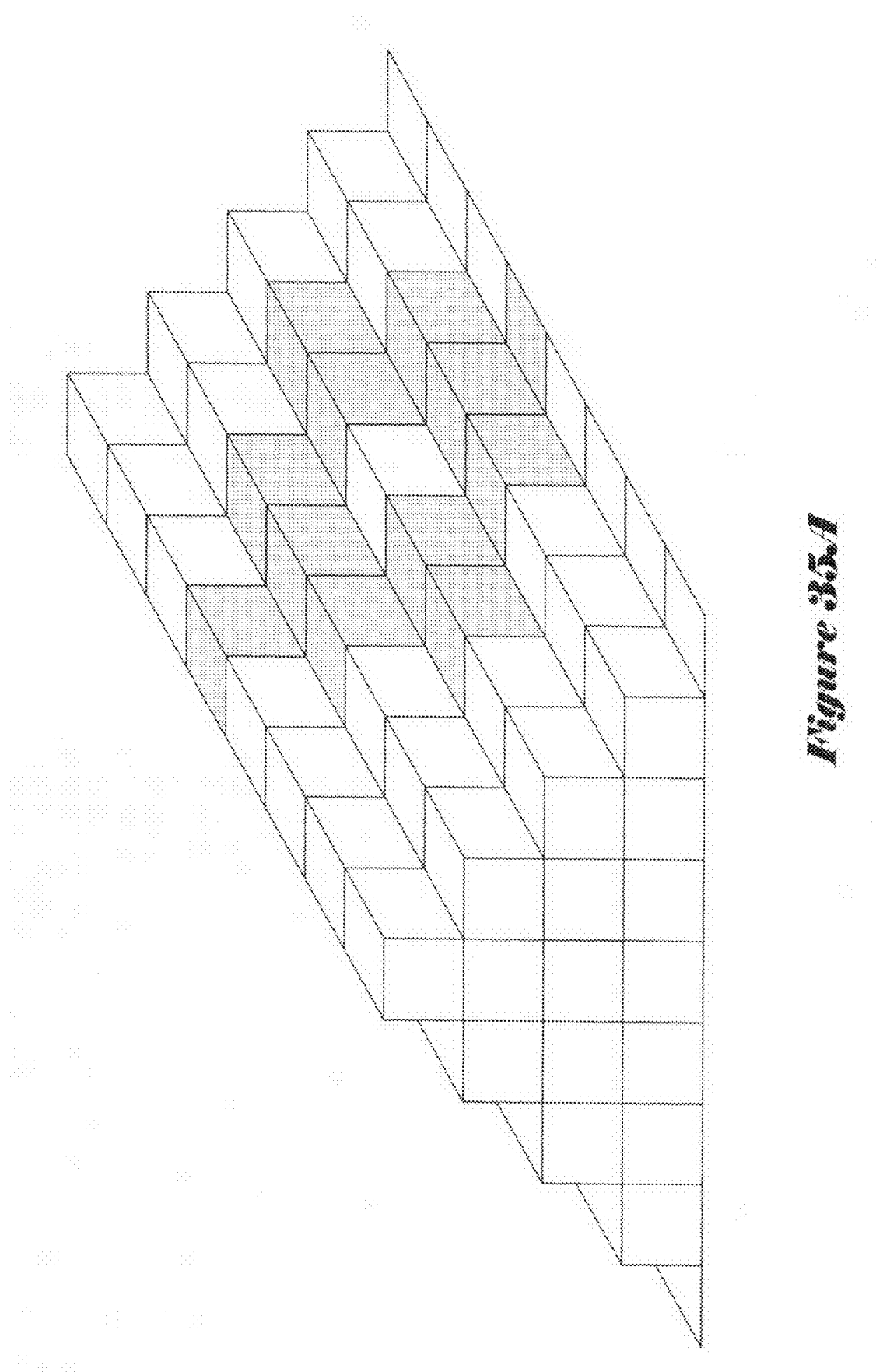
Figure 35B:
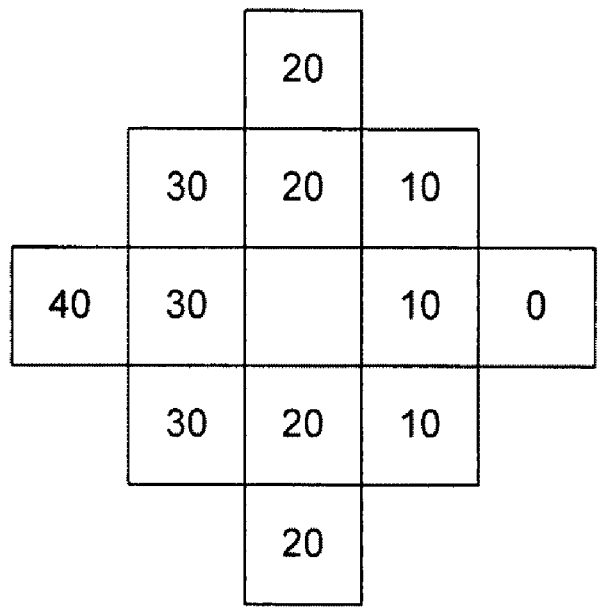
Figure 36A:
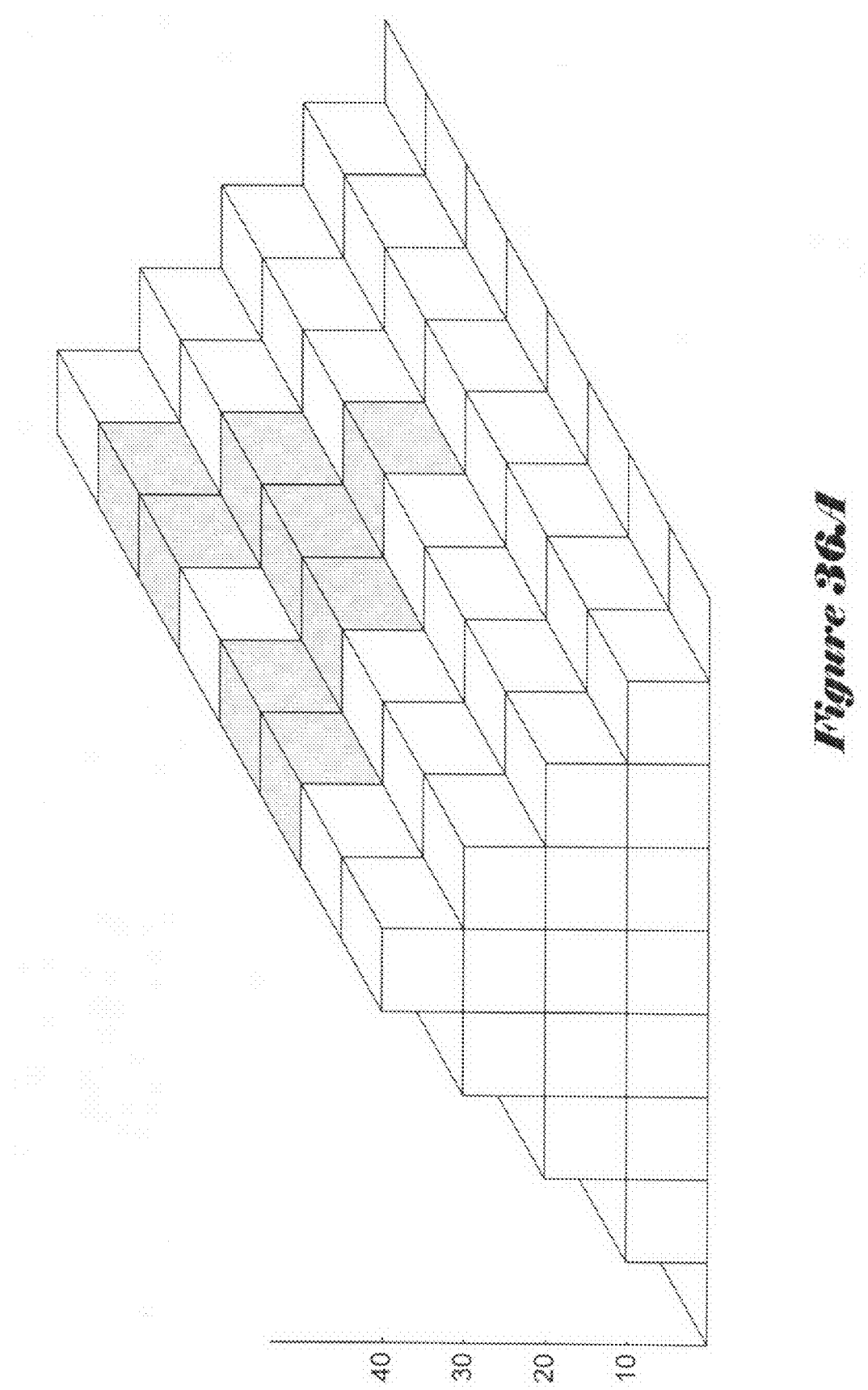
Figure 36B:
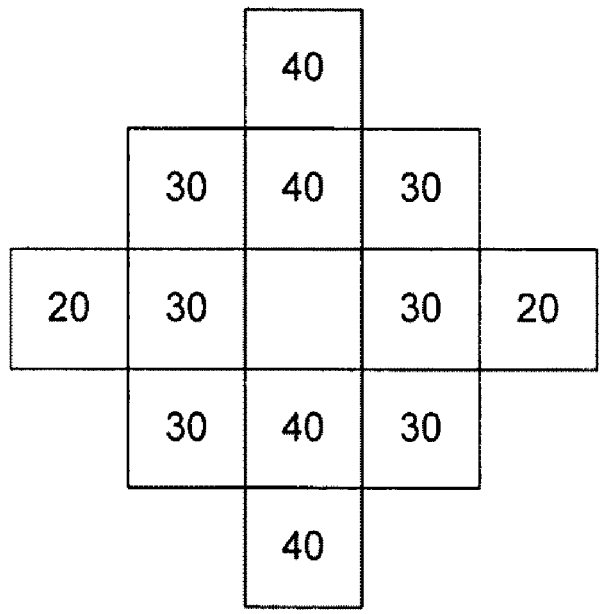
Figure 37A:
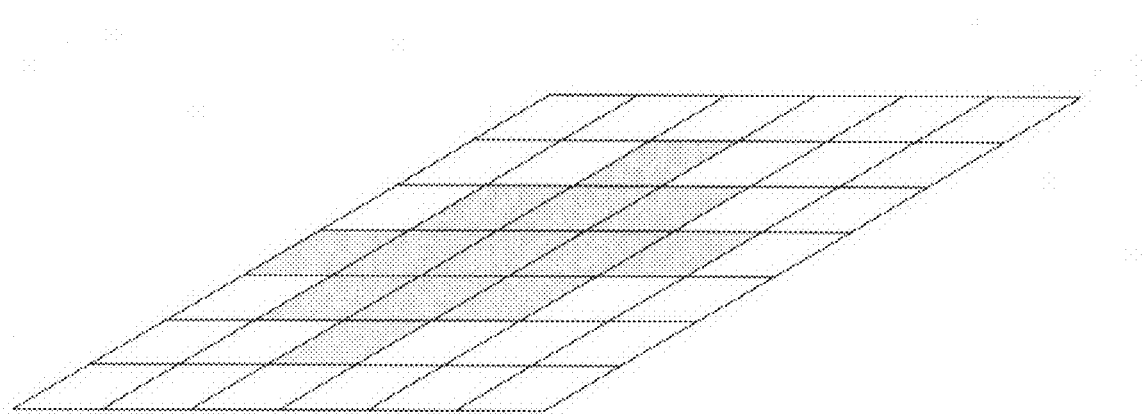
Figure 37B:
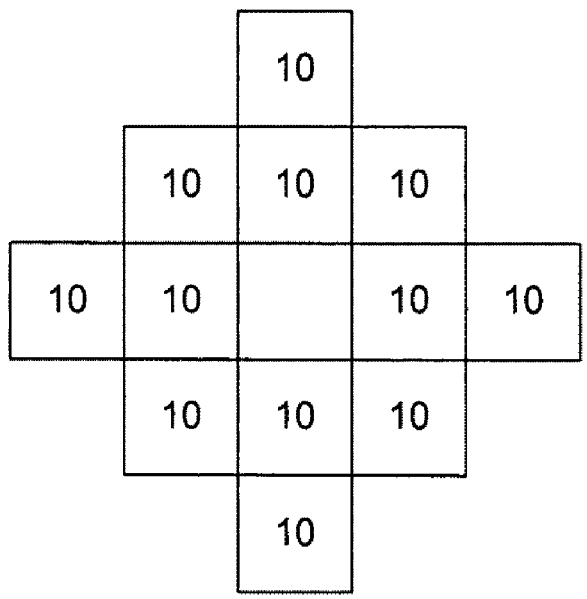

FIGS. 34A-37B illustrate the computed wing gradients, activity level, and gradient angle for a number of context examples. FIGS. 34A-37B consist of four pairs of figures, each pair including a perspective depiction of the symbol values within a context in a first figure, and the computed wing gradients, activity level, and gradient angle in a second figure. For example, FIG. 34A shows a context as a three-dimensional plot of pixel values above an 8×8 portion of a noisy image 3402. The height of the column above each pixel represents the unsigned, numerical value of the symbol associated with the pixel. In FIG. 34A, and in subsequent figures, the context pixels are shaded. The context shown in FIG. 34A spans a local maximum, with respect to symbol values, in the 8×8 portion of the noisy image. In FIG. 34B, the numeric values for the elements of the context are shown diagrammatically 3404, and calculation of the wing gradients, activity level, and gradient angle are shown below 3406. Within a context spanning a local maximum, such as that shown in FIG. 34A, the wing gradients within the wing-gradient pairs $\{d_N,d_S\}$ and $\{d_E,d_W\}$ have opposite signs, indicating that the symbol-value gradients point in opposite directions from the central element along any general direction. The unsigned activity level value is relatively high, indicating a large amount of change in symbol value within the context. The gradient angle indicates that the direction of maximum change, with respect to the central pixel, lies between the horizontal and vertical axes of the context. FIGS. 35A-35B illustrate the computed values for a context within a region of uniform horizontal change and uniform lack of vertical change. In this case, $d_N$ and $d_S$ are both 0, as expected with uniform lack of vertical change in symbol values, while both $d_E$ and $d_W$ have like-signed, relatively high values indicating uniform change in the horizontal direction. The activity level is relatively high, indicating significant change in symbol value over the context, but less high than the for the context illustrated in FIG. 34A. FIGS. 36A-36B show a context overlying a ridge-like portion of a noisy image. In this case, the wing-gradient pair $\{d_E,d_W\}$ have opposite signs, indicating that the horizontal gradients both descend from the ridge oriented along the vertical direction. FIGS. 37A-37B illustrate a context over a flat, unchanging portion of a noisy image, with computed numerical components all having values equal to 0.

The wing gradients, activity level, and gradient angle are all reflective of changes in symbol values that occur over the context. The wing gradients are reflective of the horizontal and vertical symbol-value gradients within the context, and the activity level is reflective of the overall degree of variation of symbol values within the context. The gradient angle φ is reflective of the relative values of the $d_N$ and $d_S$ wing gradients. By contrast, the texture bitmap is more reflective of the detailed symbol-value variance within the context, and includes spatial, rather than merely directional, information.

Figure 38:
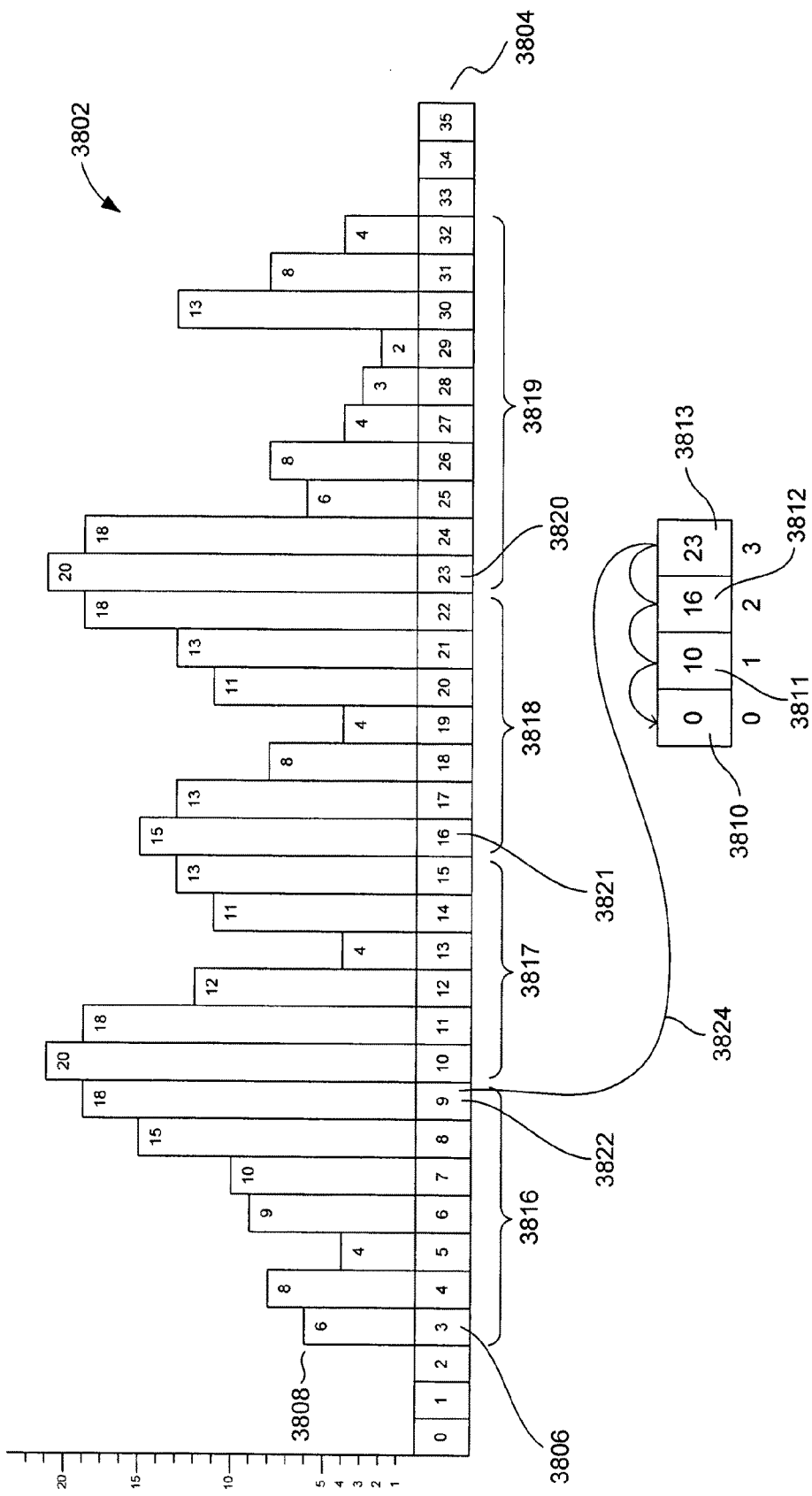
FIG. 38 illustrates quantization of computed numerical components for context-class and prediction-class assignment.

FIG. 38 illustrates quantization of a computed numerical component for context-class and symbol-prediction-class assignment. Embodiments of the present invention quantize these calculated numerical components, including the wing gradients, activity level, and gradient angle, in order to compactly represent these values in an overall value that describes a context class or a symbol-prediction class. In a first step, the number of occurrences of each possible value of a computed component are tabulated in a histogram, such as the histogram 3802 shown in FIG. 38. The number of occurrences of each value are represented by the heights of the columns in the histogram above each of the possible values contained in a horizontal axis 3804. Thus, for example, the minimum value 3 3806 occurred six times 3808 during the traversal of a noisy image. Once a histogram is prepared, during traversal of a noisy image, a number of quantization bins desired is selected. In FIG. 38, for example, four quantization bins 3810-3813 are desired. The quantization process transforms, in the example shown in FIG. 38, the 30 possible component values 3-32, expressible in five bits, into the four values 0, 1, 2, and 3, corresponding to the sequential numeric labeling of the quantization bins, expressible in two bits. In various embodiments of the present invention, a quantization technique divides the histogram into a number of regions 3816-3819 equal to the number of desired quantization bins such that each region includes an approximately equal number of occurrences. A quantization function is obtained by noting the threshold values 3820-3822 that lie at the boundaries between the regions in the histogram. For example, the first region in 3819 includes the component numeric values 23-32, so the value 23 becomes threshold value 2813 in the quantization function. The quantization function carries out one or a series of comparisons of a particular component numeric value to threshold values until the proper bin is found. For example, in order to compute the bin for component numeric value 9, the component numeric value 9 is compared 3824, successively, to the threshold values in right-to-left order until either a threshold value lower or equal to 9 is obtained, or no additional threshold values remain. Implementation of the quantization function is described below.

Figure 39:
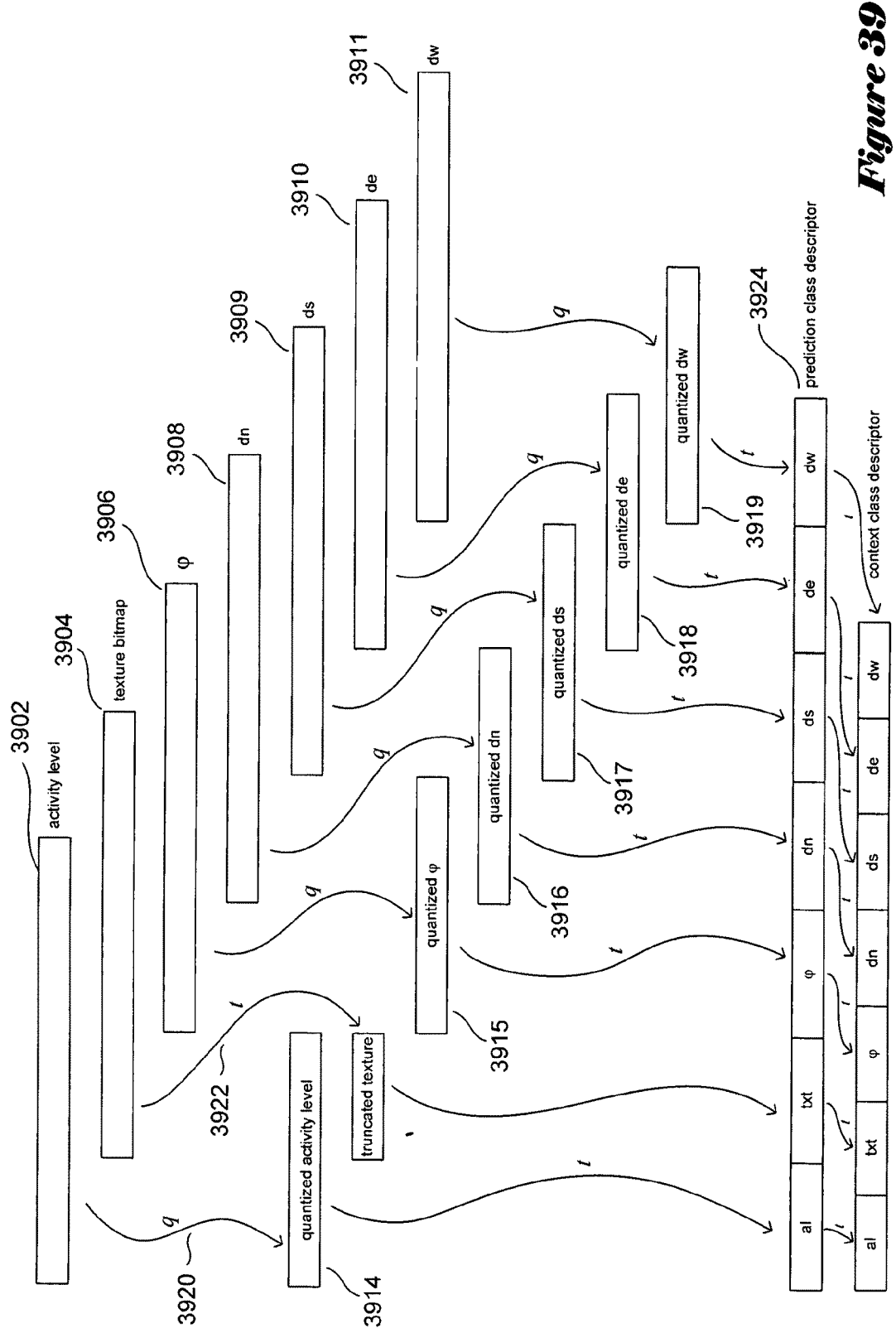
FIG. 39 illustrates generation of a context-class descriptor, or numeric identifier, and a prediction-class descriptor, or numeric identifier, from various computed component values.

FIG. 39 illustrates generation of a context-class descriptor, or numeric identifier, and a symbol-prediction-class descriptor, or numeric identifier, from the various numerical component values discussed above. Numerical component values include the activity level 3902, the texture bitmap 3904, the gradient angle 3906, and the wing gradients 3908-3911. All of these numerical components, except for the texture bitmap, are quantized, by the quantization process illustrated in FIG. 38, to generate corresponding quantized components 3914-3919. The texture bitmap may be truncated or sub-sampled to produce a corresponding value that can be expressed in a smaller number of bits, depending on the length requirements for the context-class descriptor and symbol-prediction-class descriptor. The quantization steps are represented in FIG. 39 by arrows labeled with the character "q," such as arrow 3920, and truncation steps are indicated by arrows labeled with a character "t," such as arrow 3922. The quantized components may be additionally truncated, and the truncated quantized components and truncated texture bitmap are then inserted, in a defined order shown in FIG. 39, into the symbol-prediction-class descriptor 3924. The symbol-prediction-class descriptor is thus a single, binary-encoded value with a length equal to the sum of the lengths of the quantized and/or truncated numerical components that together compose the symbol-prediction-class descriptor. A context-class descriptor is generated from the symbol-prediction-class descriptor 3924 by additional truncation of each of the components of the symbol-prediction-class descriptor, as indicated in FIG. 39. The truncation steps preserve the most significant bits of each component. Thus, all of the symbol-prediction-class descriptors with identical most-significant bits of the numerical components that together compose the symbol-prediction-class descriptors are associated with a single context-class descriptor identifying a single context class, generated in the final truncation steps shown in FIG. 39. In other words, the final numerical-component-by-numerical-component truncation automatically produces a context-class descriptor for the context class to which the truncated symbol-prediction class belongs. The above described method of generating symbol-prediction-class descriptors and context-class descriptors thus efficiently employs a variety of different types of information related to the distribution of symbol values within a context to assign the context to a context class, as well as to a symbol-prediction class that is a subset of the context class.

Figure 40:
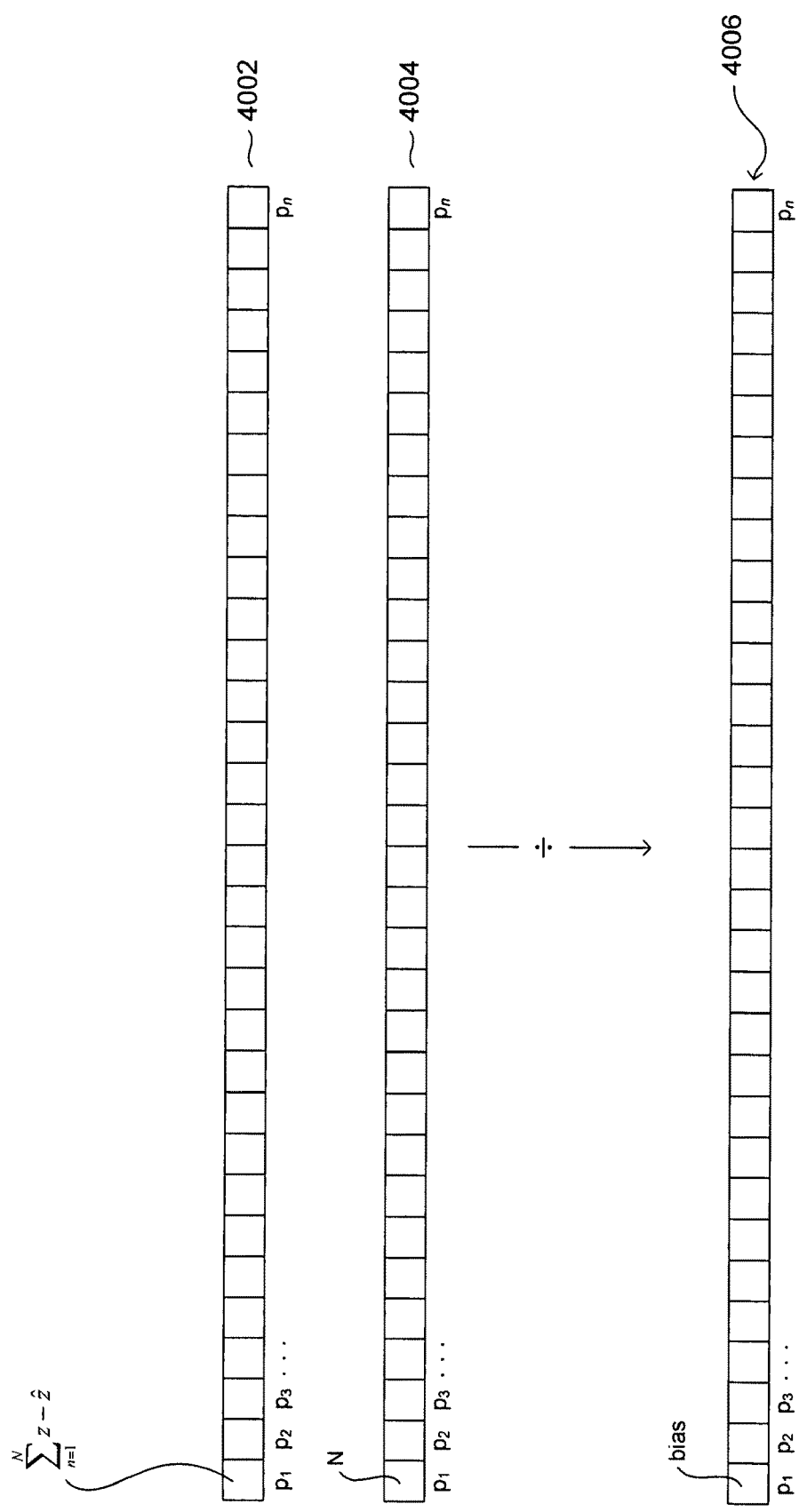
FIG. 40 illustrates computation of the noisy-symbol prediction bias, discussed above with reference to FIG. 23, for each symbol-prediction class.

FIG. 40 illustrates computation of the noisy-symbol prediction bias, discussed above with reference to FIG. 23, for each symbol-prediction class. During the traversal of a noisy image, the sum of the computed prediction errors $e_i$ for each symbol-prediction class is stored in a first array 4002, while the number of prediction errors computed for each of the symbol-prediction classes is stored in a second array 4004. Following the traversal, each element in the first of these arrays 4002 can be divided by the corresponding element in the second of the arrays 4004 to generate an average error, or bias, for each symbol-prediction class 4006. The predicted noisy symbol can then be corrected, in a final traversal of the noisy image, by adding the bias for the symbol-prediction class to which each context belongs to the predicted value for the noisy symbol embedded in the context to produce a corrected predicted value, as follows:

$$\hat{z}_{corrected} = \hat{z} + \text{bias}_{pi}$$

There are a number of different ways to compute a predicted noisy symbol $\hat{z}$ for a given noisy symbol z that are employed in various embodiments of the present invention. Many of these techniques employ weighted wing gradients, with the weights for wing gradients $d_N$, $d_S$, $d_E$, and $d_W$ computed as follows:

$$w_N = \frac{1}{(1+|d_N|)} \quad w_S = \frac{1}{(1+|d_S|)} \quad w_E = \frac{1}{(1+|d_E|)} \quad w_W = \frac{1}{(1+|d_W|)}$$

In a first technique, a minimum gradient is computed as follows:

$$d_m = \min(|d_N|, |d_E|, |d_S|, |d_W|)$$

Next, a threshold $\theta$ is computed as follows:

$$\theta = \text{grad\_thresh} \times 3 \times |A|$$

where grad_thresh is a parameter with a value greater than or equal to 0 and less than or equal to 1. For the K=20 context, described above, the integer "3" in the above equation is replaced with "5." Next, final weights are computed by comparing the absolute value of each wing gradient to the computed minimum wing gradient, as:

$$W_{x,final} = \begin{cases} w_x & \text{when } |d_x| - d_m < \theta \\ 0 & \text{otherwise} \end{cases}$$

where $x \in \{N, S, E, W\}$

Then, wing averages are computed as:

$$a_N = (C_n + C_{nn} + (C_{ne} + C_{ne})/2)/3$$

$$a_E = (C_e + C_{ee} + (C_{ne} + C_{se})/2)/3$$

$$a_S = (C_s + C_{ss} + (C_{sw} + C_{se})/2)/3$$

$$a_W = (C_w + C_{ww} + (C_{nw} + C_{sw})/2)/3$$

Finally, the predicted noisy symbol $\hat{z}$ is computed as:

$$\hat{z} = \frac{(W_{N,final})a_N + (W_{S,final})a_S + (W_{E,final})a_E + (W_{W,final})a_W}{W_{N,final} + W_{S,final} + W_{E,final} + W_{W,final}}$$

In a second version of noisy-symbol prediction, the wing-gradient weights take on only one of the two possible binary values "0" and "1." The prediction is then computed using only those wing gradients with weight 1. First, a wing-gradient sign is computed for each wing, as follows:

$$S_x = \begin{cases} -1 & \text{when } d_x < -\text{grad\_thresh} \\ +1 & \text{when } d_x > \text{grad\_thresh} \\ 0 & \text{otherwise} \end{cases}$$

where $x \in \{N, S, W, E\}$

When the wing-gradient sign is equal to 0, the corresponding wing-gradient is considered to be flat. Otherwise, the corresponding wing gradient is considered to be non-flat. If any of the wing gradients is flat, then the second predictor technique works in flat mode. In this mode, all elements of the context included exclusively in flat wings, or wings with wing-gradient sign values of 0, are used to compute the predicted noisy symbol, as follows:

$$\hat{z} = \frac{\sum_{c \in C} W_c c}{\sum_{c \in C} W_c}$$

where $$W_c = \begin{cases} 1 & \text{for flat-wing elements} \\ 0 & \text{for non-flat-wing or overlapping elements} \end{cases}$$

When none of the wings are classified as flat, the second prediction technique switches to a non-flat mode. In this mode, if the predictor determines that the context lies along a ridge, such as the context shown in FIG. 36A, with directional gradients in one of the vertical or horizontal directions both 0, and directional gradients in the other direction of opposite sign, as shown in FIG. 36B, then only those context elements along the ridge line, context elements ee, e, w, and ww in the example of FIG. 36B, are used to compute an average representing the noisy-symbol prediction, and otherwise, only the elements N, E, S, and W are used to compute the average symbol value presenting the noisy-symbol prediction $\hat{z}$.

In a third prediction technique, weights for the context elements are computed based on the relative position, expressed as a vertical-position/horizontal-position coordinate pair, from the central position of the context, as follows:

$$w_{(i,j)} = \begin{cases} i \geq 0, j \geq 0, & (w_S i + w_E j)/(i^2 + j^2) \\ i \geq 0, j < 0, & (w_S i - w_W j)/(i^2 + j^2) \\ i < 0, j \geq 0, & (w_N i + w_E j)/(i^2 + j^2) \\ i < 0, j < 0, & (w_N i - w_E j)/(i^2 + j^2) \end{cases}$$

where $w_N$, $w_S$, $w_E$, and $w_W$ are computed as described above. The coordinates indicate, in units of elements or symbols, the distance of a context element from the central symbol embedded within the context, with sign convention such that element ne has coordinates (−1, 1) and element ee has coordinate (−2, 0). Then, all of the elements of the context, multiplied by their respective weights, are averaged to produce the predicted noisy symbol $\hat{z}$.

In a C++-like pseudocode implementation, discussed below, the first prediction technique is implemented. However, in various embodiments of the present invention, the second and third techniques are used separately, or in conjunction with the first technique, depending on characteristics of the noisy image and characteristics of subsequent denoising components that employ the predicted noisy-image map $\hat{z}$ produced by the context-modeling component. Additional noisy-symbol prediction techniques can be employed in alternative embodiments.

Figure 41:
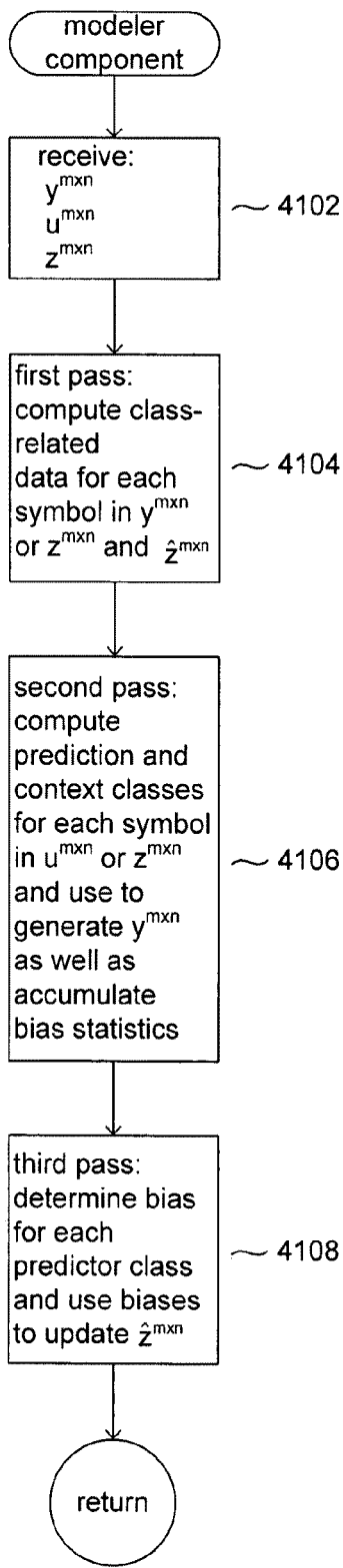
FIGS. 41-44 show control-flow diagrams for embodiments of the context-modeling method to which embodiments of the present invention are directed.

FIGS. 41-44 show control-flow diagrams for context-modeling method embodiments of the present invention. FIG. 41 is a highest-level control-flow diagram for various embodiments of the present invention. In a first step 4102, the prefiltered image, binary mask, and noisy image, $y^{m \times n}$, $u^{m \times n}$, and $z^{m \times n}$, respectively, are received. Then, in step 4104, a first pass is executed, in which the context-class-related data for each symbol in $y^{m \times n}$ or $z^{m \times n}$, including wing gradients, gradient angle, texture bitmap, and activity level, are computed, and an initial noisy-symbol prediction $\hat{z}$ is made for each symbol to generate a noisy-prediction map $\hat{z}^{m \times n}$. In general, when the prefiltered map $y^{m \times n}$ is available, the prefiltered map is traversed for computation of the class-related data. Otherwise, the noisy image $z^{m \times n}$ is traversed. In step 4106, a second pass is executed, in which the prefiltered map or noisy image is again traversed, symbol by symbol, to assign each context observed in the prefiltered map or noisy image to a context class and a symbol-prediction class, generating the metamap $\gamma^{m \times n}$, and, additionally, bias statistics are collected. Collection of bias statistics may involve both the prefiltered map $y^{m \times n}$, from which context classes, symbol-prediction classes, and predicted noisy-image symbols are preferentially computed, as well as the noisy image $z^{m \times n}$, symbols of which are used in the calculation of the prediction errors. Finally, in step 4108, a third pass is executed in which the bias for each symbol-prediction class is computed and the predicted noisy image map $\hat{z}^{m \times n}$ is adjusted according to the computed biases for each symbol-prediction class.

Figure 42:
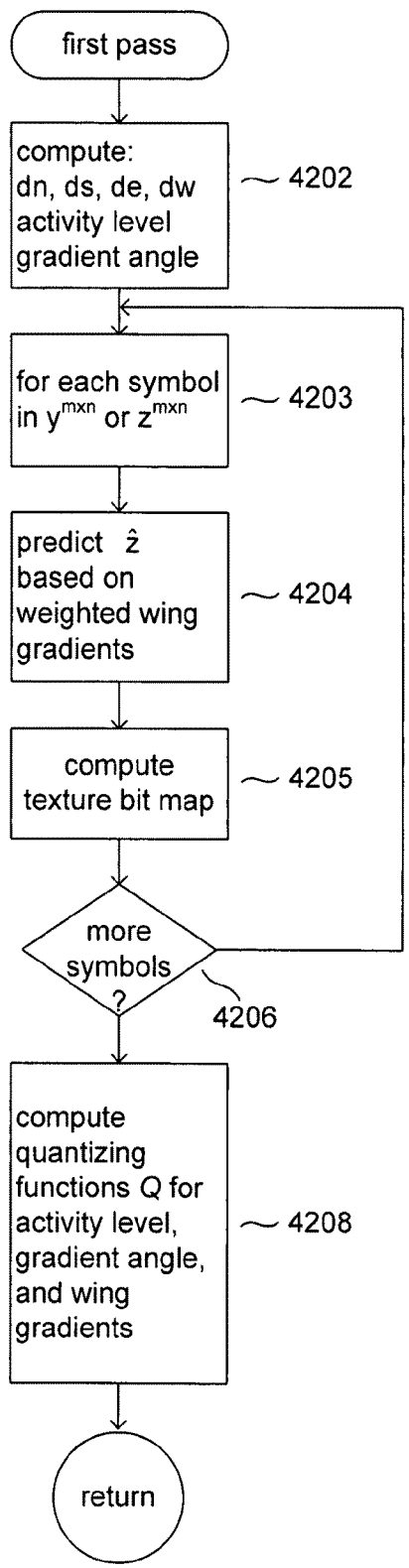

FIG. 42 is a control-flow diagram for the first pass through either the prefiltered image map $y^{m \times n}$ or the noisy image $z^{m \times n}$, carried out in step 4104 of FIG. 41. The first pass consists of a for-loop comprising steps 4202-4206, followed by step 4208, in which quantizing functions are computed for the activity level, gradient angle, and wing gradients. The for-loop traverses each symbol in either the prefiltered map $y^{m \times n}$ or the noisy image $z^{m \times n}$, when no prefiltered map is provided. First, in step 4203, the wing gradients, activity level, and gradient angle for the currently considered symbol are computed. Next, in step 4204, a noisy image symbol is predicted for the currently considered symbol of the prefiltered map $y^{m \times n}$ or the noisy image $z^{m \times n}$ by one of the three above-discussed noisy-symbol-prediction techniques. Finally, in step 4205, the texture bitmap for the currently considered symbol is computed.

Figure 43:
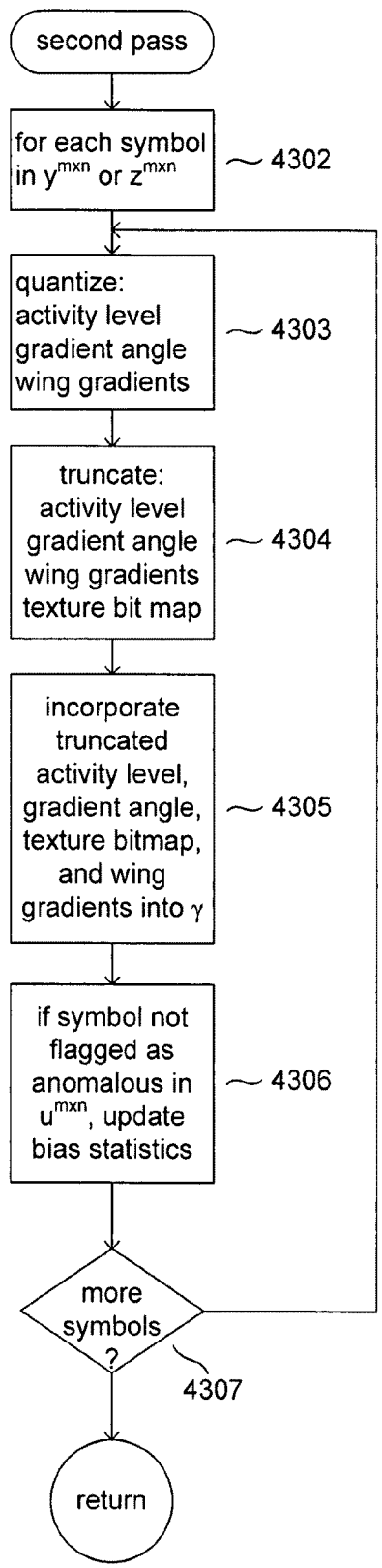

FIG. 43 is a control-flow diagram for the second pass, executed in step 4106 in FIG. 41. The second pass comprises a for-loop comprising steps 4302-4307. The for-loop again traverses the symbols in either the prefiltered map $y^{m \times n}$ or the noisy image $z^{m \times n}$. In step 4303, the activity level, gradient angle, and wing gradients are quantized. In step 4304, the quantized activity level, gradient angle, and wing gradients are truncated, and the texture bitmap may also be truncated. In step 4305, the truncated numeric components of the prediction-class descriptor are incorporated into a prediction-class descriptor. In step 4306, if the currently considered symbol is not flagged as anomalous or noise affected in the binary mask $u^{m \times n}$, when the binary mask $u^{m \times n}$ is available, then both the cumulative error with respect to $z^{m \times n}$ as well as the number of occurrences arrays for the symbol-prediction class associated with the context surrounding the currently considered symbol are updated.

Figure 44:
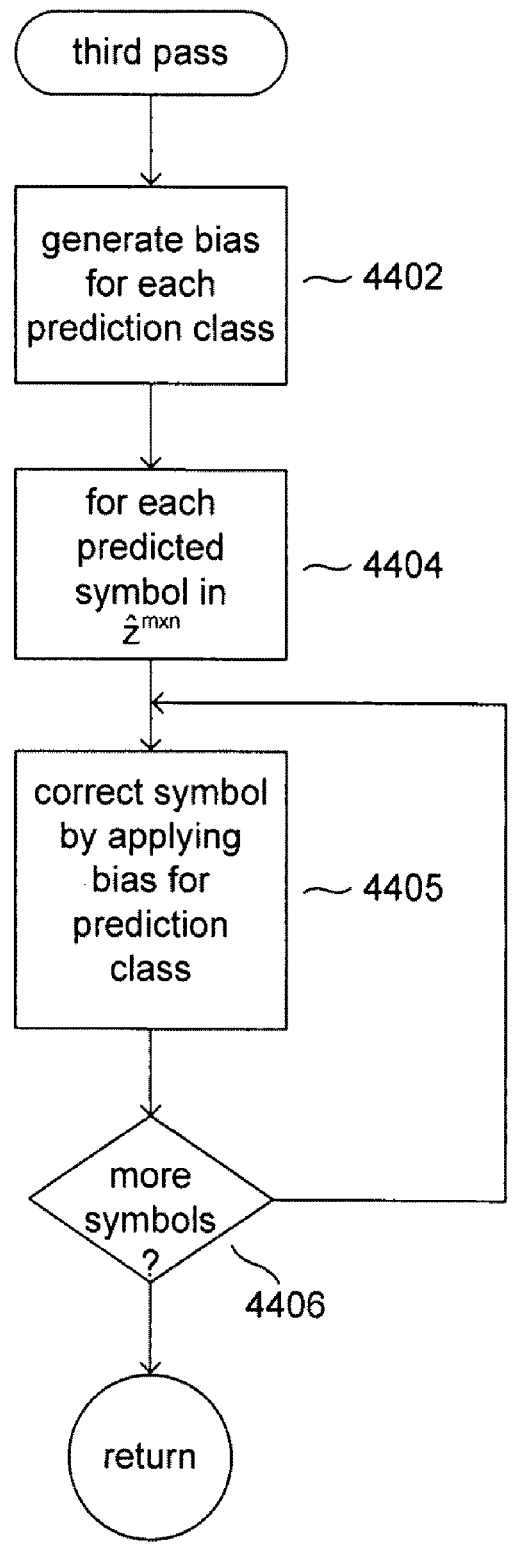

FIG. 44 is a control-flow diagram of the third pass, executed in step 4108 of FIG. 41. In step 4402, the biases for all of the symbol-prediction classes are computed, as discussed with reference to FIG. 40. Then, in the for-loop comprising steps 4404-4406, each predicted noisy symbol in the predicted noisy image map $\hat{z}^{m \times n}$ is corrected by applying the bias computed for the symbol-prediction class to which the context surrounding the symbol in the prefiltered map or noisy image is associated.

Next, a relatively simple, C++-like pseudocode implementation of one embodiment of the context-modeling component of a denoiser that represents one embodiment of the present invention is provided. The C++-like pseudocode implementation follows the above-described flow diagrams reasonably closely, and the following discussion will focus mostly on the higher-level concepts embodied in the pseudocode.

First, a large number of constants and type declarations are provided:

```
 1 const int MAP_HEIGHT = 500;
 2 const int MAP_WIDTH = 500;
 3 const int T_MAP = (MAP_HEIGHT − 4) * (MAP_WIDTH − 4);
 4 const int minI = 2;
 5 const int maxI = MAP_HEIGHT − 3;
 6 const int minJ = 2;
 7 const int maxJ = MAP_WIDTH − 3;
 8 typedef unsigned char symbol;
 9 const int maxSymbol = 32;
10 const int maxGrad = maxSymbol * 3;
11 const int maxActivityLevel = maxGrad * 4;
12 const int maxPhi = 630;
13 const int maxTexture = 4096;
14 const int actLvlCondBts = 2;
15 const int gradAngCondBts = 2;
16 const int textCondBts = 4;
17 const int gradCondBts = 1;
18 const int actLvlPredBts = 3;
19 const int gradAngPredBts = 3;
20 const int textPredBts = 4;
21 const int gradPredBts = 1;
22 const int actlvlBins = 8;
23 const int ganglBins = 8;
24 const int nBins = 2;
25 const int sBins = 2;
26 const int eBins = 2;
27 const int wBins = 2;
28 const double grad_thresh = 0.5;
29 const int maxPredictionClass = 16384;
30 typedef unsigned char gradient;
31 typedef unsigned short gradMagnitude;
32 typedef unsigned short texture;
33 typedef short phi;
```

A first set of constants, on lines 1-7, are related to the dimensions of the noisy image $z^{m \times n}$, with the dimensions of the prefiltered image $y^{m \times n}$, binary mask $u^{m \times n}$, metamap $\gamma^{m \times n}$, and predicted noisy image $\hat{z}^{m \times n}$ considered to be the same as those of the noisy image $z^{m \times n}$. In the pseudocode implementation, the first and last two rows and first and last two columns of the noisy map are not considered, as reflected in the constants declared on lines 4-7, since full contexts are not available for those rows and columns. In alternative embodiments, partial context can be defined for border regions. The constants on lines 8-9 define a symbol type, and also define the allowed symbols of alphabet A to range from 0-31. In other words, for the particular example addressed by the pseudocode implementation, the image contains 5-bit symbols. The constants defined on lines 10-27 define the maximum values for various numerical components of prediction-class and context-class descriptors, as well as the number of bits allocated for each of the numerical components within the prediction-class and context-class descriptors and the number of bins desired for the quantization functions for the numerical components. The parameter "grad_thresh," discussed above, is defined on line 28. The maximum value of a prediction-class descriptor is defined on line 29, and types are defined for gradients, activity levels, bit texture maps, and gradient angles on lines 30-33.

Next, the class "classRelatedData" is declared:

```
1  class classRelatedData
2  {
3    private:
4      gradient N;
5      gradient S;
6      gradient E;
7      gradient W;
8      gradMagnitude activityLevel;
9      texture textureBitMap;
10     phi gradientAngle;
11
12   public:
13     void setActivityLevel (gradMagnitude g) {activityLevel = g;};
14     gradMagnitude getActivityLevel ( ) {return activityLevel;};
15     void setTextureBitMap (texture t) {textureBitMap = t;};
16     texture getTextureBitMap ( ) {return textureBitMap;};
17     void setGradientAngle (phi p) {gradientAngle = p;};
18     phi getGradientAngle ( ) {return gradientAngle;};
19     void setN (gradient n) {N = n;};
20     gradient getN ( ) {return N;};
21     void setS (gradient s) {S = s;};
22     gradient getS ( ) {return S;};
23     void setE (gradient e) {E = e;};
24     gradient getE ( ) {return E;};
25     void setW (gradient w) {W = w;};
26     gradient getW ( ) {return W;};
27  };
```

Instances of the class "classRelatedData" together form an internal data map for storing computed numerical components of context-class and symbol-prediction-class descriptors. Each instance of the class "classRelatedData" stores wing gradients, an activity level, a textured bit map, and a gradient angle.

Next, the template class "map" is declared:

```
1  template <class ME>
2  class map
3  {
4    private:
5      ME data[MAP_HEIGHT][MAP_WIDTH];
6      int curI, curJ;
7
8    public:
9      ME get(int i, int j) {return data[i][j];};
10     ME get( ) {return data[curI][curJ];};
11     void set(int i, int j, ME m) {data[i][j] = m;};
12     void set(ME& m) {data[curI][curJ] = m;};
13     ME* access(int i, int j) {return &(data[i][j]);};
14     bool validContext(int i, int j)
15       {return (i >= minI && i <= maxI && j >= minJ &&
               j <= maxJ);};
16     void initCurElement( ) {curI = minI; curJ = minJ;};
17     bool incCurElement( );
18     int getCurI( ) {return curI;};
19     int getCurJ( ) {return curJ;};
20     ME getZ( ) {return data[curI][curJ];};
21     ME getNN( ) {return data[curI − 2][curJ];};
22     ME getN( ) {return data[curI − 1][curJ];};
23     ME getSS( ) {return data[curI + 2][curJ];};
24     ME getS( ) {return data[curI + 1][curJ];};
25     ME getEE( ) {return data[curI][curJ + 2];};
26     ME getE( ) {return data[curI][curJ + 1];};
27     ME getWW( ) {return data[curI][curJ − 2];};
28     ME getW( ) {return data[curI][curJ − 1];};
29     ME getNW( ) {return data[curI − 1][curJ − 1];};
30     ME getNE( ) {return data[curI − 1][curJ + 1];};
31     ME getSW( ) {return data[curI + 1][curJ − 1];};
32     ME getSE( ) {return data[curI + 1][curJ +1];};
33     map( );
34  };
```

The template "class" is instantiated as five different maps corresponding to the prefiltered image $y^{m \times n}$, the binary mask $u^{m \times n}$, the noisy image $z^{m \times n}$, the metamap $\gamma^{m \times n}$, and the predicted noisy image $\hat{z}^{m \times n}$. The template class "map" includes functions for extracting and inputting map elements into the map, as well as functions for extracting elements of the K=12 context surrounding a current map element.

Next, a number of constants are defined related to the class "metaMapElement," a declaration for which follows:

```
1   const txtShft = 8;
2   const int actlvlShftP = 11;
3   const int actlvlShftC = 12;
4   const int actlvlMaskC = 0x3;
5   const int actlvlMaskP = 0x7;
6   const int txtShftP = 7;
7   const int txtShftC = 7;
8   const int txtMaskC = 0xf;
9   const int txtMaskP = 0xf;
10  const int ganglShftP = 4;
11  const int ganglShftC = 5;
12  const int ganglMaskC = 0x3;
13  const int ganglMaskP = 0x7;
14  const int nShftP = 3;
15  const int nShftC = 3;
16  const int nMaskC = 0x1;
17  const int nMaskP = 0x1;
18  const int sShftP = 2;
19  const int sShftC = 2;
20  const int sMaskC = 0x1;
21  const int sMaskP = 0x1;
22  const int eShftP = 1;
23  const int eShftC = 1;
24  const int eMaskC = 0x1;
25  const int eMaskP = 0x1;
26  const int wShftP = 0;
27  const int wShftC = 0;
28  const int wMaskC = 0x1;
29  const int wMaskP = 0x1;
```

```
1   class metaMapElement
2   {
3     private:
4       int data;
5     public:
6       void init( ) {data = 0;};
7       void setActivityLevel(int g)
8         {data = data | ((g & actlvlMaskP) << actlvlShftP);};
9       int getPredActivityLevel( )
10        {return (data >> actlvlShftP) & actlvlMaskP;};
11      int getCondActivityLevel( )
12        {return (data >> actlvlShftC) & actlvlMaskC;};
13      void setTextureBitMap (int t)
14        {data = data | ((t & txtMaskP) << txtShftP);};
15      int getPredTextureBitMap( )
16        {return (data >> txtShftP) & txtMaskP;};
```

```
17      int getCondTextureBitMap( )
18          {return (data >> txtShftC) & txtMaskC;}      ;
19      void setGradientAngle (int p)
20          {data = data | ((p & ganglMaskP) << ganglShftP);};
21      int getPredGradientAngle ( )
22          {return (data >> ganglShftP) & ganglMaskP;};
23      int getCondGradientAngle ( )
24          {return (data >> ganglShftC) & ganglMaskC;};
25      void setN(int n)
26          {data = data | ((n & nMaskP) << nShftP);};
27      int getPredN( )
28          {return (data >> nShftP) & nMaskP;};
29      int getCondN( )
30          {return (data >> nShftC) & nMaskC;};
31      void setS(int s)
32          {data = data | ((s & sMaskP) << sShftP);};
33      int getPredS( )
34          {return (data >> sShftP) & sMaskP;};
35      int getCondS( )
36          {return (data >> sShftC) & sMaskC;};
37      void setE(int e)
38          {data = data | ((e & eMaskP) << eShftP);};
39      int getPredE( )
40          {return (data >> eShftP) & eMaskP;};
41      int getCondE( )
42          {return (data >> eShftC) & eMaskC;};
43      void setW(int w)
44          {data = data | ((w & wMaskP) << wShftP);};
45      int getPredW( )
46          {return (data >> wShftP) & wMaskP;};
47      int getCondW( )
48          {return (data >> wShftC) & wMaskC;};
49      int getPred( ) {return data;};
50  };
```

The class "metaMapElement" defines the elements for the metamap $\gamma^{m \times n}$. This class includes function members that allow each of the numerical components of prediction-class and context-class descriptors to be extracted and to be inserted.

Next, type definitions for each of the different maps used in the current implementation of a modeling component that represents an embodiment of the present invention are defined:

```
1 typedef map<symbol> noisySymbols;
2 typedef map<bool> classified;
3 typedef map<symbol> filtered;
4 typedef map<classRelatedData> computedData;
5 typedef map<metaMapElement> metaMap;
6 typedef map<symbol> prediction;
```

The map type "computerData" is an internal map used in the implementation of the context-modeling component for storing the computed numerical components, prior to their quantization and truncation.

Finally, a class declaration for the context-modeling component is provided:

```
1   class modeler
2   {
3     private:
4       classified* u;
5       filtered* y;
6       noisySymbols* z;
7       computedData* d;
8       metaMap* g;
9       prediction* zHat;
10
11      int nHist[maxGrad * 2];
12      int sHist[maxGrad * 2];
13      int wHist[maxGrad * 2];
14      int eHist[maxGrad * 2];
15      int actlvlHst[maxActivityLevel];
16      int ganglHst[maxPhi];
17
18      int nQ[nBins – 1];
19      int sQ[sBins – 1];
20      int eQ[eBins – 1];
21      int wQ[wBins – 1];
22      int actlvlQ[actlvlBins – 1];
23      int ganglQ[ganglBins – 1];
24
25      classRelatedData dt;
26      short absN, absS, absE, absW;
27
28      int cumError[maxPredictionClass];
29      int pCount[maxPredictionClass];
30
31      int minDn, maxDn, minDs, maxDs, minDw, maxDw, minDe,
32          maxDe, minGrdang, maxGrdang, minActLvl, maxActLvl;
33
34      void init( );
35
36      void bin(int* hst, int N, int T, int* q, int numBins);
37      void computeData( );
38      symbol predict( );
39      void text(symbol s);
40      void computeQ( );
41      short Q(int* q, short sz, short val);
42
43      void pass1( );
44      void pass2( );
45      void pass3( );
46
47    public:
48      void initialize(classified* u, filtered* y, noisySymbols* z,
49              computedData* d, metaMap* g,
50              prediction* zHat);
51      void generateMetaMap( );
52      modeler( );
53  };
```

The class "modeler" includes pointers to the various maps, declared on lines 4-9, histograms for accumulating the number of occurrences of the various numerical components, on lines 11-16, quantization-bin arrays implementing quantization functions, declared on lines 18-23, the two arrays for accumulating statistics on prediction biases, declared on lines 28-29, and various local variables employed by private function members, declared on lines 25-26 and on lines 31-32. The class "modeler" includes an initialization function member "init," declared on line 34, that initializes the histograms, quantization-bin arrays, and local variables. The class "modeler" additionally includes the following private function members: (1) "bin," declared on line 36, which computes the quantization-bin-array values based on a histogram; (2) "compute data," declared on line 37, which computes the numerical components of the prediction-class and context-class descriptors, including the extra bitmaps; (3) "predict," declared on line 38, which implements the first of the three described prediction techniques for predicting the noisy symbol ẑ for a corresponding noisy-image symbol z; (4) "text," declared on line 39, which computes the texture bitmap for a particular symbol; (5) "computeQ," declared on line 40, which computes the quantization functions for the numerical components that are quantized; (6) "Q," declared on line 41, which implements the quantization function for transforming numerical component values into quantized numerical component values; and (7) "pass1," "pass2," and "pass3," declared on lines 43-45, that implement the first, second, and third passes discussed with reference to FIGS. 42-44. The class "modeler" includes the public function member "initialize" declared on line 48, which allows input of the three input maps as well as memory for an internal map and the two output maps and the function member "generateMetaMap," declared on line 50, that implements the high-level context-modeling component illustrated in the control-flow diagram of FIG. 41.

Next, implementations of two function members of the template class "map" are provided, without further annotation:

```
1  template <class ME>
2  bool map<ME>::incCurElement( )
3  {
4    if (curJ == maxJ)
5    {
6      if (curI == maxI) return false;
7      else
8      {
9        curI++;
10       curJ = minJ;
11     }
12   }
13   else curJ++;
14   return true;
15 }
```

```
1  template <class ME>
2  map<ME>::map( )
3  {
4    curI = 0;
5    curJ = 0;
6  }
```

Next, an implementation for the function member "computeData" of the class "modeler" is provided:

```
1  void modeler::computeData( )
2  {
3    short n, s, w, e;
4    gradient dn, ds, dw, de;
5    gradMagnitude al;
6    phi gangle;
7    double res;
8
9    n = y->getN( ) - y->getNN( ) + y->getE( ) -
10       y->getNE( ) + y->getW( ) - y->getNW( );
11   s = y->getSS( ) - y->getS( ) + y->getSE( ) -
12       y->getE( ) + y->getSW( ) - y->getW( );
13   e = y->getEE( ) - y->getE( ) + y->getNE( ) -
14       y->getN( ) + y->getSE( ) - y->getS( );
15   w = y->getW( ) - y->getWW( ) + y->getN( ) -
16       y->getNW( ) + y->getS( ) - y->getSW( );
17
18   dn = n + maxGrad;
19   if (dn < minDn) minDn = dn;
20   if (dn > maxDn) maxDn = dn;
21
22   ds = s + maxGrad;
23   if (ds < minDs) minDs = ds;
24   if (ds > maxDs) maxDs = ds;
25
26   de = e + maxGrad;
27   if (de< minDe) minDe = de;
28   if (de >maxDe) maxDe = de;
29
30   dw = w + maxGrad;
31   if (dw < minDw) minDw = dw;
32   if (dw > maxDw) maxDw = dw;
33
34   dt.setN(dn);
35   dt.setS(ds);
36   dt.setE(de);
```

-continued

```
37   dt.setW(dw);
38
39   if (n < 0) absN = -n;
40   else absN = n;
41   if (s < 0) absS = -s;
42   else absS = s;
43   if (e < 0) absE = -e;
44   else absE = e;
45   if (w < 0) absW = -w;
46   else absW = w;
47
48   al = absN + absS + absE + absW;
49   if (al < minActLvl) minActLvl = al;
50   if (al > maxActLvl) maxActLvl = al;
51   dt.setActivityLevel(al);
52
53   res = (atan2 (absN + absS, absE + absW) * 100) + 315;
54   gangle = (short)res;
55   dt.setGradientAngle(gangle);
56   if (gangle < minGrdang) minGrdang = gangle;
57   if (gangle > maxGrdang) maxGrdang = gangle;
58
59   nHist[dn]++;
60   sHist[ds]++;
61   wHist[dw]++;
62   eHist[de]++;
63   actlvlHst[al]++;
64   ganglHst[gangle]++;
65 }
```

The function member "computeData" computes the signed wing gradients for currently considered prefiltered-map symbol, on lines 9-16, transforms these into unsigned equivalents on lines 18-32, inserts them into an internal-map element on lines 34-37, computes the absolute values of the wing gradients on lines 39-46, computes the activity level and inserts the activity level into the internal-map element on lines 48-51, computes the gradient angle and inserts the computed gradient angle into the internal-map element on lines 53-57, and updates the corresponding histograms on lines 59-64.

Next, an implementation of the function member "predict" for the class "modeler" is provided:

```
1  symbol modeler::predict( )
2  {
3    short minG;
4    int theta;
5
6    double wn, ws, we, ww;
7    double an, as, ae, aw;
8
9    double predNum, predDenom, pred;
10   unsigned char z__hat;
11
12   wn = 1.0 / (1.0 + absN);
13   ws = 1.0 / (1.0 + absS);
14   we = 1.0 / (1.0 + absE);
15   ww = 1.0 / (1.0 + absW);
16
17   if (absN < absS) minG = absN;
18   else minG = absS;
19   if (absE < minG) minG = absE;
20   if (absW < minG) minG = absW;
21
22   theta = grad_thresh * 3 * maxSymbol;
23
24   if ((absN - minG) >= theta) wn = 0;
25   if ((absS - minG) >= theta) ws = 0;
26   if ((absE - minG) >= theta) we = 0;
27   if ((absW - minG) >= theta) ww = 0;
28
29   an = (y->getN( ) + y->getNN( ) + (y->getNW( ) + y->getNE( )) /
        2) / 3;
```

```
30    as = (y->getS( ) + y->getSS( ) + (y->getSW( ) + y->getSE( )) / 2) /
         3;
31    ae = (y->getE( ) + y->getEE( ) + (y->getNE( ) + y->getSE( )) / 2) /
         3;
32    aw = (y->getW( ) + y->getWW( ) + (y->getNW( ) +
         y->getSW( )) / 2) / 3;
33
34    predDenom = wn + ws + we + ww;
35    predNum = (wn * an) + (ws * as) + (we * ae) + (ww * aw);
36
37    pred = predNum / predDenom;
38    z_hat = (unsigned char) pred;
39    zHat->set(y->getCurI( ), y->getCurJ( ), z_hat);
40    return z_hat;
41 }
```

The function member "predict" carries out the above-described first prediction technique involving computing wing-gradient weights, the parameter θ, and a final predicted noisy symbol ẑ.

Next, an implementation of the private function member "text" of the class "modeler" is provided:

```
 1 void modeler::text(symbol s)
 2 {
 3    short t = 0;
 4
 5    if (y->getW( ) >= s) t = t | 0x800;
 6    if (y->getN( ) >= s) t = t | 0x400;
 7    if (y->getE( ) >= s) t = t | 0x200;
 8    if (y->getS( ) >= s) t = t | 0x100;
 9    if (y->getNW( ) >= s) t = t | 0x80;
10    if (y->getNE( ) >= s) t = t | 0x40;
11    if (y->getSE( ) >= s) t = t | 0x20;
12    if (y->getSW( ) >= s) t = t | 0x10;
13    if (y->getWW( ) >= s) t = t | 0x8;
14    if (y->getNN( ) >= s) t = t | 0x4;
15    if (y->getEE( ) >= s) t = t | 0x2;
16    if (y->getSS( ) >= s) t = t | 0x1;
17
18    dt.setTextureBitMap(t);
19    d->set(y->getCurI( ), y->getCurJ( ), dt);
20 }
```

The function member "text" computes a texture bitmap for a currently considered noisy symbol.

Next, an implementation for the private function member "bin" for the class "modeler" is provided:

```
 1 void modeler::bin(int* hst, int N, int T, int* q, int numBins)
 2 {
 3    int t = N;
 4    int numPerBin;
 5    int count;
 6    int nxtBin = numBins – 2;
 7
 8    while (t > numBins – 1)
 9    {
10       numPerBin = T / numBins;
11       if (T % num Bins != 0) numPerBin++;
12       count = 0;
13       while (count < numPerBin && t > numBins)
14          count += hst[t--];
15       q[nxtBin--] = t;
16       if (nxtBin < 0) return;
17       numBins--;
18       if (t == numBins – 1)
19       {
20          while (nxtBin >= 0)
21             q[nxtBin--] = t--;
22          return;
23       }
24       T -= count;
25       numPerBin = T / numBins;
26    }
27 }
```

The routine "bin" carries out the binning process discussed above with reference to FIG. 38. In each iteration of the while-loop of lines 8-25, a next threshold is computed, and the number of occurrences per bin and desired number of bins are readjusted. If the number of numerical-component values remaining is equal to the number of desired bins, as determined on line 18, then each of the remaining numerical-component values become remaining thresholds.

Next, an implementation of the private function member "computeQ" of the class "modeler" is provided:

```
 1 void modeler::computeQ( )
 2 {
 3    bin(&(nHist[minDn]), maxDn – minDn, T_MAP, &(nQ[0]),
         nBins);
 4    bin(&(sHist[minDs]), maxDs – minDs, T_MAP, &(sQ[0]),
         sBins);
 5    bin(&(eHist[minDe]), maxDe – minDe, T_MAP, &(eQ[0]),
         eBins);
 6    bin(&(wHist[minDw]), maxDw – minDw, T_MAP, &(wQ[0]),
         wBins);
 7    bin(&(actlvlHst[minActLvl]), maxActLvl – minActLvl, T_MAP,
 8       &(actlvlQ[0]), actlvlBins);
 9    bin(&(ganglHst[minGrdang]), maxGrdang – minGrdang, T_MAP,
10       &(ganglQ[0]), ganglBins);
11 }
```

This function member computes the quantization functions for each of the quantized numerical components with prediction-class and context-class descriptors.

Next, an implementation of the function member "pass1" of the class "modeler" is provided:

```
 1 void modeler::pass1( )
 2 {
 3    symbol s;
 4
 5    y->initCurElement( );
 6    do
 7    {
 8       computeData( );
 9       s = predict( );
10       text(s);
11    } while (y->incCurElement( ));
12    computeQ( );
13 }
```

In the for-loop of lines 5-11, each element in the prefiltered map is considered, and for each currently considered element, the numerical components activity level, gradient angle, and wing gradients are computed on line 8, the noisy symbol ẑ is predicted on line 9, and the texture bitmaps are computed on line 10. On line 12, the quantization functions are computed.

Next, an implementation of the private function member "Q" for the class "modeler" is provided:

```
 1 short modeler::Q(int* q, short sz, short val)
 2 {
```

```
    3    while (sz >= 0)
    4    {
    5       if (val >= q[sz]) return sz + 1;
    6       sz--;
    7    }
    8    return 0;
    9  }
```

This private function member essentially implements the quantization functions for all of the quantized numerical components.

Next, an implementation of the private function member "pass2" of the class "modeler" is provided:

```
    1  void modeler::pass2( )
    2  {
    3     classRelatedData dt;
    4     gradient gr;
    5     texture t;
    6     gradMagnitude al;
    7     phi gangl;
    8     int val;
    9     metaMapElement e;
   10
   11    y->initCurElement( );
   12    do
   13    {
   14       e.init( );
   15
   16       dt = d->get(y->getCurI( ), y->getCurJ( ));
   17       al = dt.getActivityLevel( );
   18       val = Q(&(actlvlQ[0]), actlvlBins − 2, al);
   19       e.setActivityLevel(val);
   20
   21       t = dt.getTextureBitMap( );
   22       val = t >> txtShft;
   23       e.setTextureBitMap(val);
   24
   25       gangl = dt.getGradientAngle( );
   26       val = Q(&(ganglQ[0]), ganglBins − 2, gangl);
   27       e.setGradientAngle(val);
   28
   29       gr = dt.getN( );
   30       val = Q(&(nQ[0]), nBins − 2, gr);
   31       e.setN(val);
   32
   33       gr = dt.getS( );
   34       val = Q(&(sQ[0]), sBins − 2, gr);
   35       e.setS(val);
   36
   37       gr = dt.getE( );
   38       val = Q(&(eQ[0]), eBins − 2, gr);
   39       e.setE(val);
   40
   41       gr = dt.getW( );
   42       val = Q(&(wQ[0]), wBins − 2, gr);
   43       e.setW(val);
   44
   45       g->set(y->getCurI( ), y->getCurJ( ), e);
   46
   47       if (!u->get(y->getCurI( ), y->getCurJ( )))
   48       {
   49          val = z->getZ( ) − zHat->get(y->getCurI( ), y->getCurJ( ));
   50          cumError[e.getPred( )] += val;
   51          pCount[e.getPred( )]++;
   52       }
   53    } while (y->incCurElement( ));
   54  }
```

This function member again traverses the prefiltered map, considering each symbol of the prefiltered map in the do-while-loop of lines 12-53. For each considered prefiltered-map symbol, the quantized and/or truncated numerical components of the prediction-class and context-class descriptors are computed on lines 16-43, and the numerical components are combined and entered into an element of the metamap on line 45. On lines 47-52, the bias-adjustment statistics of the current symbol are updated in the case that the current symbol has not been identified as noise degraded in the binary mask $u^{m \times n}$.

Next, an implementation of the private function member "pass3" of the class "modeler" is provided:

```
    1  void modeler::pass3( )
    2  {
    3     int i;
    4     short s;
    5     unsigned char ss;
    6
    7     for (i = 0; i < maxPredictionClass; i++)
    8     {
    9        if (pCount[i] > 0)
   10           cumError[i] = cumError[i] / pCount[i];
   11    }
   12
   13    zHat->initCurElement( );
   14    do
   15    {
   16       s = zHat->get( );
   17       s += cumError[g->get(zHat->getCurI( ), zHat->getCurJ( )).getPred( )];
   18       if (s > maxSymbol) s = maxSymbol;
   19       if (s < 0) s = 0;
   20       ss = (symbol)s;
   21       zHat->set(ss);
   22    } while (zHat->incCurElement( ));
   23  }
```

In the for-loop of lines 7-11, the bias for each symbol-prediction class is computed, as discussed with reference to FIG. 40. Then, in the do-while-loop of lines 14-22, each predicted symbol in the predicted noisy map $\hat{z}^{m \times n}$ is adjusted according to bias computed for the symbol-prediction class to which the context for the symbol belongs.

Finally, implementations of the public function members "initialize" and "generateMetaMap" of the class "modeler" are provided:

```
    1  void modeler::initialize(classified* U, filtered* Y, noisySymbols* Z,
    2                           computedData* D, metaMap* G, prediction* ZHat)
    3  {
    4     u = U;
    5     y = Y;
    6     z = Z;
    7     d = D;
    8     g = G;
    9     zHat = ZHat;
   10  }
```

```
    1  void modeler::generateMetaMap( )
    2  {
    3     init( );
    4     pass1( );
    5     pass2( );
    6     pass3( );
    7  }
```

Although the present invention has been described in terms of a particular embodiment, it is not intended that the invention be limited to this embodiment. Modifications within the spirit of the invention will be apparent to those skilled in the art. For example, an essentially limitless number of different implementations of the context-modeling component according to the present invention can be obtained by varying the data structures, control structures, modular organization, programming language, and various other programming characteristics of the implementation. A modeler component may be implemented in software, or in a combination of software and firmware, or even a combination of firmware and hardware circuitry, for use in various types of environments. Although, in the above discussion, two different types of contexts, a K=12 and a K=20 context, are discussed, any of a wide variety of different, alternative contexts may be employed, with corresponding adjustment of wing-gradient and texture bitmap calculations, as well as assessment of the various different types of noisy-symbol prediction techniques employ the different types of contexts. Although, in the above-discussed implementation, the numerical gradients activity level, gradient angle, wing gradients, and texture bitmap were employed to generate prediction-class and context-class descriptors, certain embodiments may use different numerical components, or certain of the above-described numerical components along with additional numerical components. Different noisy-symbol-prediction techniques from those described may be employed in alternative embodiments.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A context-modeler component of an electronic denoiser, the context-modeler component implemented in hardware, as computer instructions stored in an electromagnetic memory and/or mass-storage device that control operation of the denoiser, or as a combination of hardware and stored computer instructions, the context-modeler component comprising:
   a map-receiving component, within the electronic denoiser, that receives an input noisy-image map and stores the input noisy-image map within an electromagnetic memory, and that optionally receives an input prefiltered map and an input binary mask corresponding to the noisy image and stores the prefiltered map and the input binary mask within the electromagnetic memory;
   context-class-related data that includes one or more of
      wing gradients computed for each symbol embedded within a context observed in one of the input maps,
      an activity level computed for each symbol embedded within a context observed in one of the input maps,
      a texture bitmap computed for each symbol embedded within a context observed in one of the input maps,
      and a gradient angle computed for each symbol embedded within a context observed in one of the input maps; and
   a map-generating component, within the electronic denoiser, that generates, using context-class-related data, a metamap that represents assignments of input-map symbols, by the context-modeler component, to symbol-prediction classes and context classes and stores the meta map within an electromagnetic memory, and that optionally generates a predicted-noisy-symbol map and stores the predicted-noisy-symbol map within an electromagnetic memory.

2. The context-modeler component of claim 1 wherein a wing gradient is a directional measure of symbol-value change within a context.

3. The context-modeler component of claim 2 wherein a wing gradient related to a defined direction within a context is computed as the sum of differences of values of symbols, each difference computed between a first symbol and a second symbol, with the first symbol and second symbol of each difference having identical alignments with respect to the defined direction.

4. The context-modeler component of claim 1 wherein the wing gradients include a north gradient $d_N$, a south gradient $d_s$, an east gradient $d_E$, and a west gradient $d_w$.

5. The context-modeler component of claim 1 wherein the activity level is computed from the magnitudes of the wing gradients.

6. The context-modeler component of claim 1 wherein the texture bitmap is a sequence of Boolean flags, encoded as binary bits, each Boolean flag indicating a result of comparing a particular symbol of the context corresponding to the Boolean flag with a predicted noisy symbol $\hat{z}$ that is predicted for a central symbol embedded within the context.

7. The context-modeler component of claim 1 wherein the gradient angle is computed from two or more wing gradients.

8. The context-modeler component of claim 1 wherein the map-generating component further includes:
   a first-pass component that traverses an input map, for each symbol of the input map considered during the traversal of the map to
      generate context-class-related data for each considered symbol,
      predict a noisy symbol $\hat{z}$ for each considered symbol and, optionally, store the noisy symbol $\hat{z}$ in the predicted-noisy-symbol map,
      accumulate occurrence counts for a number of the context-class-related data, and
      compute quantization functions for the number of the context-class-related data.

9. The context-modeler component of claim 8 wherein the first-pass component predicts a noisy symbol $\hat{z}$ for each considered symbol of the input map by:
   computing wing gradient weights for each wing gradient; and
   computing noisy symbol $\hat{z}$ as an average of one of
      a ratio of a sum weighted averages of values of groups of symbols within the context to a sum of computed wing gradient weights,
      an average of weighted symbol values of symbols within the context, and
      an average of symbol values of symbols within the context weighted by computed wing gradients as well as position of the symbol with respect to the central symbol of the context.

10. The context-modeler component of claim 8 wherein the first-pass component computes quantization functions for the number of context-class-related data by:
   for each of the number of context-class-related data,
      dividing the accumulated occurrence counts of the context-class-related data into a number of bins, each bin comprising the occurrence counts for a set of contiguous context-class-related data values, each bin having an approximately equal number of occurrences; and
      selecting a set of numerically ordered context-class-related data values that define boundaries between the bins.

11. The context-modeler component of claim 1 wherein the map-generating component further includes:
a second-pass component that traverses the input map, for each symbol of the input map considered in the traversal of the input map generating a symbol-prediction-class descriptor and a context-class descriptor, assigning the symbol to the symbol-prediction class and context class described by the symbol-prediction-class descriptor and a context-class descriptor.

12. The context-modeler component of claim 11 wherein the second-pass component traverses the input map, for each symbol of the input map considered in the traversal of the input map generating a symbol-prediction-class descriptor and a context-class descriptor, assigning the symbol to the symbol-prediction class and context class described by the symbol-prediction-class descriptor and a context-class descriptor by:
for each symbol of the input map considered in the traversal,
quantizing a number of context-related data computed for the symbol;
combining the quantized number of context-related data to produce a symbol-prediction-class descriptor that assigns the symbol to a symbol-prediction class corresponding to the symbol-prediction-class descriptor;
truncating the number of quantized context-related data computed for the symbol, preserving the most significant bits of each quantized context-related data;
combining the truncated, quantized number of context-related data to produce a context-class descriptor that assigns the symbol to a context class corresponding to the context-class descriptor; and
storing the symbol-prediction-class descriptor and the context-class descriptor in the metamap.

13. The context-modeler component of claim 12
wherein the symbol-prediction-class descriptor comprises
quantized wing gradients,
a quantized activity level,
a quantized gradient angle,
and a texture bitmap; and
wherein the context-class descriptor comprises
truncated, quantized wing gradients,
a truncated, quantized activity level,
a truncated, quantized gradient angle,
and a truncated texture bitmap.

14. The context-modeler component of claim 12 wherein the second-pass component additionally computes a noisy-symbol error-prediction value for each symbol of the input map considered in the traversal, when the symbol is not indicated as being noise-affected by the binary mask, and adds the noisy-symbol error-prediction value to a cumulative total of noisy-symbol error-prediction values for the symbol-prediction class to which the symbol is assigned, as well as updating a count of noisy-symbol error-prediction values added to the cumulative total of noisy-symbol error-prediction values for the symbol-prediction class.

15. The context-modeler component of claim 1 wherein the map-generating component further includes:
a third-pass component that computes a bias for each symbol-prediction class and that traverses a predicted-noisy-symbol map containing the predicted noisy symbols and applies, to each predicted noisy symbol $\hat{z}$, a computed bias for the symbol-prediction class to which a context in which the input-map symbol corresponding to the predicted noisy symbol $\hat{z}$ is assigned.

16. The context-modeler component of claim 14 wherein the third-pass component computes a bias for each symbol-prediction class, traverses a predicted-noisy-symbol map containing the predicted noisy symbols, and applies, to each predicted noisy symbol $\hat{z}$, a computed bias for the symbol-prediction class to which a context in which the input-map symbol corresponding to the predicted noisy symbol $\hat{z}$ is assigned by:
for each symbol-prediction class,
dividing a cumulative total of noisy-symbol error-prediction values by a corresponding count of a number of noisy-symbol error-prediction values added to the cumulative total of noisy-symbol error-prediction values, to produce a bias for the symbol-prediction class; and
traversing the predicted-noisy-symbol map and, for each predicted noisy symbol in the predicted-noisy-symbol map, adding the bias for the symbol-prediction class, to which the corresponding symbol of the input map has been assigned, to the predicted noisy symbol.

17. A method for assigning, by an electronic denoiser, a context class and a symbol-prediction class to each of a number of noisy symbols considered in a traversal of an electromagnetically-encoded noise-affected symbol map, the method comprising:
for each symbol considered in the traversal of a noise-affected symbol map,
generating, by the electronic denoiser, context-class-related data for the symbol by considering the symbol and a number of neighboring symbols K that together comprise a context for the symbol and storing the context-class-related data into an electromagnetic memory within the electronic denoiser;
quantizing and/or truncating, by the electronic denoiser, the generated context-class-related data to produce a first set of quantized-and/or-truncated context-class-related data;
grouping, by the electronic denoiser, the first set of quantized-and/or-truncated context-class-related data together into a data unit to form a symbol-prediction-class descriptor that describes the symbol-prediction class to which the symbol is assigned;
additionally truncating, by the electronic denoiser, each quantized-and/or-truncated context-class-related data of the first set of quantized-and/or-truncated context-class-related data to produce a second set of truncated, quantized context-class-related data, preserving the most significant bits of each quantized-and/or-truncated context-class-related data; and
grouping, by the electronic denoiser, the second set of truncated, quantized context-class-related data together into a data unit to form a context-class descriptor that describes the context class to which the symbol is assigned and storing the context-class descriptor into an electromagnetic memory within the electronic denoiser.

18. The method of claim 17 wherein the context-class-related data includes one or more of:
wing gradients computed for each symbol embedded within a context observed in one of the input maps;
an activity level computed for each symbol embedded within a context observed in one of the input maps;
a texture bitmap computed for each symbol embedded within a context observed in one of the input maps;
and a gradient angle computed for each symbol embedded within a context observed in one of the input maps.

19. The method of claim 18
wherein a wing gradient is a directional measure of symbol-value change within a context;

wherein a wing gradient related to a defined direction within a context is computed as the sum of differences of values of symbols, each difference computed between a first symbol and a second symbol, with the first symbol and second symbol of each difference having identical alignments with respect to the defined direction;

wherein the wing gradients include a north gradient $d_N$, a south gradient $d_S$, an east gradient $d_E$, and a west gradient $d_W$;

wherein the activity level is computed from the magnitudes of the wing gradients;

wherein the texture bitmap is a sequence of Boolean flags, encoded as binary bits, each Boolean flag indicating a result of comparing a particular symbol of the context corresponding to the Boolean flag with a predicted noisy symbol $\hat{z}$ that is predicted for a central symbol embedded within the context; and wherein the gradient angle is computed from two or more wing gradients.

* * * * *